US012432840B2

(12) United States Patent
Gota et al.

(10) Patent No.: US 12,432,840 B2
(45) Date of Patent: *Sep. 30, 2025

(54) SYSTEM AND METHODS FOR FORMING AND MAINTAINING HIGH ENERGY AND TEMPERATURE FRC PLASMA VIA SPHEROMAK MERGING AND NEUTRAL BEAM INJECTION

(71) Applicant: TAE TECHNOLOGIES, INC., Foothill Ranch, CA (US)

(72) Inventors: Hiroshi Gota, Irvine, CA (US); Tashiki Tajima, Foothill Ranch, CA (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 17/860,294

(22) Filed: Jul. 8, 2022

(65) Prior Publication Data
US 2022/0400546 A1    Dec. 15, 2022

Related U.S. Application Data

(63) Continuation of application No. PCT/US2021/013295, filed on Jan. 13, 2021.

(60) Provisional application No. 62/960,585, filed on Jan. 13, 2020.

(51) Int. Cl.
*H05H 1/14* (2006.01)
*G21B 1/11* (2006.01)

(52) U.S. Cl.
CPC ............... *H05H 1/14* (2013.01); *G21B 1/11* (2013.01)

(58) Field of Classification Search
None
See application file for complete search history.

(56) References Cited

U.S. PATENT DOCUMENTS

| 3,036,963 A | 5/1962 | Christofilos |
| 3,071,525 A | 1/1963 | Christofilos |
| 3,120,470 A | 2/1964 | Imhoff et al. |
| 3,132,996 A | 5/1964 | Baker et al. |
| 3,170,841 A | 2/1965 | Post |
| 3,182,213 A | 5/1965 | Rosa |
| 3,258,402 A | 6/1966 | Farnsworth |

(Continued)

FOREIGN PATENT DOCUMENTS

| AU | 2014326799 A1 * | 4/2016 | ............. G21B 1/052 |
| CA | 2924205 A1 * | 4/2015 | ............. G21B 1/052 |

(Continued)

OTHER PUBLICATIONS

Avanzini, P.G., "Feasibility of Fusion Power Generation by Accelerated Ion Beams", Icenes, Jun. 30-Jul. 4, 1986, Geneva, Italy, pp. 305-309.

(Continued)

*Primary Examiner* — Srinivas Sathiraju
(74) *Attorney, Agent, or Firm* — ONE LLP

(57) ABSTRACT

A high performance field reversed configuration (FRC) system includes a central confinement chamber, two divertor chambers coupled to the chamber, and two diametrically opposed spheromak injectors coupled to the divertor chambers. A magnetic system includes quasi-dc coils axially positioned along the FRC system components.

17 Claims, 36 Drawing Sheets

(56) References Cited

U.S. PATENT DOCUMENTS

| | | | |
|---|---|---|---|
| 3,386,883 A | 6/1968 | Farnsworth |
| 3,527,977 A | 9/1970 | Ruark |
| 3,530,036 A | 9/1970 | Hirsch |
| 3,530,497 A | 9/1970 | Hirsch et al. |
| 3,577,317 A | 5/1971 | Woods |
| 3,621,310 A | 11/1971 | Takeuchi et al. |
| 3,663,362 A | 5/1972 | Stix |
| 3,664,921 A | 5/1972 | Christofilos |
| 3,668,065 A | 6/1972 | Moir |
| 3,859,164 A | 1/1975 | Nowak |
| 4,010,396 A | 3/1977 | Ress et al. |
| 4,054,846 A | 10/1977 | Smith et al. |
| 4,057,462 A | 11/1977 | Jassby et al. |
| 4,065,351 A | 12/1977 | Jassby et al. |
| 4,098,643 A | 7/1978 | Brown |
| 4,125,431 A | 11/1978 | Fowler |
| 4,166,760 A | 9/1979 | Fowler et al. |
| 4,182,650 A | 1/1980 | Fischer |
| 4,189,346 A | 2/1980 | Jarnagin |
| 4,202,725 A | 5/1980 | Jarnagin |
| 4,233,537 A | 11/1980 | Limpaecher |
| 4,246,067 A | 1/1981 | Linlor |
| 4,267,488 A | 5/1981 | Wells |
| 4,274,919 A | 6/1981 | Jensen et al. |
| 4,303,467 A | 12/1981 | Scornavacca et al. |
| 4,314,879 A | 2/1982 | Hartman et al. |
| 4,317,057 A | 2/1982 | Bazarov et al. |
| 4,347,621 A | 8/1982 | Dow |
| 4,350,927 A | 9/1982 | Maschke |
| 4,363,776 A | 12/1982 | Yamada et al. |
| 4,371,808 A | 2/1983 | Urano et al. |
| 4,390,494 A | 6/1983 | Salisbury |
| 4,397,810 A | 8/1983 | Salisbury |
| 4,416,845 A | 11/1983 | Salisbury |
| 4,434,130 A | 2/1984 | Salisbury |
| 4,483,737 A | 11/1984 | Mantel |
| 4,512,721 A | 4/1985 | Ayres et al. |
| 4,543,231 A | 9/1985 | Ohkawa |
| 4,543,465 A | 9/1985 | Sakudo et al. |
| 4,548,782 A | 10/1985 | Manheimer et al. |
| 4,560,528 A | 12/1985 | Ohkawa |
| 4,584,160 A | 4/1986 | Kageyama |
| 4,584,473 A | 4/1986 | Hashimoto et al. |
| 4,601,871 A | 7/1986 | Turner |
| 4,615,755 A | 10/1986 | Tracy et al. |
| 4,618,470 A | 10/1986 | Salisbury |
| 4,630,939 A | 12/1986 | Mayes |
| 4,639,348 A | 1/1987 | Jarnagin |
| 4,650,631 A | 3/1987 | Knorr |
| 4,687,616 A | 8/1987 | Moeller |
| 4,734,247 A | 3/1988 | Schaffer |
| 4,826,646 A | 5/1989 | Bussard |
| 4,853,173 A | 8/1989 | Stenbacka |
| 4,894,199 A | 1/1990 | Rostoker |
| 4,904,441 A | 2/1990 | Sorensen et al. |
| 4,927,592 A | 5/1990 | Yamaguchi |
| 5,015,432 A | 5/1991 | Koloc |
| 5,041,760 A | 8/1991 | Koloc |
| 5,122,662 A | 6/1992 | Chen et al. |
| 5,147,596 A | 9/1992 | Weil |
| 5,160,694 A | 11/1992 | Steudtner |
| 5,160,695 A | 11/1992 | Bussard |
| 5,206,516 A | 4/1993 | Keller et al. |
| 5,207,760 A | 5/1993 | Dailey et al. |
| 5,339,336 A | 8/1994 | Sudan |
| 5,355,399 A | 10/1994 | Golovanivsky et al. |
| 5,420,425 A | 5/1995 | Bier et al. |
| 5,422,481 A | 6/1995 | Louvet |
| 5,473,165 A | 12/1995 | Stinnett et al. |
| 5,483,077 A | 1/1996 | Glavish |
| 5,502,354 A | 3/1996 | Correa et al. |
| 5,537,005 A | 7/1996 | Goebel et al. |
| 5,557,172 A | 9/1996 | Tanaka |
| 5,656,519 A | 8/1997 | Mogami |
| 5,677,597 A | 10/1997 | Tanaka |
| 5,747,800 A | 5/1998 | Yano et al. |
| 5,764,715 A | 6/1998 | Maenchen et al. |
| 5,811,201 A | 9/1998 | Skowronski |
| 5,846,329 A | 12/1998 | Hori et al. |
| 5,848,110 A | 12/1998 | Maenchen et al. |
| 5,923,716 A | 7/1999 | Meacham |
| 6,000,360 A | 12/1999 | Koshimizu |
| 6,084,356 A | 7/2000 | Seki et al. |
| 6,245,190 B1 | 6/2001 | Masuda et al. |
| 6,248,251 B1 | 6/2001 | Sill |
| 6,255,648 B1 | 7/2001 | Littlejohn et al. |
| 6,271,529 B1 | 8/2001 | Farley et al. |
| 6,322,706 B1 | 11/2001 | Ohkawa |
| 6,335,535 B1 | 1/2002 | Miyake et al. |
| 6,345,537 B1 | 2/2002 | Salamitou |
| 6,390,019 B1 | 5/2002 | Grimbergen et al. |
| 6,396,213 B1 | 5/2002 | Koloc |
| 6,408,052 B1 | 6/2002 | McGeoch |
| 6,452,168 B1 | 9/2002 | McLuckey et al. |
| 6,477,216 B2 | 11/2002 | Koloc |
| 6,488,807 B1 | 12/2002 | Collins et al. |
| 6,572,935 B1 | 6/2003 | He et al. |
| 6,593,539 B1 | 7/2003 | Miley et al. |
| 6,593,570 B2 | 7/2003 | Li et al. |
| 6,611,106 B2 | 8/2003 | Monkhorst et al. |
| 6,628,740 B2 | 9/2003 | Monkhorst et al. |
| 6,632,324 B2 | 10/2003 | Chan |
| 6,664,740 B2 | 12/2003 | Rostoker et al. |
| 6,712,927 B1 | 3/2004 | Grimbergen et al. |
| 6,755,086 B2 | 6/2004 | Salamitou et al. |
| 6,850,011 B2 | 2/2005 | Monkhorst et al. |
| 6,852,942 B2 | 2/2005 | Monkhorst et al. |
| 6,888,907 B2 | 5/2005 | Monkhorst et al. |
| 6,891,911 B2 | 5/2005 | Rostoker et al. |
| 6,894,446 B2 | 5/2005 | Monkhorst et al. |
| 6,922,649 B2 | 7/2005 | Mondal et al. |
| 6,923,625 B2 | 8/2005 | Sparks |
| 6,995,515 B2 | 2/2006 | Rostoker et al. |
| 7,002,148 B2 | 2/2006 | Monkhorst et al. |
| 7,015,646 B2 * | 3/2006 | Rostoker ............... H05H 1/12 |
| | | 315/111.41 |
| 7,026,763 B2 * | 4/2006 | Rostoker ............... G21B 1/052 |
| | | 315/111.41 |
| 7,040,598 B2 * | 5/2006 | Raybuck ............... A61M 39/26 |
| | | 251/149.1 |
| 7,115,887 B1 | 10/2006 | Hassanein et al. |
| 7,119,491 B2 * | 10/2006 | Rostoker ............... H05H 1/03 |
| | | 315/111.21 |
| 7,126,284 B2 * | 10/2006 | Rostoker ............... H05H 1/10 |
| | | 315/111.41 |
| 7,129,656 B2 * | 10/2006 | Rostoker ............... H05H 1/03 |
| | | 315/111.41 |
| 7,180,242 B2 * | 2/2007 | Rostoker ............... G21D 7/00 |
| | | 315/111.41 |
| 7,232,985 B2 | 6/2007 | Monkhorst et al. |
| 7,350,764 B2 | 4/2008 | Raybuck |
| 7,391,160 B2 | 6/2008 | Monkhorst et al. |
| 7,439,678 B2 | 10/2008 | Rostoker et al. |
| 7,459,654 B2 | 12/2008 | Monkhorst et al. |
| 7,477,718 B2 | 1/2009 | Rostoker et al. |
| 7,569,995 B2 | 8/2009 | Rostoker et al. |
| 7,613,271 B2 | 11/2009 | Rostoker et al. |
| 7,719,199 B2 | 5/2010 | Monkhorst et al. |
| 8,031,824 B2 | 10/2011 | Bystriskii et al. |
| 8,461,762 B2 | 6/2013 | Rostoker et al. |
| 8,537,958 B2 | 9/2013 | Laberge et al. |
| 9,025,717 B2 | 5/2015 | Freeze |
| 9,082,516 B2 | 7/2015 | Slough |
| 9,265,137 B2 | 2/2016 | Rostoker et al. |
| 9,370,086 B2 | 6/2016 | Rostoker et al. |
| 9,386,676 B2 | 7/2016 | Rostoker et al. |
| 9,424,955 B2 | 8/2016 | Laberge et al. |
| 9,591,740 B2 | 3/2017 | Belchenko et al. |
| 9,596,745 B2 | 3/2017 | Laberge et al. |
| 9,672,943 B2 | 6/2017 | Rostoker et al. |
| 9,741,457 B2 | 8/2017 | Slough |
| 9,924,587 B2 | 3/2018 | Belchenko et al. |
| 9,967,963 B2 | 5/2018 | Zindler et al. |
| 9,997,261 B2 * | 6/2018 | Tuszewski ............... H05H 1/14 |

(56) References Cited

U.S. PATENT DOCUMENTS

| | | | |
|---|---|---|---|
| 10,049,774 B2 * | 8/2018 | Tuszewski | H05H 1/10 |
| 10,217,531 B2 | 2/2019 | Rostoker et al. | |
| 10,217,532 B2 * | 2/2019 | Binderbauer | H05H 1/54 |
| 10,418,170 B2 * | 9/2019 | Rath | H05H 1/10 |
| 10,438,702 B2 * | 10/2019 | Tuszewski | G21B 1/052 |
| 10,440,806 B2 * | 10/2019 | Binderbauer | H05H 1/08 |
| 10,446,275 B2 | 10/2019 | Tuszewski et al. | |
| 10,743,398 B2 * | 8/2020 | Binderbauer | G21B 1/052 |
| 10,790,064 B2 | 9/2020 | Tuszewski et al. | |
| 11,335,467 B2 * | 5/2022 | Yang | H05H 1/14 |
| 11,337,294 B2 * | 5/2022 | Binderbauer | H05H 1/14 |
| 11,615,896 B2 * | 3/2023 | Gonzalez | H05H 1/14 376/133 |
| 11,894,150 B2 * | 2/2024 | Van Drie | G21B 1/15 |
| 11,929,182 B2 * | 3/2024 | Yang | H05H 1/14 |
| 2001/0006093 A1 | 7/2001 | Tabuchi et al. | |
| 2003/0197129 A1 | 10/2003 | Murrell et al. | |
| 2003/0230240 A1 | 12/2003 | Rostoker et al. | |
| 2003/0230241 A1 | 12/2003 | Rostoker et al. | |
| 2004/0101874 A1 | 5/2004 | Ghosh et al. | |
| 2004/0213368 A1 | 10/2004 | Rostoker et al. | |
| 2006/0198485 A1 | 9/2006 | Binderbauer | |
| 2007/0026161 A1 | 2/2007 | Madocks | |
| 2008/0226011 A1 | 9/2008 | Barnes | |
| 2010/0329947 A1 | 12/2010 | Fischel | |
| 2011/0026657 A1 | 2/2011 | Laberge et al. | |
| 2011/0142185 A1 | 6/2011 | Woodruff | |
| 2015/0187443 A1 * | 7/2015 | Tuszewski | G21B 1/052 376/101 |
| 2015/0228369 A1 | 8/2015 | Cohen et al. | |
| 2015/0245461 A1 | 8/2015 | Belchenko et al. | |
| 2016/0098058 A1 | 4/2016 | Morehouse et al. | |
| 2016/0163495 A1 * | 6/2016 | Sherman | H05H 1/46 315/111.81 |
| 2016/0276044 A1 * | 9/2016 | Tuszewski | G21B 1/052 |
| 2017/0135194 A1 | 5/2017 | Belchenko et al. | |
| 2017/0236599 A1 | 8/2017 | Bystriskii et al. | |
| 2017/0294238 A1 | 10/2017 | Zheng | |
| 2017/0337991 A1 * | 11/2017 | Binderbauer | G21B 1/03 |
| 2017/0359886 A1 * | 12/2017 | Binderbauer | H05H 1/08 |
| 2018/0195501 A1 | 7/2018 | Watanabe et al. | |
| 2018/0235068 A1 | 8/2018 | Belchenko et al. | |
| 2019/0035509 A1 | 1/2019 | Tuszewski et al. | |
| 2019/0101110 A1 | 4/2019 | Anantharaman et al. | |
| 2019/0141827 A1 * | 5/2019 | Gonzalez | H05H 1/54 |
| 2019/0326023 A1 * | 10/2019 | Yang | G21B 1/11 |
| 2020/0045803 A1 * | 2/2020 | Binderbauer | H05H 1/08 |
| 2021/0045223 A1 * | 2/2021 | Binderbauer | H05H 1/08 |
| 2021/0110936 A1 | 4/2021 | Tuszewski et al. | |
| 2022/0068510 A1 * | 3/2022 | Gonzalez | G21B 1/052 |
| 2022/0093280 A1 * | 3/2022 | Dunaevsky | H05H 1/54 |
| 2022/0277861 A1 * | 9/2022 | Yang | H05H 1/14 |
| 2022/0400546 A1 * | 12/2022 | Gota | G21B 1/052 |
| 2023/0335302 A1 * | 10/2023 | Gonzalez | H05H 1/14 |
| 2023/0403779 A1 * | 12/2023 | Tkachev | G21B 1/15 |
| 2024/0120115 A1 * | 4/2024 | Binderbauer | G21B 1/15 |

FOREIGN PATENT DOCUMENTS

| | | | |
|---|---|---|---|
| CN | 101320599 | | 12/2008 |
| CN | 105723464 A * | 6/2016 | G21B 1/052 |
| EP | 2389048 A2 | 11/2011 | |
| EP | 3031051 A1 * | 6/2016 | G21B 1/052 |
| FR | 2 270 733 A1 | 12/1975 | |
| GB | 1 387 098 A | 3/1975 | |
| JP | H03-285200 | 12/1991 | |
| KR | 20160070766 A * | 6/2016 | G21B 1/052 |
| RU | 2 056 649 C1 | 3/1996 | |
| WO | WO 02/062112 A2 | 8/2002 | |
| WO | WO-2013074666 A2 * | 5/2013 | G21B 1/052 |
| WO | WO 2014/114986 A1 | 7/2014 | |
| WO | WO-2015048092 A1 * | 4/2015 | G21B 1/052 |
| WO | WO 2016/070126 A1 | 5/2016 | |
| WO | WO 2017/083796 A1 | 5/2017 | |
| WO | WO 2018/081724 A1 | 5/2018 | |
| WO | WO 2019/055400 A1 | 3/2019 | |

OTHER PUBLICATIONS

Becker, H.W., et al., "Low-Energy Cross Sections for $^{11}B(p,3\alpha)$", Z. Physics A—Atomic Nuclei, 1987, vol. 217, No. 3, pp. 341-355.

Bhattacharjee, A., et al., "Magnetic reconnection driven by the coalescence instability", The Physics of Fluids, 1983, vol. 26, No. 11, pp. 3332-3337.

Binderbauer, M.W., et al., "Turbulent transport in magnetic confinement: how to avoid it", Journal of Plasma Physics, 1996, vol. 56, No. 3, pp. 451-465.

Binderbauer, M.W., et al., "Dynamic Formation of a Hot Field Reversed Configuration with Improved Confinement by Supersonic Merging of Two Colliding High-β Compact Toroids", Phys. Rev. Lett., 2010, vol. 105, No. 4, pp. 045003-1-045003-4.

Bohm, D., "Quantum Theory", 1951, Dover Publications, Inc., New York, Chapter 12—Applications to Simple Systems, The Classical Limit and the WKB Approximation, pp. 277-283.

Bystritskii, V., et al., "Generation and Transport of a Low-Energy Intense Ion Beam", IEEE Transactions on Plasma Science, 2004, vol. 32, No. 5, pp. 1986-1992.

Bystritskii, V., et al., "Study of Dense FRCs Formation and Their Transport With Multistage Compression", IEEE 2013 IEEE Pulsed Power and Plasma Science Conference (PPPS 2013)—San Francisco, CA, USA, Jun. 2013, 1 page.

Carlson, A., "Re: Boron/Proton colliding beam reactor?", 1997, retrieved from http://groups.google.com/groups?q=rostok...opuo.fsf%40s4awc.aug.ipp-garching.mpg.de, pp. 1-3.

Carlson, A., "Fundamental Limitations on Plasma Fusion Systems Not in Thermodynamic Equilibrium", 1997, retrieved from http://www.ipp.mpg.de/~Arthur.Carlson/rider.html, pp. 1-3.

Carlson, A., "Annotated Bibliography of p-B11 Fusion", 1998, retrieved from http://www.ipp.mpg.de/~Arthur.carlson/p-B11-bib.html, pp. 1-4.

Carlson, A., "Home Page of Dr. A. Carlson", 2000, retrieved from http://www/rzg/mpg.de/~awc/home.html, pp. 1-2.

Carlson, A., "Re: Lithium Fission—why not?," 2000, retrieved from http://groups.google.com/groups?q=rostok...v35u.fsi%40suawc.aug.ipp-garching.mpg.de, pp. 1-2.

Chao, A.W., et al., Handbook of Accelerator Physics and Engineering, $2^{nd}$ Printing, 1998, World Scientific, Chapter 2, pp. 53, 119-120.

Cohen, S.A., et al., "Ion Heating in the Field-Reversed Configuration by Rotating Magnetic Fields near the Ion-Cyclotron Resonance", Physical Review Letters, 2000, vol. 85, No. 24, 2235.

"Summary", Plasma Science—Advancing Knowledge in the National Interest, National Research Counsel of the National Academies, 2007, The National Academies Press, Washington, D.C., pp. 1-5.

Post, R.F., "Nuclear Fusion", McGraw-Hill Encyclopedia of Science & Technology, $6^{th}$ Edition, 1987, pp. 142-153.

Raman, R., "Fuelling Requirements for Advanced Tokamak operation", $32_{nd}$ EPS Conference on Plasma Phys. Tarragona, 2005, pp. 1-4.

Rider, T.H., "A general critique of inertial-electrostatic confinement fusion systems", Physics Plasmas, 1995, vol. 2, No. 6, pp. 1853-1872.

Rider, T.H., "Fundamental limitations on plasma fusion systems not in thermodynamic equilibrium", Physics Plasmas, 1997, vol. 4, No. 4, pp. 1039-1046.

Robinson, Jr., C.A., "Army Pushes New Weapons Effort", Aviation Week & Space Technology, 1978, vol. 109, pp. 42-53.

Romero, J., "Sliding Mode Control of an FRC plasma axial position", 57th Annual Meeting of the APS Division of Plasma Physics, 2015, 1 page.

Rosenbluth, M.N., et al., "Fokker-Planck Equation for an Inverse-Square Force", The Physical Review, 1957, vol. 107, No. 1, pp. 1-6.

Rostoker, N., "Large Orbit Magnetic Confinement Systems for Advanced Fusion Fuels", Final Technical Report, U.S. Dept. of Commerce, National Technical Information Service, Apr. 1, 1990-Feb. 29, 1992, pp. i-80.

(56) References Cited

OTHER PUBLICATIONS

Rostoker, N., et al., "Self-Colliding Systems for Aneutronic Fusion", Comments on Plasma Physics and Controlled Fusion, 1992, vol. 15, No. 2, pp. 105-120.
Rostoker, N., et al., "Large Orbit Confinement for Aneutronic Systems", Non-Linear and Relativistic Effects in Plasmids, editor V. Stefan, 1992, American Institute of Physics, New York, pp. 116-135.
Rostoker, N., et al., "Magnetic Fusion with High Energy Self-Colliding Ion Beams", Physical Review Letters, 1993, vol. 70, No. 12, pp. 1818-1821.
Rostoker, N., et al., "Self-Colliding Beams as an Alternative Fusion System", 10$^{th}$ International Conference on High Power Particle Beams, San Diego, CA, Jun. 20-24, 1994, pp. 195-201.
Rostoker, N., et al., "Classical Scattering in a High Beta Self-Collider/FRC", AIP Conference Proceedings 311, 1994, Physics of High Energy Particles in Toroidal Systems, Irvine, CA 1993, pp. 168-185.
Rostoker, N., et al., "Self-Colliding Beams as an Alternative Fusion System for D-He$^3$ Reactors", Current Trends in International Fusion Research, edited by Panarella, Plenum Press, New York, 1997, Chapter 4, pp. 33-41.
Rostoker, N., et al., "Alternative Fusion Concepts", Current Trends in International Fusion Research, edited by Panarella, Plenum Press, New York, 1997, Chapter 32, pp. 489-495.
Rostoker, N., et al., "Fusion Reactors Based on Colliding Beams in a Field Reversed Configuration Plasma", Comments on Plasma Physics and Controlled Fusion, 1997, vol. 18, No. 1, pp. 11-23.
Rostoker, N., "Colliding Beam Fusion Reactor", 12$^{th}$ International Conference on High-Power Particle Beams, Proceedings—vol. 1, Jun. 7-12, 1997, Haifa, Israel.
Rostoker, N., et al., "Colliding Beam Fusion Reactor", Science, 1997, vol. 278, No. 5342, pp. 1419-1422.
Rostoker, N., "Advanced Fusion Energy and Future Energy Mix Scenarios", Abstracts with Programs, 1999 Annual Meeting & Exposition, Oct. 25-28, 1999, Denver, CO.
Ruggiero, A.G., "Proton-Boron Colliding Beams for Nuclear Fusion", Proceedings of Icone 8, 8$^{th}$ International Conference on Nuclear Engineering, Apr. 2-6, 2000, Baltimore, MD, pp. 1-11.
Shishlov, A.V., et al., "Long time implosion experiments with double gas puffs", Physics of Plasmas, 2000, vol. 7, No. 4, pp. 1252-1262.
Slough, J.T., et al., "Confinement and Stability of Plasmas in a Field-Reversed Configuration", Physical Review Letters, 1992, vol. 69, No. 15, pp. 2212-2215.
Slough, J.T., et al., "Enhanced Confinement and Stability of a Field-Reversed Configuration with Rotating Magnetic Field Current Drive", Physical Review Letters, 2000, vol. 85, No. 7. pp. 1444-1447.
Smirnov, A., et al., "Neutral Beam Dump Utilizing Cathodic Arc Titanium Evaporation", Fusion Science and Technology, vol. 59, No. 1, 2010, pp. 271-273.
Smirnov, A., et al., "Neutral beam dump with cathodic arc titanium gettering", Rev. Sci. Instr., 2011, vol. 82, pp. 033509-1-033509-6.
Song, Y., et al., "Electron trapping and acceleration in a modified elongated betatron", Phys. Fluids B, 1992, vol. 4, No. 11, pp. 3771-3780.
Speth, E., et al., "Overview of RF Source Development at IPP", CONB-Meeting at Padua, Jun. 5-6, 2003, pp. 1-29.
Steinhauer, L.C., et al., "FRC 2001: A White Paper on FRC Development in the Next Five Years", Fusion Technology, 1996, vol. 30, No. 1, pp. 116-127.
Tandem Energy Corporation Presentation, Dec. 12, 1997, Washington, D.C., pp. 1-47.
Tomita, Y., et al., "Direct Energy Conversion System for D-$^3$He Fusion", 7$^{th}$ International Conference on Emerging Nuclear Energy Systems, Icenes '93, 1994, pp. 522-526.
Tuszewski, M., "Field Reversed Configurations", Nuclear Fusion, 1988, vol. 28, No. 11, pp. 2033-2092.
Tuszewski, M., "Status of the Field-Reversed Configuration as an Alternate Confinement Concept", Fusion Technology, 1989, vol. 15, No. 11, pp. 1148-1153.
Tuszewski, M., et al. "Combined FRC and mirror plasma studies in the C-2 device", Fusion Science and Technology, 2011, vol. 59, No. 1, pp. 23-26.
Vinyar, I., et al., "Pellett Injectors Developed at PELIN for JET, TAE, and HL-2A", Fusion Engineering and Design, 2011, vol. 86, pp. 2208-2211.
Watanabe, T., et al., "Computation of Neutral Gas Flow Generation From a CT Neutralization Fuel-Injector", Plasma and Fusion Research: Regular Articles, 2012, vol. 7, pp. 2405042-1-2405042-4.
Ware, A.A., et al., "Electrostatic Plugging of Open-Ended Magnetic Containment Systems", Nuclear Fusion, 1969, vol. 9, No. 4, pp. 353-361.
Weaver, T., et al., "Exotic CTR Fuels For Direct Conversion-Utilizing Fusion Reactors", Talk before the AEC CTR Staff, Mar. 16, 1973, AEC/Germantown.
Weaver, T., et al., "Fusion Microexplosions, Exotic Fusion Fuels, Direct Conversion: Advanced Technology Options for CTR", Annual Meeting of the Committee on Advance Development and the Fusion Task Force of the Edison Electric Institute, Apr. 27, 1973, Los Alamos Scientific Laboratory, CA.
Weaver, T., et al., "Exotic CTR Fuels: Non-Thermal Effects and Laser Fusion Applications", 1973 Annual Meeting of the American Physical Society Division of Plasma Physics, Oct. 31-Nov. 3, 1973, Philadelphia, PA, pp. 1-12.
"Welcome to Colliding Beam Fusion", retrieved from http://fusion.ps.uci.edu/beam/introb.html on Oct. 11, 2000, pp. 1-3.
Wells, D. R., "Injection and Trapping of Plasma Vortex Structures", Phys. Fluids, 1966, vol. 9, No. 5, pp. 1010-1021.
Wessel, F.J., et al., "D-T Beam Fusion Reactor", Journal of Fusion Energy, 1998, vol. 17, No. 3, pp. 209-211.
Wessel, F.J., et al., "Colliding Beam Fusion Reactor Space Propulsion System", AIP Conference Proceedings 504, 2000, pp. 1425-1430.
"A White Paper on FRC Development", Apr. 1998, retrieved from http://depts.washington.edu/rppl/programs/wpr98.pdf, pp. 1-26.
Wong, H.V., et al., "Stability of annular equilibrium of energetic large orbit ion beam", Phys. Fluids B, 1991, vol. 3, No. 11, pp. 2973-2986.
Yamada, M., et al., "Magnetic Reconnection of Plasma Toroids with Co- and Counter-Helicity", Physical Review Letters, 1990, vol. 65, No. 21, pp. 1-13.
Zweben, S.J., et al., "Radial Diffusion Coefficient for Counter-Passing MeV Ions in the TFTR Tokamak", Nuclear Fusion, 1991, vol. 31, No. 12, pp. 2219-2245.
EP 21741980.3 Extended Search Report, Dec. 15, 2023.
EP 15854636.6 Supplementary Search Report, May 17, 2018.
EP 16865181.8 Extended Search Report, Oct. 15, 2018.
EP 17866196.3 Extended Search Report, Jun. 2, 2020.
JP 2018-524255 Office Action, Nov. 12, 2020.
SG 11201803610Q Written Opinion, Aug. 21, 2019.
SG 11201903545V Written Opinion, Apr. 30, 2020.
WO PCT/US2016/061730 ISR and Written Opinion, Mar. 9, 2017.
WO PCT/US2017/059067 ISR and Written Opinion, Jan. 12, 2018.
WO PCT/US2021/013295 ISR and Written Opinion, Jun. 22, 2021.
Anderson, M., et al., "Plasma and Ion Beam Injection into an FRC", Plasma Physics Reports, 2005, vol. 31, No. 10, pp. 809-817.
Arsenin, V.V., et al., "Suppression of plasma instabilities by the feedback method", Soviet Physics Uspekhi, 1977, vol. 20, No. 9, pp. 736-745.
Artsimovich, L.A., "Controlled Thermonuclear Reactions", English Edition, 1964, Gordon and Breach, Science Publishers, Inc., New York, pp. 1-9.
Asai, T., et al., "End Loss Measurement of Neutral-Beam-Injected Field-Reversed Configuration Plasma", J. Plasma Fusion Res. Series, vol. 5, 2002, pp. 220-224.
Asai, T., et al., "Experimental evidence of improved confinement in a high-beta field-reversed configuration plasma by neutral beam injection", Physics of Plasma, 2000, vol. 7, No. 6, pp. 2294-2297.

(56) References Cited

OTHER PUBLICATIONS

Avanzini, P.G., "Feasibility of Fusion Power Generation by Accelerated Ion Beams", Cenes, Jun. 30-Jul. 4, 1986, Geneva, Italy, pp. 305-309.

Bhattacharjee, A., "Magnetic reconnection driven by the coalescence instability", The Physics of Fluids, 1983, vol. 26, No. 11, pgs.

Cohen, S.A., et al., "Ion Heating in the Field-Reversed Configuration by Rotating Magnetic Fields near the Ion-Cyclotron Resonance", Physical Review Letters, 2000, vol. 85, No. 24, pp. 5114-5117.

Cohen, S.A., et al., "Formation of Collisionless High-$\beta$ Plasmas by Odd-Parity Rotating Magnetic Fields", Physical Review Letters, vol. 98, 2007, pp. 125002-1-145002-4.

Cohen, S.A., et al., "RMFo-FORMED Collisionless High-$\beta$ Plasmas: Yesterday, Today and Tomorrow", AIP Conference Proceedings, vol. 1154, 2009, pp. 165-166.

Cothran, C. D., "Spheromak merging and field reversed configuration formation at the Swarthmore Spheromak Experiment", Physics of Plasmas, 2003, vol. 10, No. 5, pp. 1748-1754.

Cox, Jr., L/T., et al., "Thermonuclear Reaction Listing With Cross-Section Data for Four Advanced Reactions", Fusion Technology, 1990, vol. 18, No. 2, pp. 325-339.

Davis, H.A., et al., "Generation of Field-Reversing E Layers with Millisecond Lifetimes", Physical Review Letters, 1976, vol. 37, No. 9, pp. 542-545.

Dawson, J.M., "Advanced Fuels for CTR", Four Workshops in Alternate Concepts in Controlled Fusion, EPRI ER-429-SR, Special Report, Part B: Extended Summaries, 1977, pp. 143-147.

Dawson, J.M., "Alternate Concepts in Controlled Fusion", EPRI ER-429-SR, Special Report, Part C: CTR Using the p-$^{11}$B Reaction, 1977, pp. ii-30.

Dobrott, D., "Alternate Fuels in Fusion Reactors", Nuclear Technology/Fusion, 1983, vol. 4, pp. 339-347.

Dolan, T.J, "Fusion Research", 1982, vol. II—Experiments, Pergamon Press, New York, pp. 277-309.

Edo, T., et al., "Performance Improvement of a Magnetized Coaxial Plasma Gun by Adopting Iron-Core Bias Coil and Pre-Ionization Systems", Plasma and Fusion Research: Regular Articles, 2018, vol. 13, pp. 3405062-1-3405062-4.

Feldbacher, R., et al., "Basic Cross Section Data for Aneutronic Reactor", Nuclear Instruments and Methods in Physics Research A271, 1988, pp. 55-64.

Finn, J.M., et al., "Field-Reversed Configurations With a Component of Energetic Particles" Nuclear Fusion, 1982, vol. 22, No. 11, pp. 1443-1518.

Gerhardt, S. P., et al., "Inductive Sustainment of a Field-Reversed Configuration Stabilized by Shaping, Magnetic Diffusion, and Finite-Larmor-Radius Effects", Physical Review Letters, 2007, vol. 99, pp. 245003-1-245003-4.

Gerhardt, S. P., et al., "Field-reversed configuration formation scheme utilizing a spheromak and solenoid induction", Physics of Plasmas, 2008, vol. 15, pp. 032503-1-032503-11.

Goldston, R.J., et al., "Fusion Alternatives", Science, 1997, vol. 278, No. 5346, pp. 2031-2037.

Gota, H., et al., "A Well-Confined Field-Reversed Configuration Plasma Formed by Dynamic Merging of Two Colliding Compact Toroids in C-2", ICC and CT Workshops, Aug. 16, 2011, retrieved from http://www.iccworkshops.org/icc2011/uploads/241/icc2011_gota_talk_8_16_11.pdf, pp. 1-19.

Gota, H., et al., "Achievement of Field-Reversed Configuration Plasma Sustainment via 10 MW Neutral-Beam Injection on the C-2U Device", Nuclear Fusion, 2017, vol. 57, No. 11, pp. 1-8.

Gota, H., et al., "Formation of Hot, Stable, Long-Lived Field-Reversed Configuration Plasmas on the C-2W Device", Nuclear Fusion, 2019, vol. 59, No. 11, pp. 1-12.

Gota, H., et al., "Overview of C-2W: high temperature, steady-state beam-driven field-reversed configuration plasmas", Nuclear Fusion, 2021, vol. 61, No. 10, pp. 1-19.

Guo, H. Y., et al., "Flux Conversion and Evidence of Relaxation in a High-$\beta$ Plasma Formed by High-Speed Injection into a Mirror Confinement Structure", Phys. Rev. Lett., 2004, vol. 92, No. 24, pp. 245001-1-245001-4.

Guo, H. Y., et al., "Formation of a long-lived hot field reversed configuration by dynamically merging two colliding high-$\beta$ compact toroids", Physics of Plasmas, 2011, vol. 18, pp. 056110-1-056110-10.

Heidbrink, W.W., et al., "Comparison of Experimental and Theoretical Fast Ion Slowing-Down Times in DIII-D", Nuclear Fusion, 1988, vol. 28, No. 1, pp. 1897-1901.

Heidbrink, W.W., "Measurements of classical deceleration of beam ions in the DIII-D tokamak", Phys. Fluids B. 1990, vol. 2, No. 1, pp. 4-5.

Heidbrink, W.W., et al., "The diffusion of fast ions in Ohmic TFTR discharges", Phys. Fluids B, 1991, vol. 3, No. 11, pp. 3167-3170.

Heidbrink, W.W., et al., "The Behaviour of Fast Ions in Tokamak Experiments", Nuclear Fusion, 1994, vol. 34, No. 4, pp. 535-618.

Himura, H., et al., "Rethermalization of a field-reversed configuration plasma in translation experiments", Phys. Plasmas, 1995, vol. 2, No. 1, pp. 191-197.

Hoffman, A.L., et al., "Field Reversed Configuration Lifetime Scaling Based on Measurements From the Large s Experiment", Nucl. Fusion, 1993, vol. 33, No. 1, pp. 27-38.

Iwanenko, D., et al., "On the Maximal Energy Attainable in a Betatron", Physical Review, 1944, vol. 65, Nos. 11 and 12, p. 343.

Jeffries, C.D., "A Direct Determination of the Magnetic Moment of the Protons in Units of the Nuclear Magneton", Physical Review, 1951, vol. 81, No. 6, pp. 1040-1055.

Jones, I. R., "A review of rotating magnetic field current drive and the operation of the rotamak as a field-reversed configuration (Rotamak-FRC) and a spherical tokamak (Rotamak-ST)", Physics of Plasmas, 1999, vol. 6, No. 5, pp. 1950-1957.

Kalinowsky, H., "Deceleration of antiprotons from MeV to keV energies", Hyperfine Interactions, 1993, vol. 76, pp. 73-80.

Karpushov, A. N., et al., "Upgrade of the TCV tokamak, first phase: Neutral beam heating system", Fusion Engineering and Design, 2015, vol. 96-97, pp. 493-497.

Lampe, M., et al., "Comments on the Colliding Beam Fusion Reactor Proposed by Rostoker, Binderbauer and Monkhorst for Use with the p-$^{11}$B Fusion Reaction", Naval Research Lab., Plasma Physics Division, Oct. 30, 1998, pp. 1-37.

"Laval nozzle", 1992, Academic Press Dictionary of Science and Technology, retrieved from http://www.credoreference.com/entry/3122475/.

Lawson, J.D., "Some Criteria for a Power Producing Thermonuclear Reactor", Proc. Phys. Soc. B70, 1957, pp. 6-10.

Lifschitz, A.F., et al., "Calculations of tangential neutral beam injection current drive efficiency for present moderate flux FRCs", Nucl. Fusion, 2004, vol. 44, pp. 1015-1026.

Majeski, R., et al., "Enhanced Energy Confinement and Performance in a Low-Recycling Tokamak", Physical Review Letters, 2006, vol. 97, pp. 075002-1-075002-4.

Matsumoto, T., et al., "Development of Compact Toroid Injector for C-2 FRCs", retrieved from https://tae.com/development-of-compact-toroid-injector-for-c-2-frcs/ on Jun. 12, 2018, 1 page.

Miley, G.H., et al., "A possible route to small, flexible fusion units", Energy, 1979, vol. 4, pp. 163-170.

Miley, G.H., et al., "On design and development issues for the FRC and related alternate confinement concepts", Fusion Engineering and Design, 2000, vol. 48, pp. 327-337.

Naitou, H., et al., "Kinetic Effects on the Convective Plasma Diffusion and the Heat Transport", Journal of the Physical Society of Japan, 1979, vol. 46, No. 1, pp. 258-264.

Nevins, W.M., "Feasibility of a Colliding Beam Fusion Reactor", Science, 1998, vol. 281, No. 5375, p. 307.

Okada, S., et al., "Experiments on additional heating of FRC plasmas", Nucl. Fusion, 2001, vol. 41, No. 5, pp. 625-629.

Ono, Y., et al., "New relaxation of merging spheromaks to a field reversed configuration", Nucl. Fusion, 1999, vol. 39, No. 11Y, pp. 2001-2008.

(56) References Cited

OTHER PUBLICATIONS

Phelps, D.A., et al., "Observations of the stable equilibrium and classical diffusion of field reversing relativistic electron coils", The Physics of Fluids, 1974, vol. 17, No. 12, pp. 2226-2235.
Smirnov, A., et al., "Neutral beam dump with cathodic arc titanium gettering", Rev. Sci. Instr., 2011, vol. 82, pp. 033509-1-033509-6.
Speth, E., et al., "Overview of RF Source Development at IPP", CCNB-Meeting at Padua, Jun. 5-6, 2003, pp. 1-29.

* cited by examiner

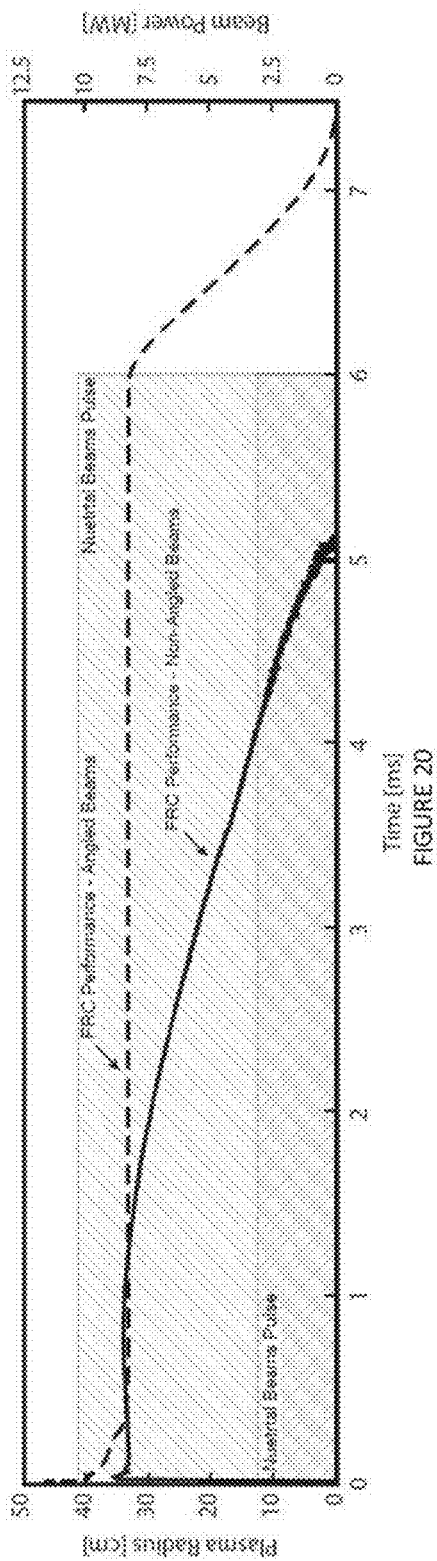
FIGURE 20
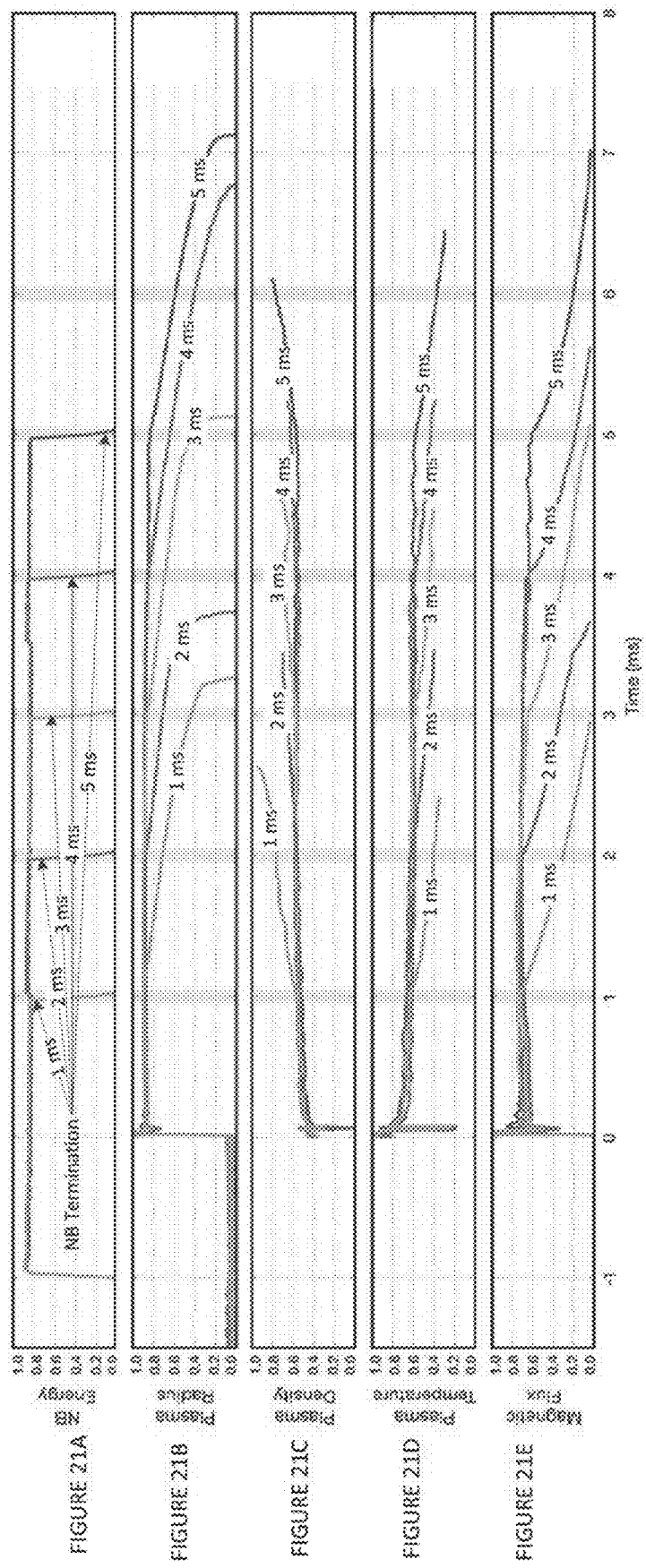
FIGURE 21A
FIGURE 21B
FIGURE 21C
FIGURE 21D
FIGURE 21E

SYSTEM AND METHODS FOR FORMING AND MAINTAINING HIGH ENERGY AND TEMPERATURE FRC PLASMA VIA SPHEROMAK MERGING AND NEUTRAL BEAM INJECTION

CROSS-REFERENCE TO RELATED APPLICATIONS

The subject application is a continuation of International Patent Application No. PCT/US21/13295, filed Jan. 13, 2021, which claims priority to U.S. Provisional Patent Application No. 62/960,585, filed on Jan. 13, 2020, both of which are incorporated by reference herein in their entireties for all purposes.

FIELD

The embodiments described herein relate generally to magnetic plasma confinement systems and, more particularly, to systems and methods that facilitate forming and maintaining high energy and temperature Field Reversed Configuration (FRC) plasma with superior stability as well as particle, energy and flux confinement.

BACKGROUND INFORMATION

The Field Reversed Configuration (FRC) belongs to the class of magnetic plasma confinement topologies known as compact toroids (CT). It exhibits predominantly poloidal magnetic fields and possesses zero or small self-generated toroidal fields (see M. Tuszewski, Nucl. Fusion 28, 2033 (1988)). The attractions of such a configuration are its simple geometry for ease of construction and maintenance, a natural unrestricted divertor for facilitating energy extraction and ash removal, and very high $\beta$ ($\beta$ is the ratio of the average plasma pressure to the average magnetic field pressure inside the FRC), i.e., high power density. The high $\beta$ nature is advantageous for economic operation and for the use of advanced, aneutronic fuels such as D-He3 and p-B11.

The traditional method of forming an FRC uses the field-reversed $\Theta$-pinch technology, producing hot, high-density plasmas (see A. L. Hoffman and J. T. Slough, Nucl. Fusion 33, 27 (1993)). A variation on this is the translation-trapping method in which the plasma created in a theta-pinch "source" is more-or-less immediately ejected out one end into a confinement chamber. The translating plasmoid is then trapped between two strong mirrors at the ends of the chamber (see, for instance, H. Himura, S. Okada, S. Sugimoto, and S. Goto, Phys. Plasmas 2, 191 (1995)). Once in the confinement chamber, various heating and current drive methods may be applied such as beam injection (neutral or neutralized), rotating magnetic fields, RF or ohmic heating, etc. This separation of source and confinement functions offers key engineering advantages for potential future fusion reactors. FRCs have proved to be extremely robust, resilient to dynamic formation, translation, and violent capture events. Moreover, they show a tendency to assume a preferred plasma state (see e.g. H. Y. Guo, A. L. Hoffman, K. E. Miller, and L. C. Steinhauer, Phys. Rev. Lett. 92, 245001 (2004)). Significant progress has been made in the last decade developing other FRC formation methods: merging spheromaks with oppositely-directed helicities (see e.g. Y. Ono, M. Inomoto, Y. Ueda, T. Matsuyama, and T. Okazaki, Nucl. Fusion 39, 2001 (1999)) and by driving current with rotating magnetic fields (RMF) (see e.g. I. R. Jones, Phys. Plasmas 6, 1950 (1999)) which also provides additional stability.

The collision-merging technique proposed long ago (see e.g. D. R. Wells, Phys. Fluids 9, 1010 (1966)) has been significantly developed further: two separate theta-pinches at opposite ends of a confinement chamber simultaneously generate two plasmoids and accelerate the plasmoids toward each other at high speed; they then collide at the center of the confinement chamber and merge to form a compound FRC. In the construction and successful operation of one of the largest FRC experiments to date, the conventional collision-merging method was shown to produce stable, long-lived, high-flux, high temperature FRCs (see, e.g., M. Binderbauer, et al., Phys. Rev. Lett. 105, 045003 (2010)). Most recently, major progress was accomplished using the collision-merging technique in beam-driven FRC experiments that produce relatively high temperature FRCs for a long time (typical plasma parameters: $T_e \sim 250$ eV, $T_i \sim 1$ keV, $\langle n_e \rangle \sim 2\text{-}3 \times 10^{13}$ cm$^{-3}$, $B_e \sim 1$ kG, plasma lifetime $\sim 30$ ms) using high-power neutral-beam (NB) injection (NBI) and effective edge biasing. (see, e.g., Gota, H. et al., Nucl. Fusion 57, 116021 (2017); Gota, H. et al., Nucl. Fusion 59, 112009 (2019); and Gota, H. et al., Bull. Am. Phys. Soc. 64, UP10.00123 (2019)). In such experiments, a target plasma for NBI is produced by the collision and merging of two FRC plasmas using the field-reversed theta-pinch (FRTP) dynamic formation technique (Binderbauer, Phys. Rev. Lett. 105) in which the trapped magnetic flux of the merged FRC is initially ~5 mWb based on rigid-rotor model with external magnetic field of ~1 kG in the confinement section. By injecting high-power NB of >13 MW (increased up to ~21 MW by tuning beam energy during a shot) into the target plasma, the injected fast particles get trapped and travel inside and outside of the separatrix with a large orbit to heat primarily electrons as well as for current drive, in which the fast ions are almost classically confined. This high power NBI has not been attained in any other CT experiment, and was a very important demonstration of the validity of the beam-driven FRC concept and its technical readiness. (Gota, Nucl. Fusion 59; Gota, Bull. Am. Phys. Soc. 64).

Improved systems, devices, and methods to generate high flux target FRC plasma and axial refueling are desired.

SUMMARY

Example embodiments of systems, devices, and methods are provided herein for generate high flux target FRC plasma and axially refueling the FRC plasma. In order to generate an optimum initial high-flux target FRC plasma, mid-scale spheromak injectors (also called CT injectors) are opposingly coupled to the ends of a centrally position plasma confinement chamber. The spheromak injectors inject spheromaks toward the midplane of the confinement chamber where the spheromaks merge and form an FRC plasma in the confinement chambers. The counter-helicity merging of two spheromaks tends to generate FRC plasmas with an elevated trapped magnetic flux. A plurality of neutral beam injectors are also coupled to the confinement chamber to drive and maintain the FRC plasma.

In example embodiments, the neutral beam injectors are adjustable from an initial power level to and an increased power level.

In further example embodiments, the spheromak injectors are capable of multi-pulsed spheromak injection into the FRC plasma along the geometrical axis of the confinement chamber for effective refueling and refluxing.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The accompanying drawings, which are included as part of the present specification, illustrate the presently example embodiments and, together with the general description given above and the detailed description of the example embodiments given below, serve to explain and teach the principles of the present invention.

FIG. 20 illustrates the FRC lifetime corresponding to the pulse length of non-angled and angled injected neutral beams.

FIGS. 21A, 21B, 21C, 21D, and 21E illustrate pulse length of angled injected neutral beam and the lifetime of FRC plasma parameters of plasma radius, plasma density, plasma temperature, and magnetic flux corresponding to the pulse length of angled injected neutral beams.

Figure 1:
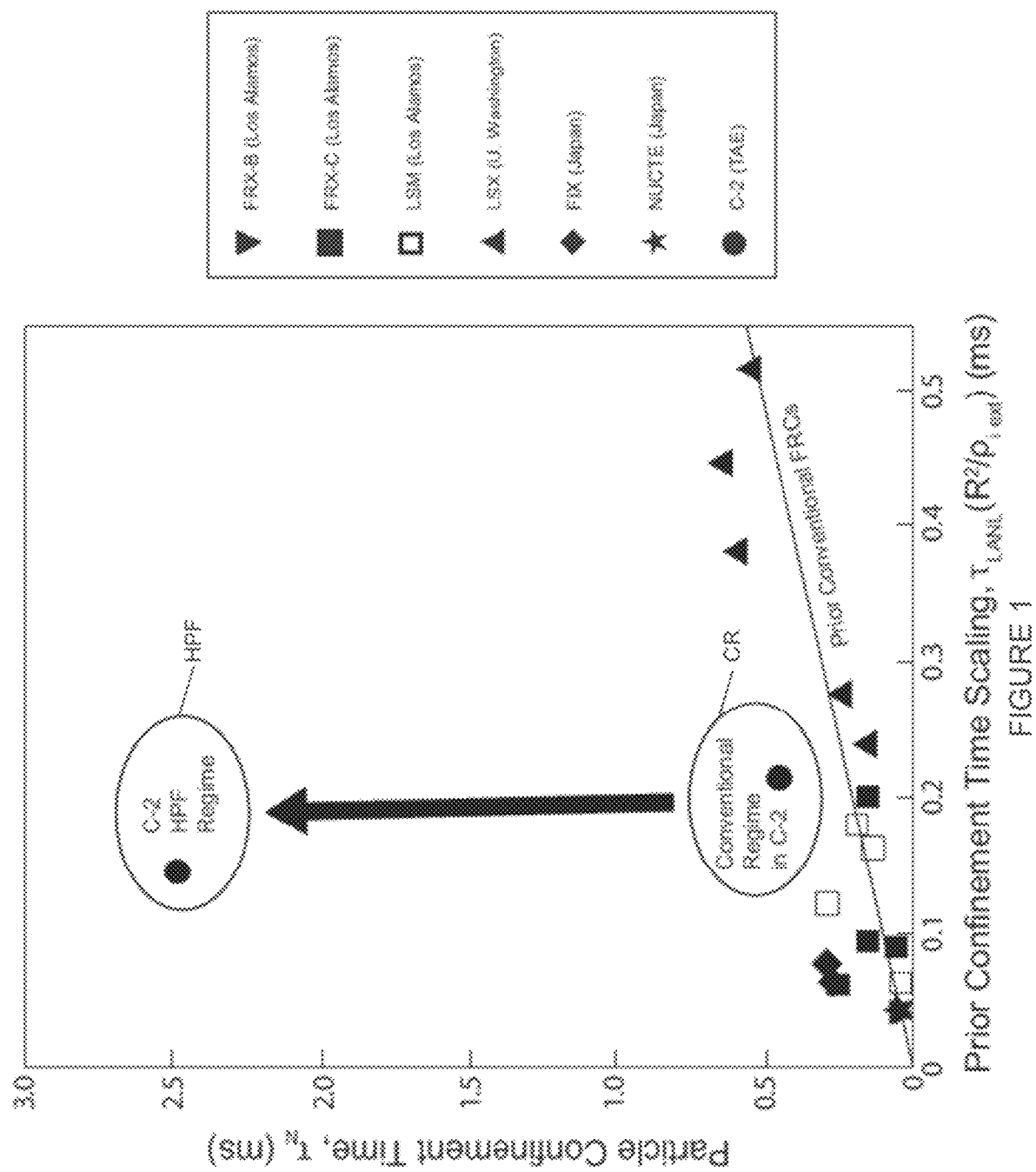
FIG. 1 illustrates particle confinement in the present FRC system under a high performance FRC regime (HPF) versus under a conventional FRC regime (CR), and versus other conventional FRC experiments.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Representative examples of the embodiments described herein, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

The present embodiments provided herein are directed to systems and methods that facilitate forming and maintaining FRCs with superior stability as well as particle, energy and flux confinement. Some of the present embodiments are directed to systems and methods that facilitate forming and maintaining FRCs with elevated system energies and improved sustainment utilizing neutral beam injectors with tunable beam energy capabilities. Some of the present embodiments are also directed to systems and methods that facilitate stability of an FRC plasma in both radial and axial directions and axial position control of an FRC plasma along the symmetry axis of an FRC plasma confinement chamber independent of the axial stability properties of the FRC plasma's equilibrium.

Before turning to the systems and methods that facilitate the generation and maintenance of a high flux target FRC plasma and axial refueling the FRC plasma utilizing a pair of mid-scale spheromak injectors (or magnetized coaxial plasma guns (MCPGs)), a discussion of systems and methods for forming and maintaining high performance FRCs with superior stability as well as superior particle, energy and flux confinement over conventional FRCs is provided. Such high performance FRCs provide a pathway to a whole variety of applications including compact neutron sources (for medical isotope production, nuclear waste remediation, materials research, neutron radiography and tomography), compact photon sources (for chemical production and processing), mass separation and enrichment systems, and reactor cores for fusion of light nuclei for the future generation of energy.

Various ancillary systems and operating modes have been explored to assess whether there is a superior confinement regime in FRCs. These efforts have led to breakthrough discoveries and the development of a High Performance FRC paradigm described herein. In accordance with this new paradigm, the present systems and methods combine a host of novel ideas and means to dramatically improve FRC confinement as illustrated in FIG. 1 as well as provide stability control without negative side-effects. As discussed in greater detail below, FIG. 1 depicts particle confinement in an FRC system 10 described below (see FIGS. 2 and 3), operating in accordance with a High Performance FRC regime (HPF) for forming and maintaining an FRC versus operating in accordance with a conventional regime (CR) for forming and maintaining an FRC, and versus particle confinement in accordance with conventional regimes for forming and maintaining an FRC used in other experiments. The present disclosure will outline and detail the innovative individual components of the FRC system 10 and methods as well as their collective effects.

FRC System

Vacuum System

Figure 2:
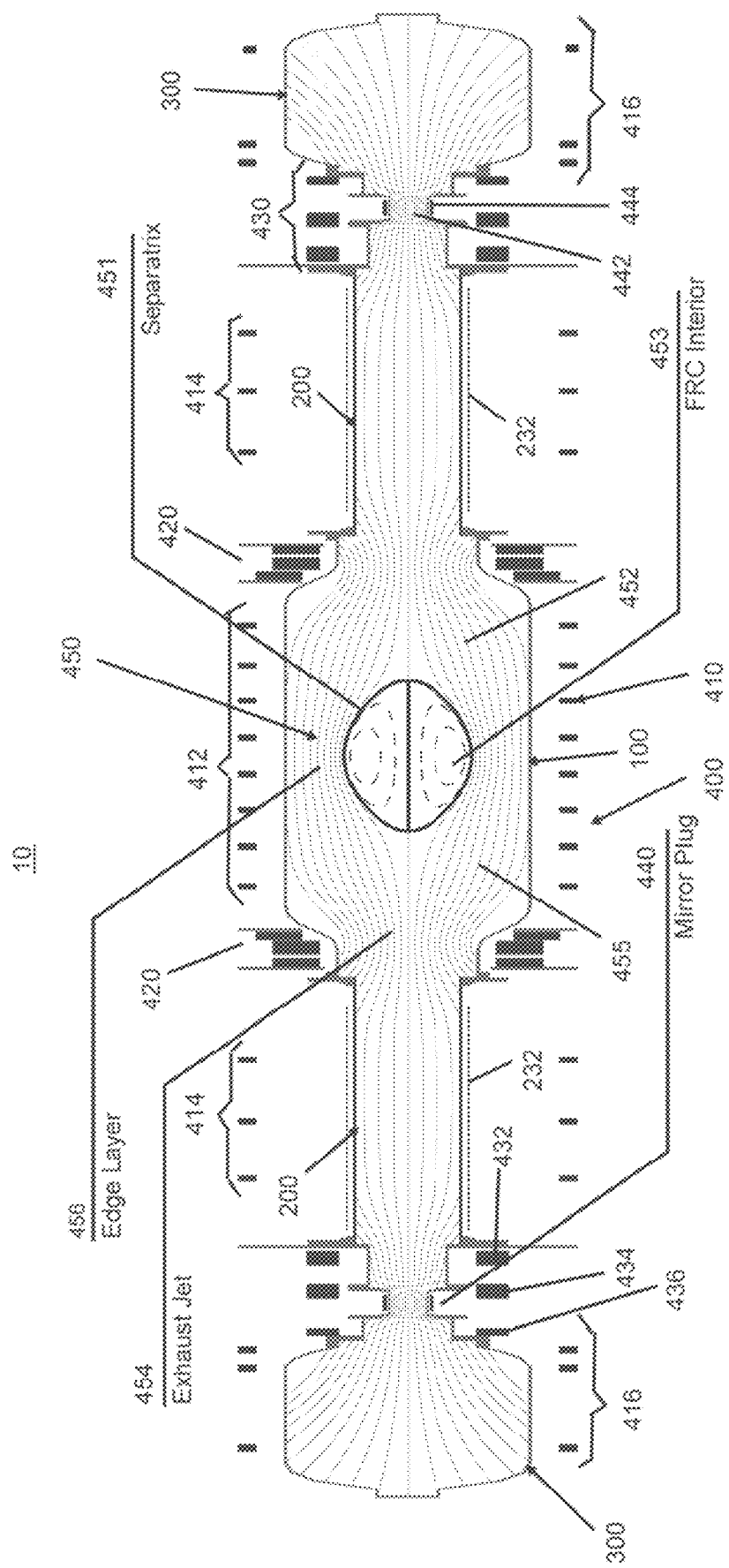
FIG. 2 illustrates the components of the present FRC system and the magnetic topology of an FRC producible in the present FRC system.

FIGS. 2 and 3 depict a schematic of the present FRC system 10. The FRC system 10 includes a central confinement vessel 100 surrounded by two diametrically opposed reversed-field-theta-pinch formation sections 200 and, beyond the formation sections 200, two divertor chambers 300 to control neutral density and impurity contamination. The present FRC system 10 was built to accommodate ultrahigh vacuum and operates at typical base pressures of $10^7$ torr. Such vacuum pressures require the use of double-pumped mating flanges between mating components, metal O-rings, high purity interior walls, as well as careful initial surface conditioning of all parts prior to assembly, such as physical and chemical cleaning followed by a 24 hour 250° C. vacuum baking and hydrogen glow discharge cleaning.

Figure 4:
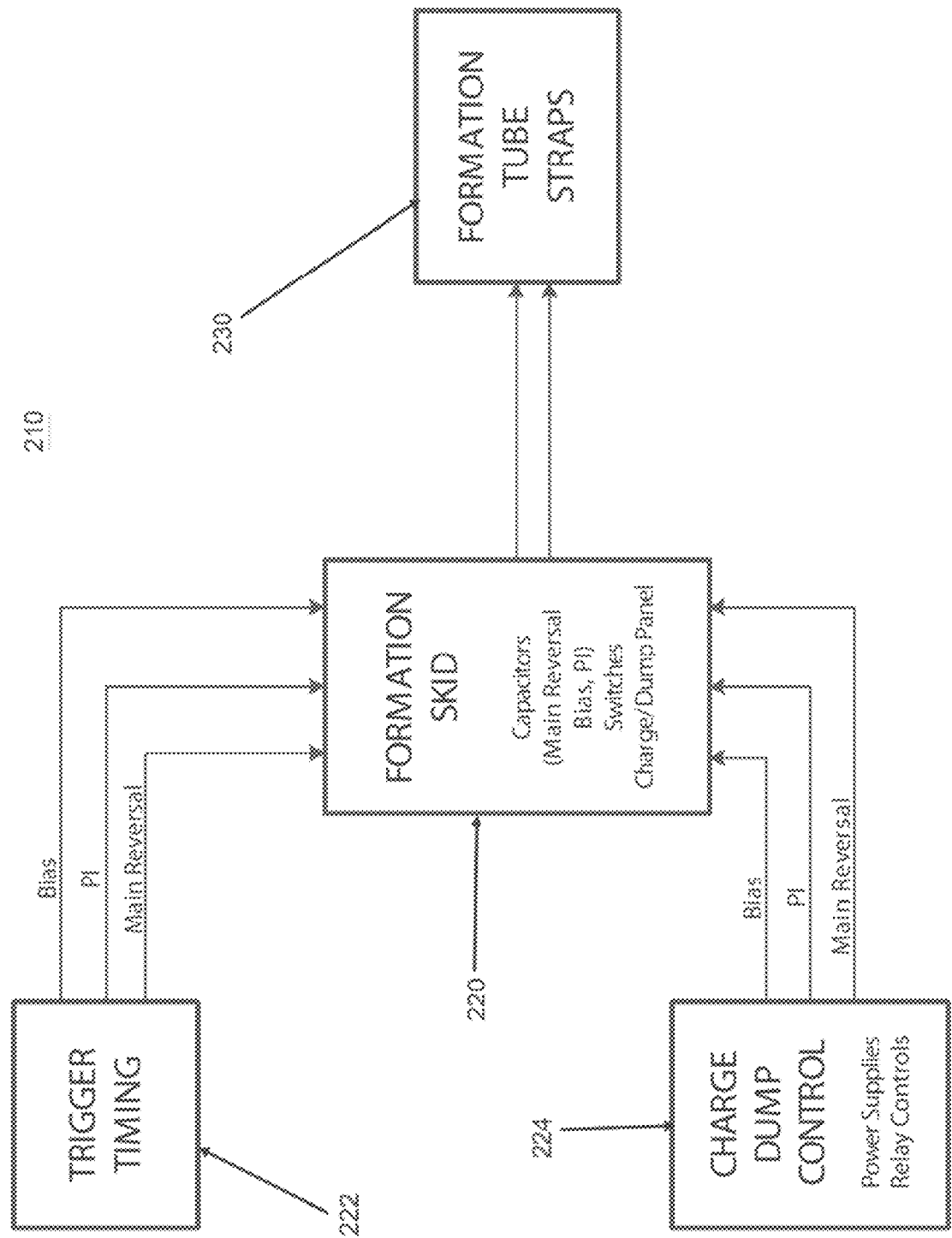
FIG. 4 illustrates a schematic of the components of a pulsed power system for the formation sections.
Figure 5:
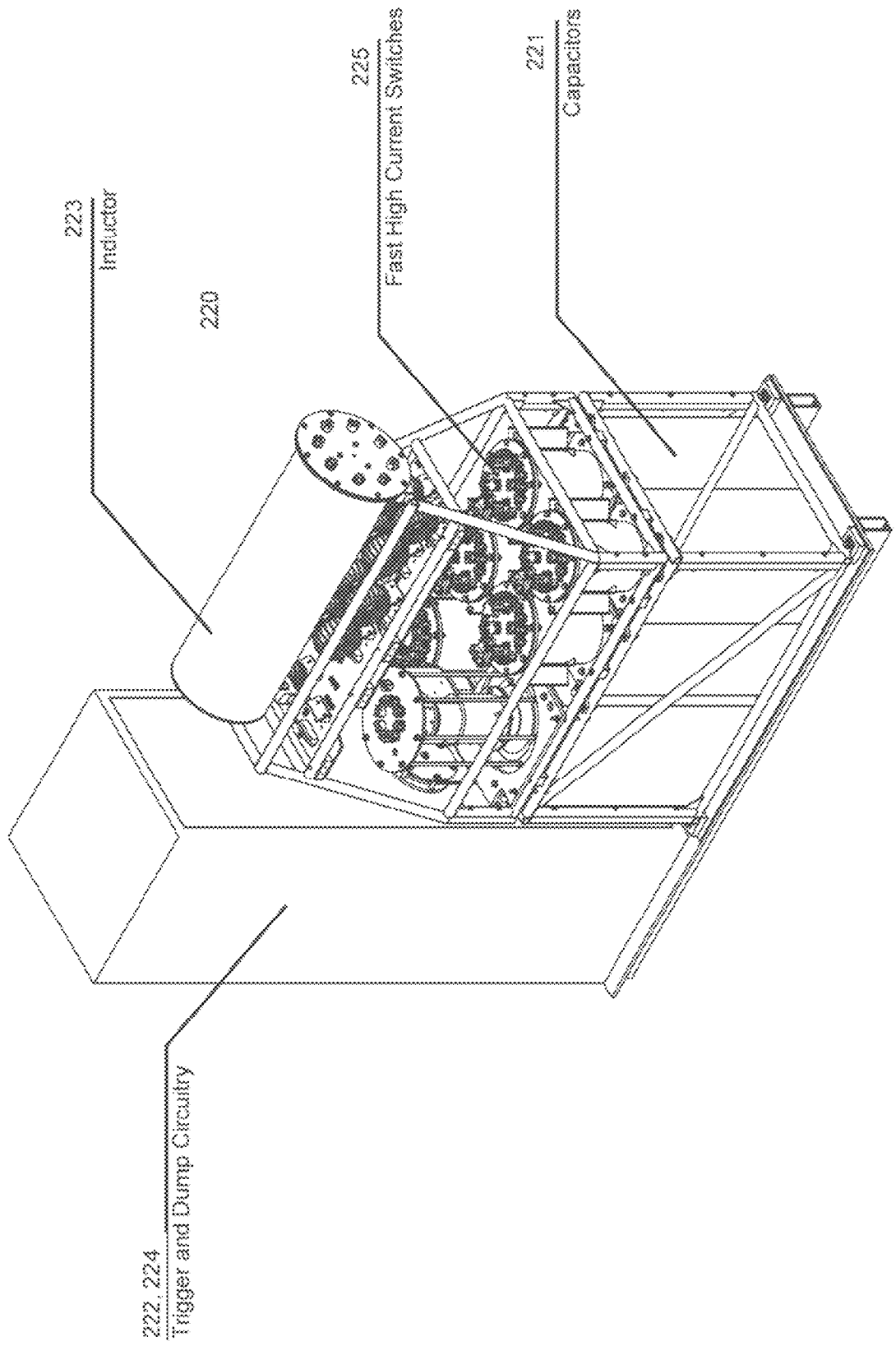
FIG. 5 illustrates an isometric view of an individual pulsed power formation skid.
Figure 6:
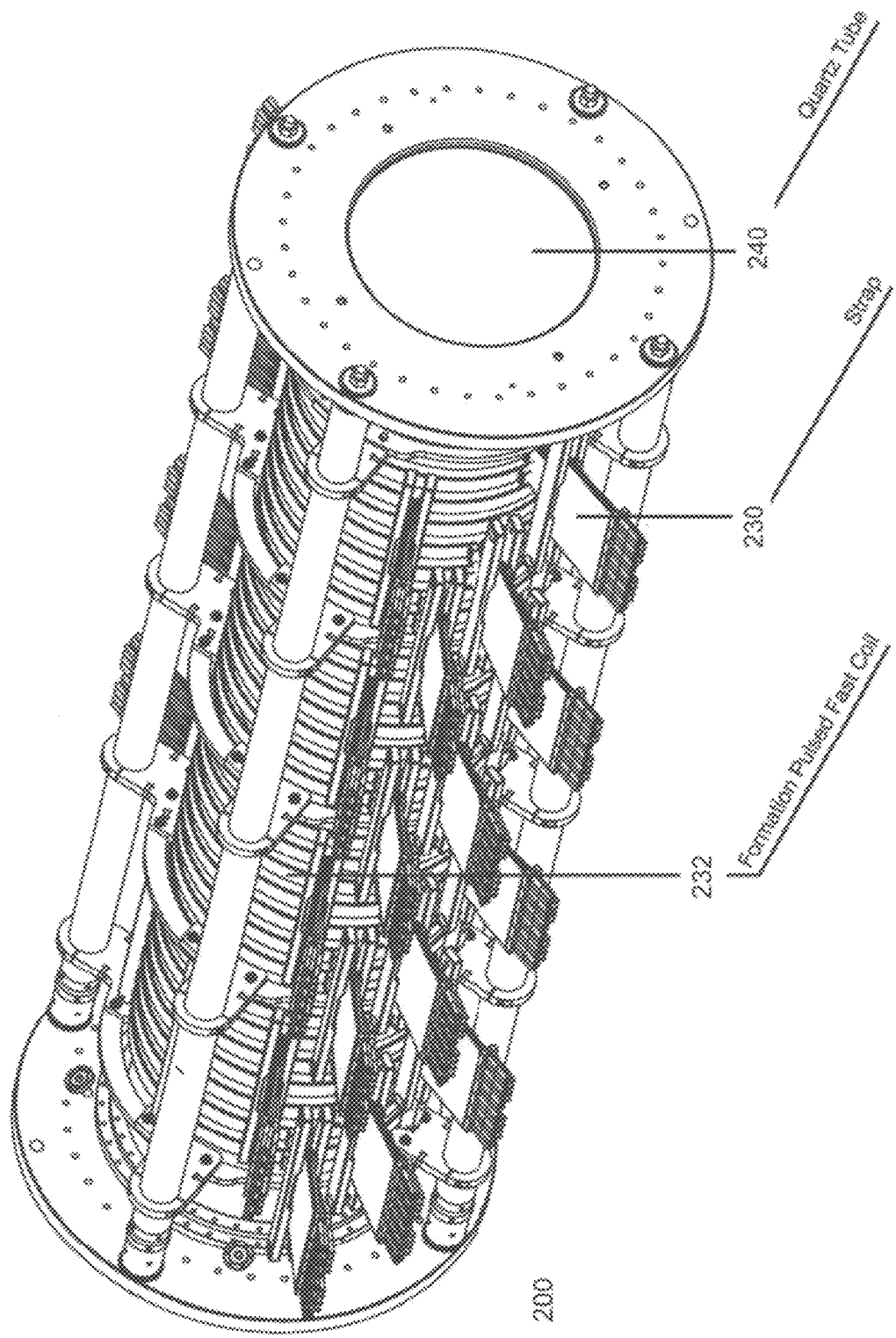
FIG. 6 illustrates an isometric view of a formation tube assembly.

The reversed-field-theta-pinch formation sections 200 are standard field-reversed-theta-pinches (FRTPs), albeit with an advanced pulsed power formation system discussed in detail below (see FIGS. 4 through 6). Each formation section 200 is made of standard opaque industrial grade quartz tubes that feature a 2 millimeter inner lining of ultrapure quartz. The confinement chamber 100 is made of stainless steel to allow a multitude of radial and tangential ports; it also serves as a flux conserver on the timescale of the experiments described below and limits fast magnetic transients. Vacuums are created and maintained within the FRC system 10 with a set of dry scroll roughing pumps, turbo molecular pumps and cryo pumps.

Magnetic System

The magnetic system 400 is illustrated in FIGS. 2 and 3. FIG. 2, amongst other features, illustrates an FRC magnetic flux and density contours (as functions of the radial and axial coordinates) pertaining to an FRC 450 producible by the FRC system 10. These contours were obtained by a 2-D resistive Hall-MHD numerical simulation using code developed to simulate systems and methods corresponding to the FRC system 10, and agree well with measured experimental data. As seen in FIG. 2, the FRC 450 consists of a torus of closed field lines at the interior 453 of the FRC 450 inside a separatrix 451, and of an annular edge layer 456 on the open field lines 452 just outside the separatrix 451. The edge layer 456 coalesces into jets 454 beyond the FRC length, providing a natural divertor.

Figure 15:
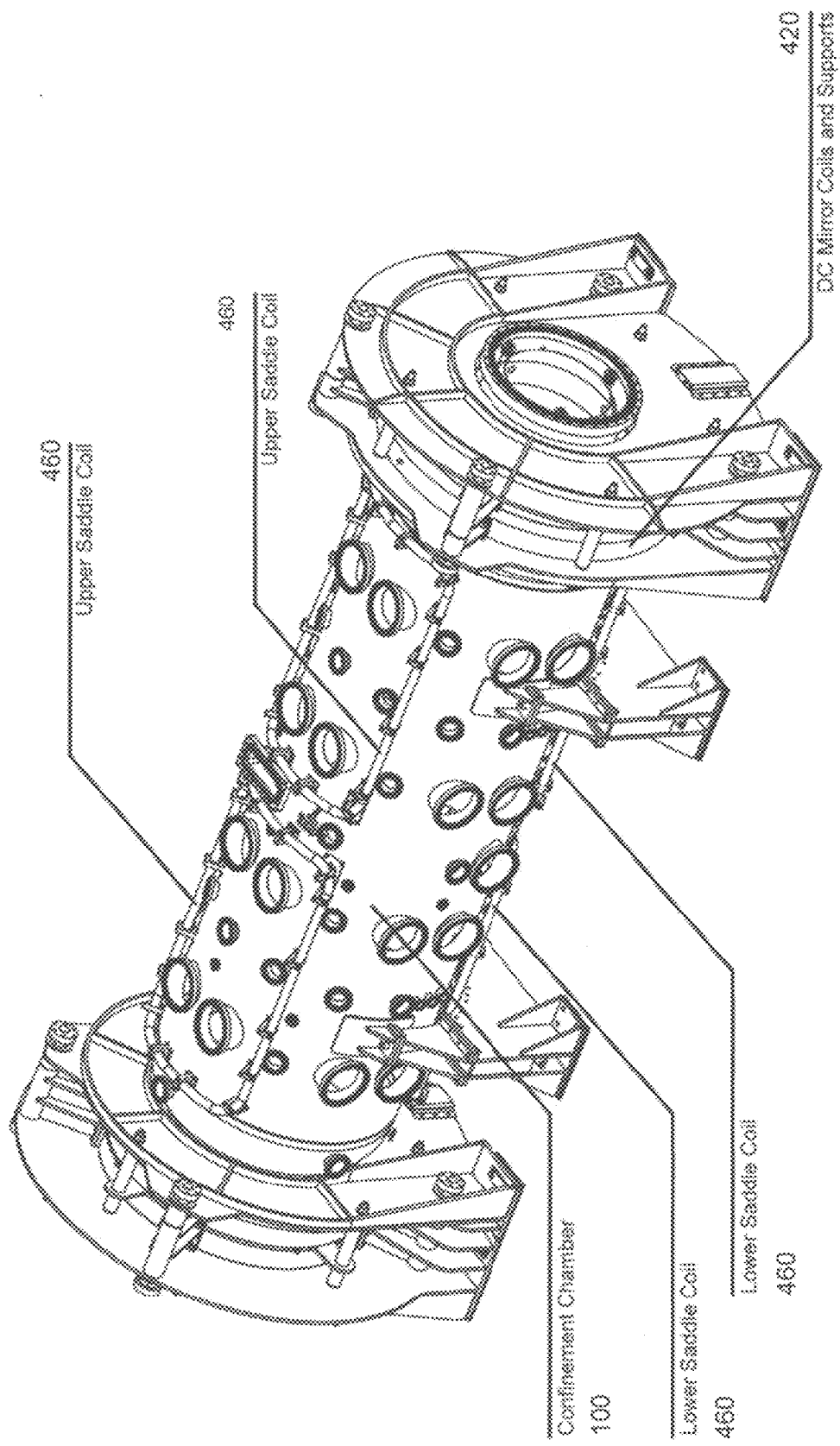
FIG. 15 illustrates an isometric view of the saddle coils mounted outside of the confinement chamber.
Figure 16A:
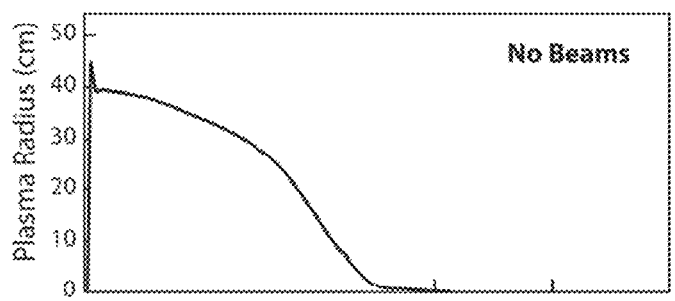
FIGS. 16A, 16B, 16C, and 16D illustrate the correlations of FRC lifetime and pulse length of injected neutral beams. As shown, longer beam pulses produce longer lived FRCs.
Figure 16B:
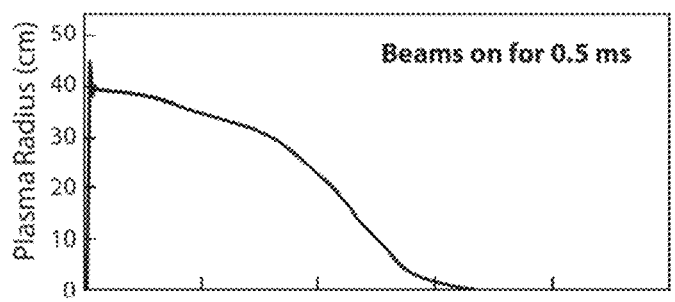
Figure 16C:
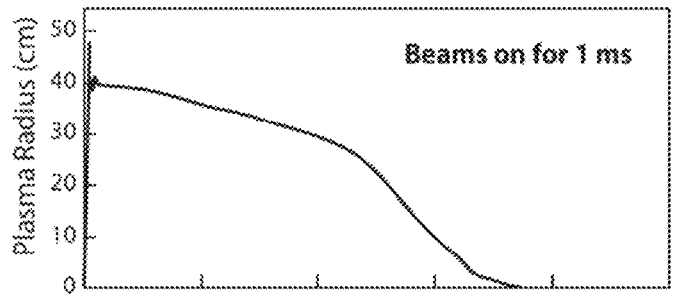
Figure 16D:
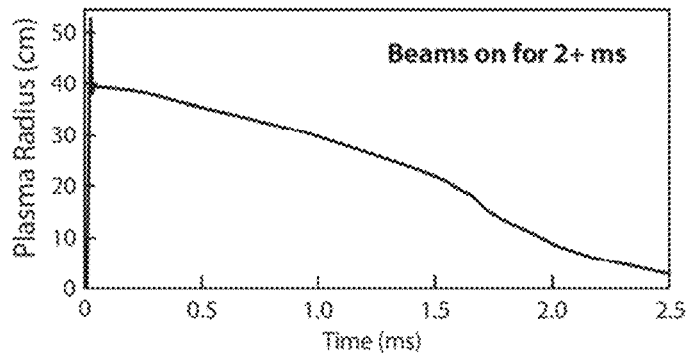
Figure 17A:
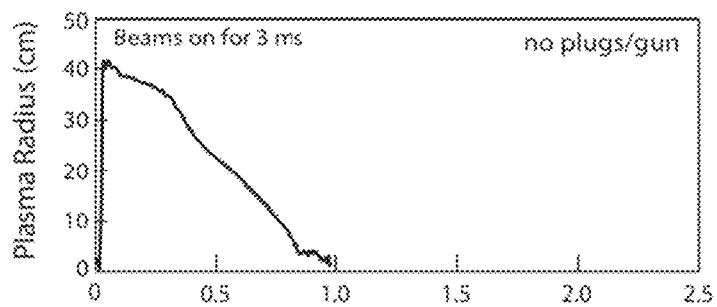
FIGS. 17A, 17B, 17C, and 17D the individual and combined effects of different components of the FRC system on FRC performance and the attainment of the HPF regime.
Figure 17B:
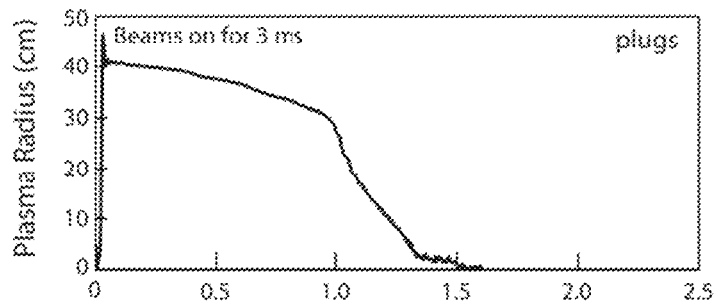
Figure 17C:
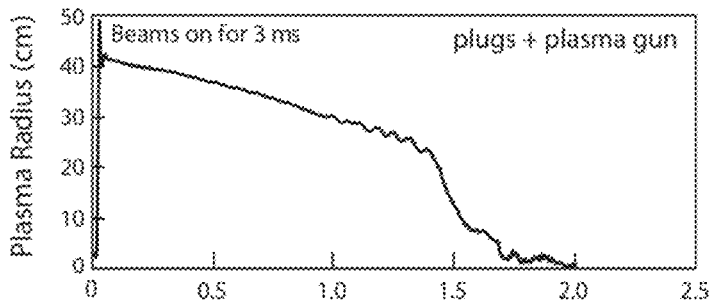
Figure 17D:
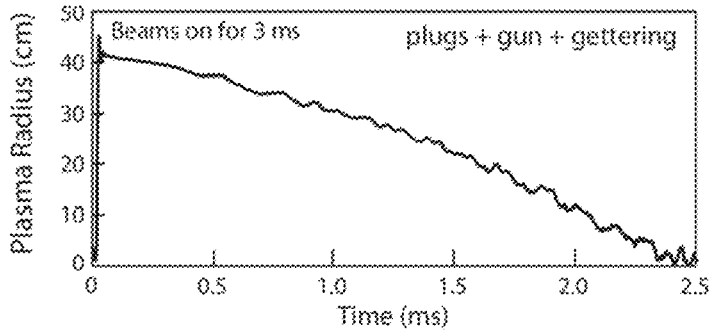

The main magnetic system 410 includes a series of quasi-dc coils 412, 414, and 416 that are situated at particular axial positions along the components, i.e., along the confinement chamber 100, the formation sections 200 and the divertors 300, of the FRC system 10. The quasi-dc coils 412, 414 and 416 are fed by quasi-dc switching power supplies and produce basic magnetic bias fields of about 0.1 T in the confinement chamber 100, the formation sections 200 and the divertors 300. In addition to the quasi-dc coils 412, 414 and 416, the main magnetic system 410 includes quasi-dc mirror coils 420 (fed by switching supplies) between either end of the confinement chamber 100 and the adjacent formation sections 200. The quasi-dc mirror coils 420 provide magnetic mirror ratios of up to 5 and can be independently energized for equilibrium shaping control. In addition, mirror plugs 440, are positioned between each of the formation sections 200 and divertors 300. The mirror plugs 440 comprise compact quasi-dc mirror coils 430 and mirror plug coils 444. The quasi-dc mirror coils 430 include three coils 432, 434 and 436 (fed by switching supplies) that produce additional guide fields to focus the magnetic flux surfaces 455 towards the small diameter passage 442 passing through the mirror plug coils 444. The mirror plug coils 444, which wrap around the small diameter passage 442 and are fed by LC pulsed power circuitry, produce strong magnetic mirror fields of up to 4 T. The purpose of this entire coil arrangement is to tightly bundle and guide the magnetic flux surfaces 455 and end-streaming plasma jets 454 into the remote chambers 310 of the divertors 300. Finally, a set of saddle-coil "antennas" 460 (see FIG. 15) are located outside the confinement chamber 100, two on each side of the mid-plane, and are fed by dc power supplies. The saddle-coil antennas 460 can be configured to provide a quasi-static magnetic dipole or quadrupole field of about 0.01 T for controlling rotational instabilities and/or electron current control. The saddle-coil antennas 460 can flexibly provide magnetic fields that are either symmetric or antisymmetric about the machine's midplane, depending on the direction of the applied currents.

Pulsed Power Formation Systems

The pulsed power formation systems 210 operate on a modified theta-pinch principle. There are two systems that each power one of the formation sections 200. FIGS. 4 through 6 illustrate the main building blocks and arrangement of the formation systems 210. The formation system 210 is composed of a modular pulsed power arrangement that consists of individual units (=skids) 220 that each energize a sub-set of coils 232 of a strap assembly 230 (=straps) that wrap around the formation quartz tubes 240. Each skid 220 is composed of capacitors 221, inductors 223, fast high current switches 225 and associated trigger 222 and dump circuitry 224. In total, each formation system 210 stores between 350-400 kJ of capacitive energy, which provides up to 35 GW of power to form and accelerate the FRCs. Coordinated operation of these components is achieved via a state-of-the-art trigger and control system 222 and 224 that allows synchronized timing between the formation systems 210 on each formation section 200 and minimizes switching jitter to tens of nanoseconds. The advantage of this modular design is its flexible operation: FRCs can be formed in-situ and then accelerated and injected (=static formation) or formed and accelerated at the same time (=dynamic formation).

Neutral Beam Injectors

Figure 3A:
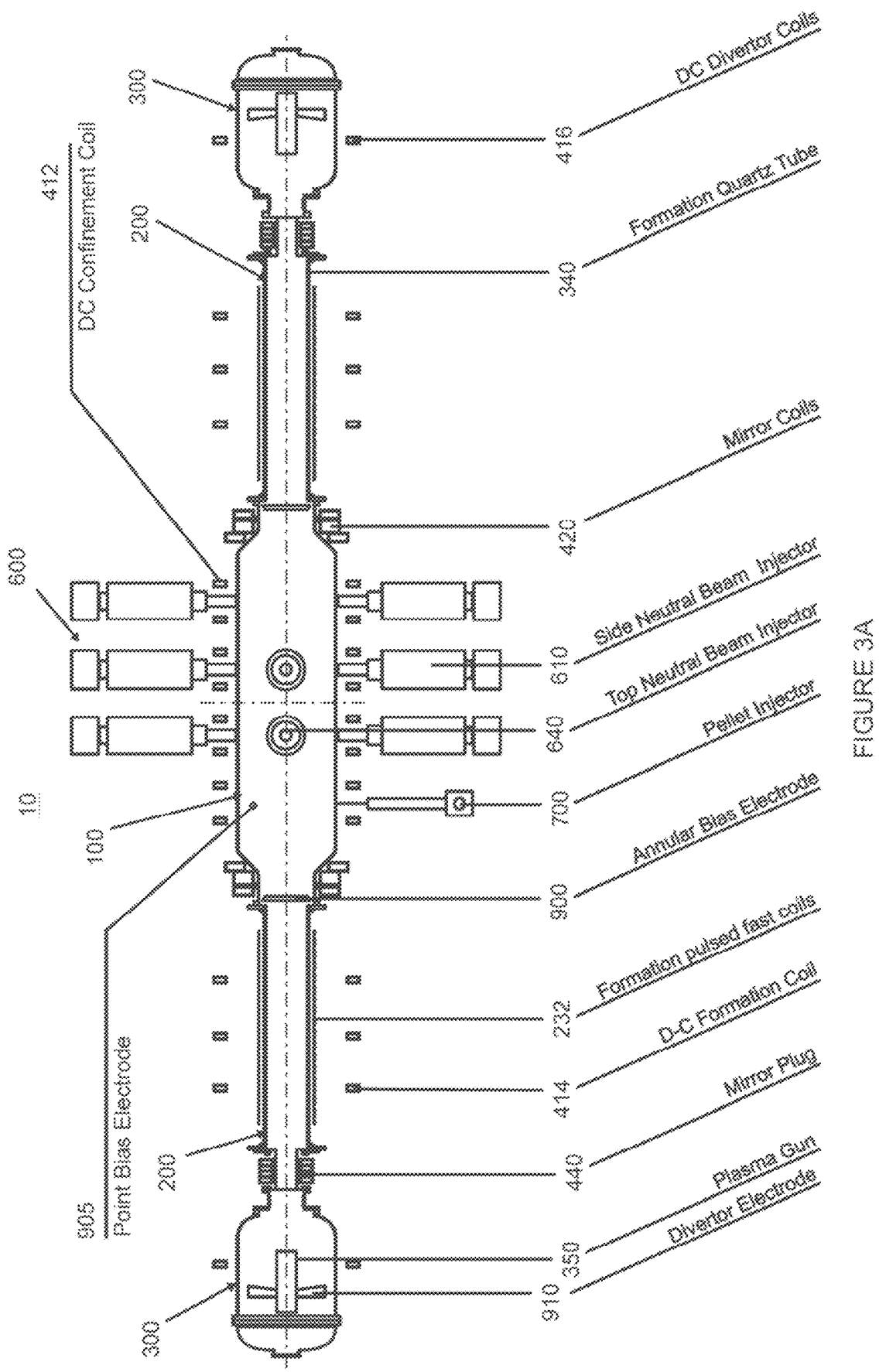
FIG. 3A illustrates the basic layout of the present FRC system as viewed from the top, including the preferred arrangement of the central confinement vessel, formation section, divertors, neutral beams, electrodes, plasma guns, mirror plugs and pellet injector.
Figure 3B:
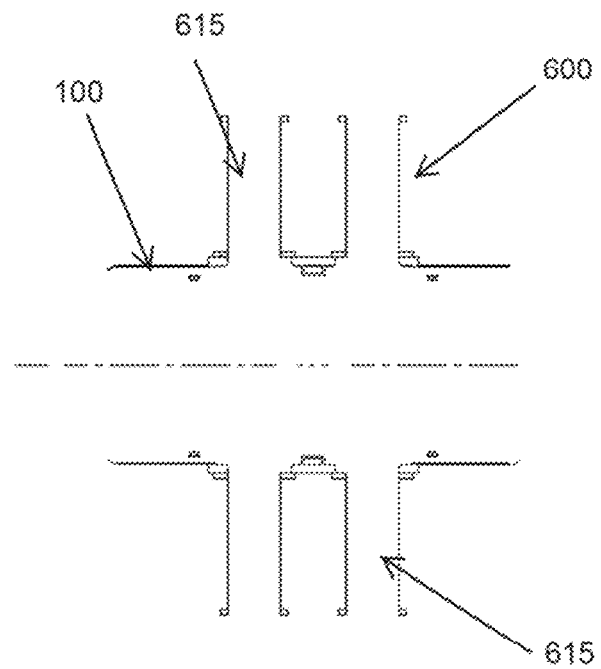
FIG. 3B illustrates the central confinement vessel as viewed from the top and showing the neutral beams arranged at an angle normal to the major axis of symmetry in the central confinement vessel.
Figure 7:
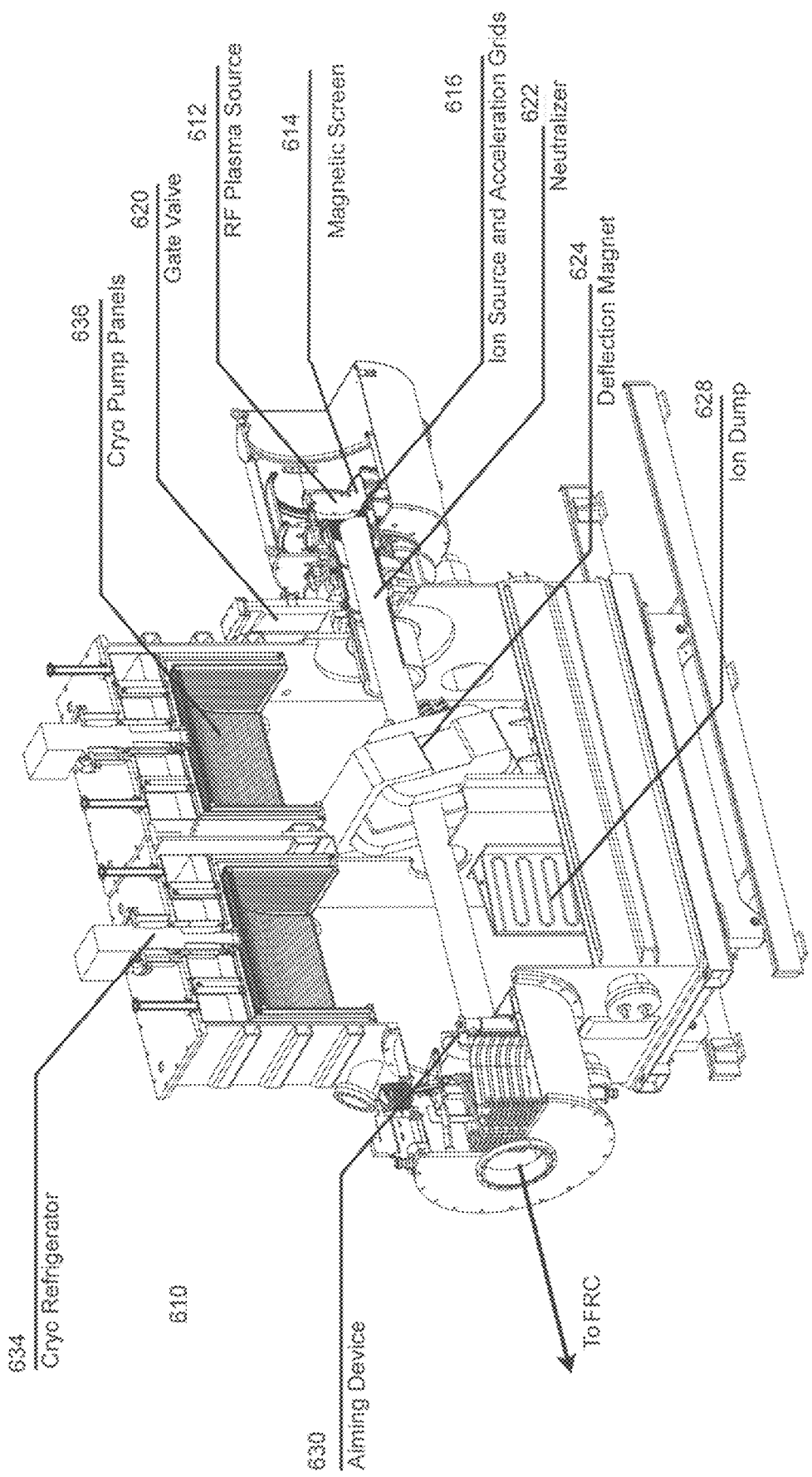
FIG. 7 illustrates a partial sectional isometric view of neutral beam system and key components.
Figure 8:
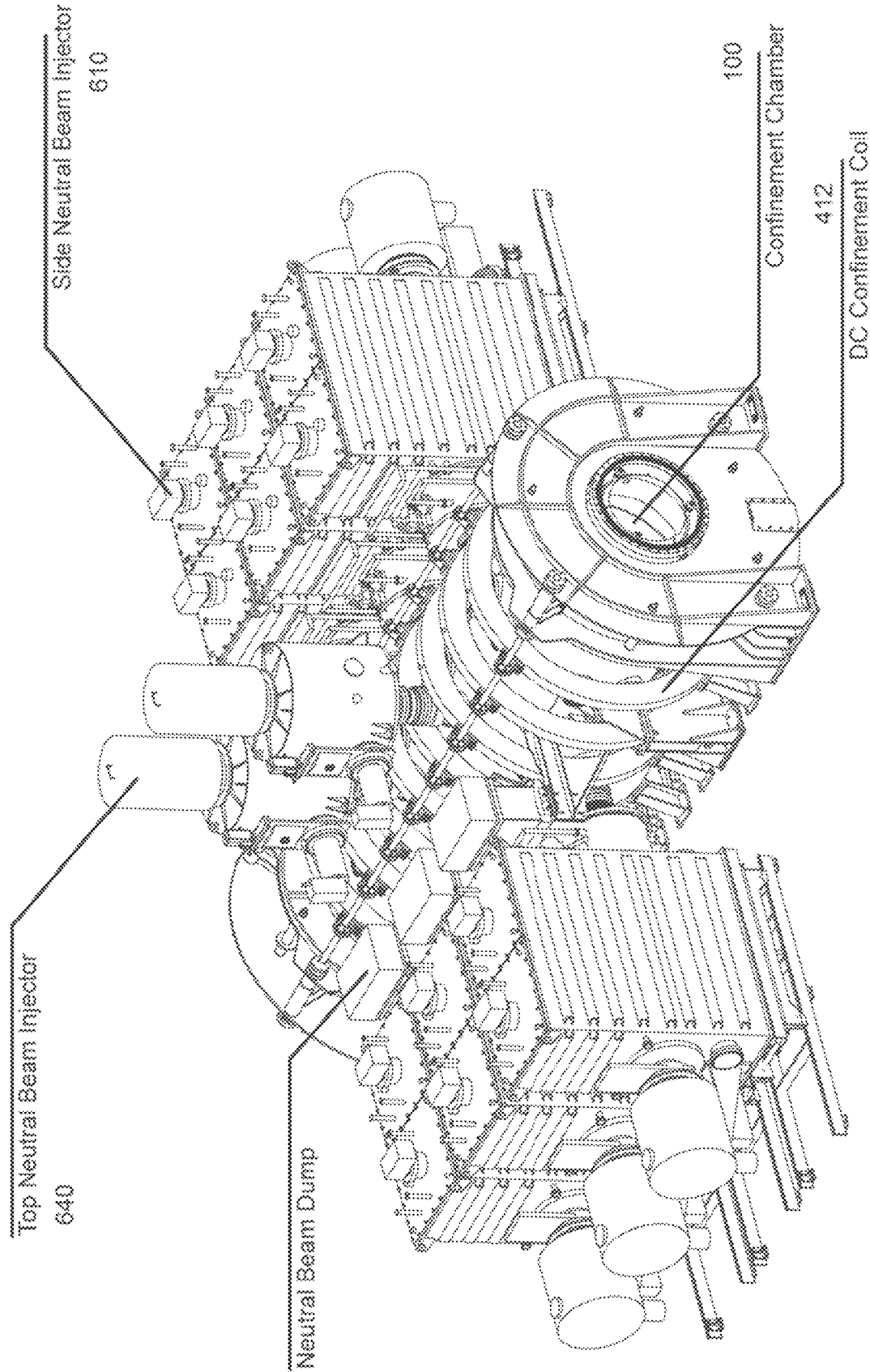
FIG. 8 illustrates an isometric view of the neutral beam arrangement on confinement chamber.

Neutral atom beams 600 are deployed on the FRC system 10 to provide heating and current drive as well as to develop fast particle pressure. As shown in FIGS. 3A, 3B and 8, the individual beam lines comprising neutral atom beam injector systems 610 and 640 are located around the central confinement chamber 100 and inject fast particles tangentially to the FRC plasma (and perpendicular or at an angel normal to the major axis of symmetry in the central confinement vessel 100) with an impact parameter such that the target trapping zone lies well within the separatrix 451 (see FIG. 2). Each injector system 610 and 640 is capable of injecting up to 1 MW of neutral beam power into the FRC plasma with particle energies between 20 and 40 keV. The systems 610 and 640 are based on positive ion multi-aperture extraction sources and utilize geometric focusing, inertial cooling of the ion extraction grids and differential pumping. Apart from using different plasma sources, the systems 610 and 640 are primarily differentiated by their physical design to meet their respective mounting locations, yielding side and top injection capabilities. Typical components of these neutral beam injectors are specifically illustrated in FIG. 7 for the side injector systems 610. As shown in FIG. 7, each individual neutral beam system 610 includes an RF plasma source 612 at an input end (this is substituted with an arc source in systems 640) with a magnetic screen 614 covering the end. An ion optical source and acceleration grids 616 is coupled to the plasma source 612 and a gate valve 620 is positioned between the ion optical source and acceleration grids 616 and a neutralizer 622. A deflection magnet 624 and an ion dump 628 are located between the neutralizer 622 and an aiming device 630 at the exit end. A cooling system comprises two cryo-refrigerators 634, two cryopanels 636 and a LN2 shroud 638. This flexible design allows for operation over a broad range of FRC parameters.

Figure 3C:
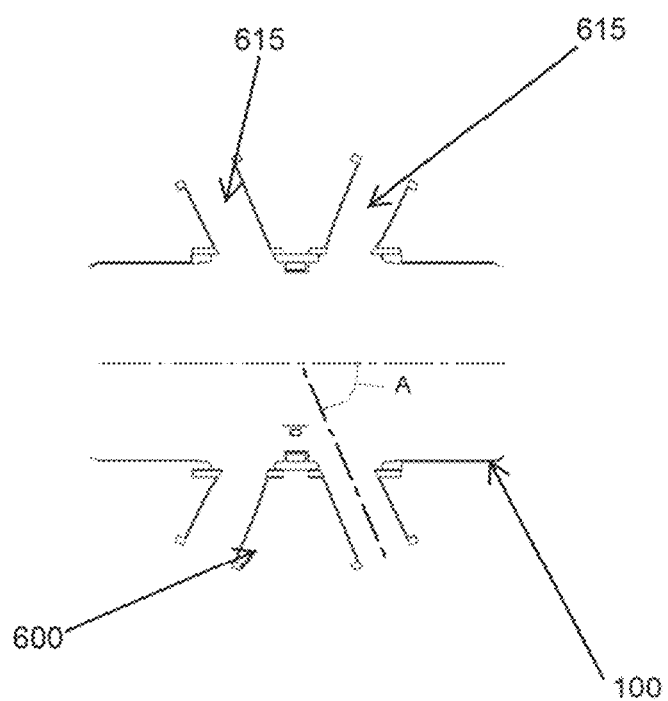
FIG. 3C illustrates the central confinement vessel as viewed from the top and showing the neutral beams arranged at an angle less than normal to the major axis of symmetry in the central confinement vessel and directed to inject particles toward the mid-plane of the central confinement vessel.

An alternative configuration for the neutral atom beam injectors 600 is that of injecting the fast particles tangentially to the FRC plasma, but with an angle A less than 90° relative to the major axis of symmetry in the central confinement vessel 100. These types of orientation of the beam injectors 615 are shown in FIG. 3C. In addition, the beam injectors 615 may be oriented such that the beam injectors 615 on either side of the mid-plane of the central confinement vessel 100 inject their particles towards the mid-plane.

Finally, the axial position of these beam systems 600 may be chosen closer to the mid-plane. These alternative injection embodiments facilitate a more central fueling option, which provides for better coupling of the beams and higher trapping efficiency of the injected fast particles. Furthermore, depending on the angle and axial position, this arrangement of the beam injectors 615 allows more direct and independent control of the axial elongation and other characteristics of the FRC 450. For instance, injecting the beams at a shallow angle A relative to the vessel's major axis of symmetry will create an FRC plasma with longer axial extension and lower temperature while picking a more perpendicular angle A will lead to an axially shorter but hotter plasma. In this fashion the injection angle A and location of the beam injectors 615 can be optimized for different purposes. In addition, such angling and positioning of the beam injectors 615 can allow beams of higher energy (which is generally more favorable for depositing more power with less beam divergence) to be injected into lower magnetic fields than would otherwise be necessary to trap such beams. This is due to the fact that it is the azimuthal component of the energy that determines fast ion orbit scale (which becomes progressively smaller as the injection angle relative to the vessel's major axis of symmetry is reduced at constant beam energy). Furthermore, angled injection towards the mid-plane and with axial beam positions close to the mid-plane improves beam-plasma coupling, even as the FRC plasma shrinks or otherwise axially contracts during the injection period.

Figure 3D:
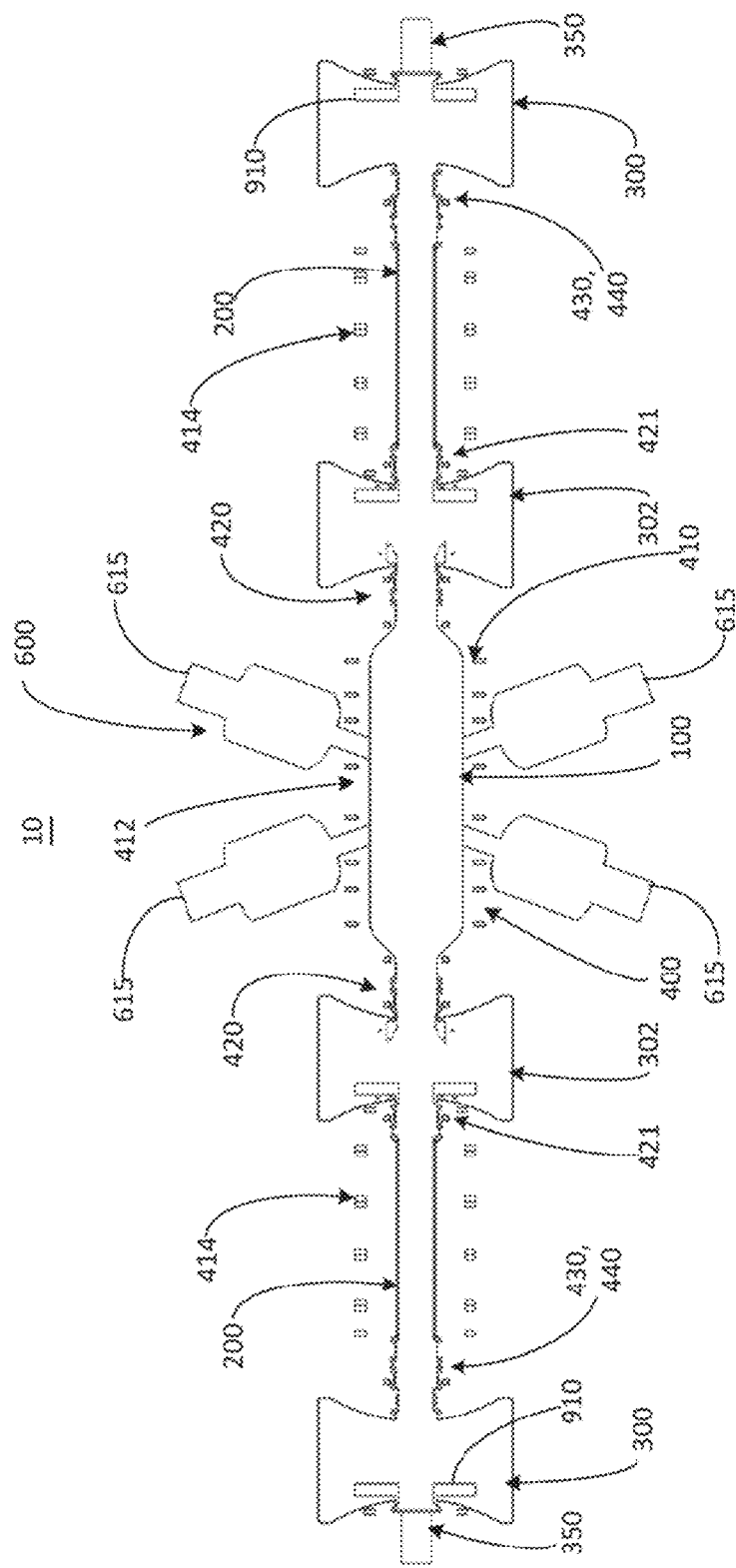
FIGS. 3D and 3E illustrate top and perspective views, respectively, of the basic layout of an alternative embodiment of the present FRC system, including the preferred arrangement of the central confinement vessel, formation section, inner and outer divertors, neutral beams arranged at an angle less than normal to the major axis of symmetry in the central confinement vessel, electrodes, plasma guns and mirror plugs.
Figure 3E:
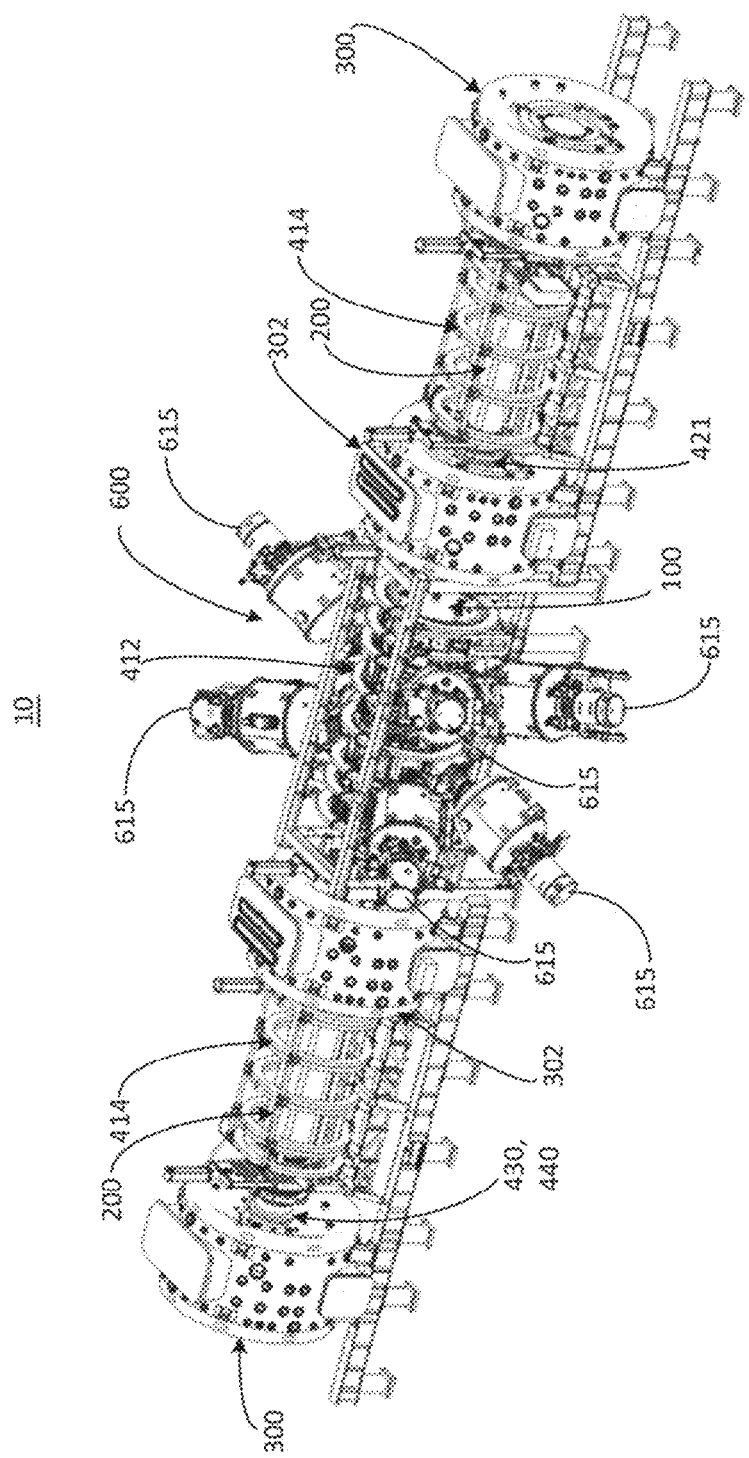

Turning to FIGS. 3D and 3E, another alternative configuration of the FRC system 10 includes inner divertors 302 in addition to the angled beam injectors 615. The inner divertors 302 are positioned between the formation sections 200 and the confinement chamber 100, and are configured and operate substantially similar to the outer divertors 300. The inner divertors 302, which include fast switching magnetic coils therein, are effectively inactive during the formation process to enable the formation FRCs to pass through the inner divertors 302 as the formation FRCs translate toward the mid-plane of the confinement chamber 100. Once the formation FRCs pass through the inner divertors 302 into the confinement chamber 100, the inner divertors are activated to operate substantially similar to the outer divertors and isolate the confinement chamber 100 from the formation sections 200.

Pellet Injector

To provide a means to inject new particles and better control FRC particle inventory, a 12-barrel pellet injector 700 (see e.g. I. Vinyar et al., "Pellet Injectors Developed at PELIN for JET, TAE, and HL-2A," Proceedings of the 26$^{th}$ Fusion Science and Technology Symposium, 09/27 to 10/01 (2010)) is utilized on FRC system 10. FIG. 3 illustrates the layout of the pellet injector 700 on the FRC system 10. The cylindrical pellets (D~1 mm, L~1-2 mm) are injected into the FRC with a velocity in the range of 150-250 km/s. Each individual pellet contains about $5 \times 10^{19}$ hydrogen atoms, which is comparable to the FRC particle inventory.

Gettering Systems

It is well known that neutral halo gas is a serious problem in all confinement systems. The charge exchange and recycling (release of cold impurity material from the wall) processes can have a devastating effect on energy and particle confinement. In addition, any significant density of neutral gas at or near the edge will lead to prompt losses of or at least severely curtail the lifetime of injected large orbit (high energy) particles (large orbit refers to particles having orbits on the scale of the FRC topology or at least orbit radii much larger than the characteristic magnetic field gradient length scale)—a fact that is detrimental to all energetic plasma applications, including fusion via auxiliary beam heating.

Figure 9:
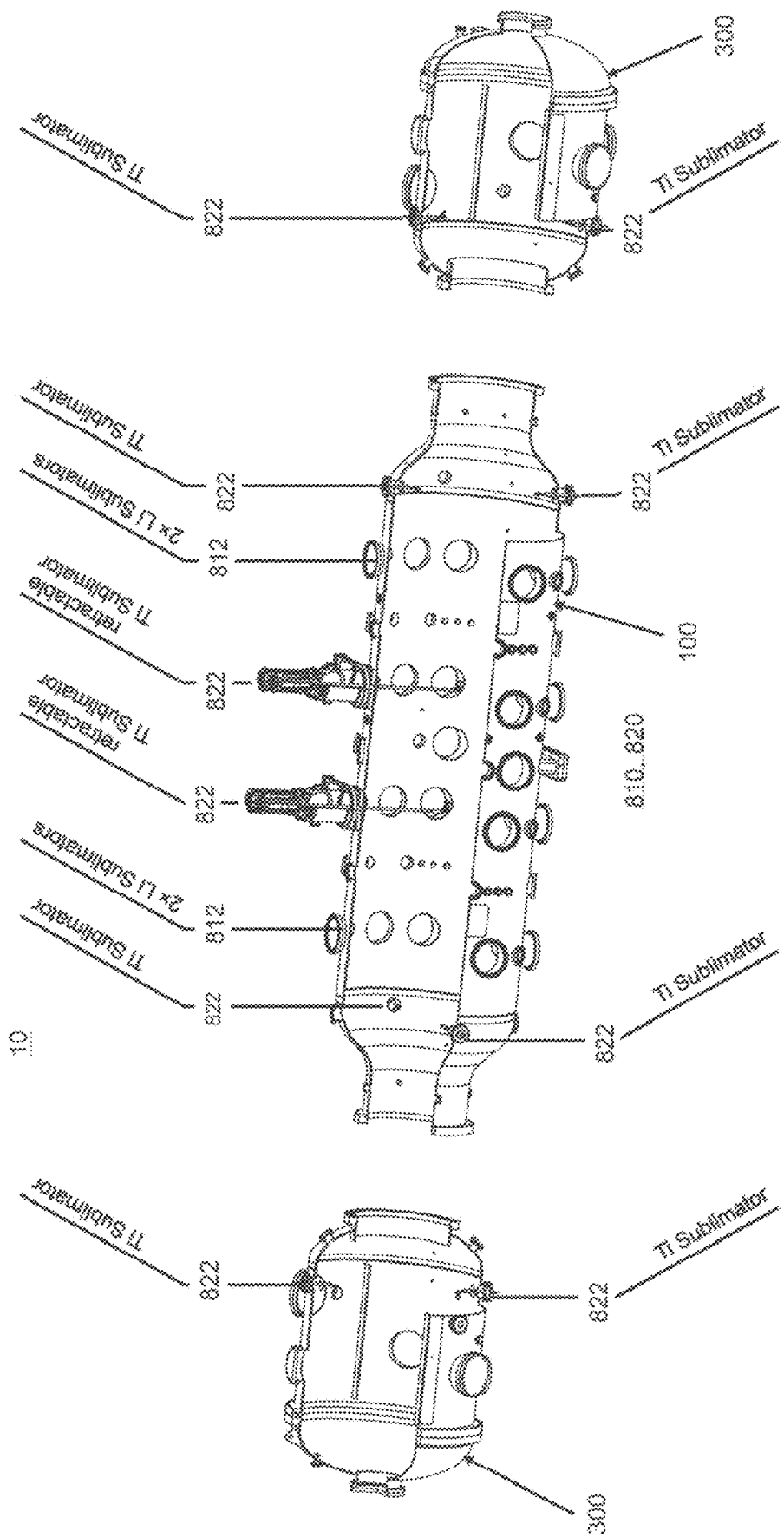
FIG. 9 illustrates a partial sectional isometric view of a preferred arrangement of the Ti and Li gettering systems.

Surface conditioning is a means by which the detrimental effects of neutral gas and impurities can be controlled or reduced in a confinement system. To this end the FRC system 10 provided herein employs Titanium and Lithium deposition systems 810 and 820 that coat the plasma facing surfaces of the confinement chamber (or vessel) 100 and divertors 300 and 302 with films (tens of micrometers thick) of Ti and/or Li. The coatings are achieved via vapor deposition techniques. Solid Li and/or Ti are evaporated and/or sublimated and sprayed onto nearby surfaces to form the coatings. The sources are atomic ovens with guide nozzles (in case of Li) 822 or heated spheres of solid with guide shrouding (in case of Ti) 812. Li evaporator systems typically operate in a continuous mode while Ti sublimators are mostly operated intermittently in between plasma operation. Operating temperatures of these systems are above 600° C. to obtain fast deposition rates. To achieve good wall coverage, multiple strategically located evaporator/sublimator systems are necessary. FIG. 9 details a preferred arrangement of the gettering deposition systems 810 and 820 in the FRC system 10. The coatings act as gettering surfaces and effectively pump atomic and molecular hydrogenic species (H and D). The coatings also reduce other typical impurities such as Carbon and Oxygen to insignificant levels.

Mirror Plugs

As stated above, the FRC system 10 employs sets of mirror coils 420, 430, and 444 as shown in FIGS. 2 and 3. A first set of mirror coils 420 is located at the two axial ends of the confinement chamber 100 and is independently energized from the DC confinement, formation and divertor coils 412, 414 and 416 of the main magnetic system 410. The first set of mirror coils 420 primarily helps to steer and axially contain the FRC 450 during merging and provides equilibrium shaping control during sustainment. The first mirror coil set 420 produces nominally higher magnetic fields (around 0.4 to 0.5 T) than the central confinement field produced by the central confinement coils 412. The second set of mirror coils 430, which includes three compact quasi-dc mirror coils 432, 434 and 436, is located between the formation sections 200 and the divertors 300 and are driven by a common switching power supply. The mirror coils 432, 434 and 436, together with the more compact pulsed mirror plug coils 444 (fed by a capacitive power supply) and the physical constriction 442 form the mirror plugs 440 that provide a narrow low gas conductance path with very high magnetic fields (between 2 to 4 T with rise times of about 10 to 20 ms). The most compact pulsed mirror coils 444 are of compact radial dimensions, bore of 20 cm and similar length, compared to the meter-plus-scale bore and pancake design of the confinement coils 412, 414 and 416. The purpose of the mirror plugs 440 is multifold: (1) The coils 432, 434, 436 and 444 tightly bundle and guide the magnetic flux surfaces 452 and end-streaming plasma jets 454 into the remote divertor chambers 300. This assures that the exhaust particles reach the divertors 300 appropriately and that there are continuous flux surfaces 455 that trace from the open field line 452 region of the central FRC 450 all the way to the divertors 300. (2) The physical constrictions 442 in the FRC system 10, through which that the coils 432, 434, 436 and 444 enable passage of the magnetic flux surfaces 452 and plasma jets 454, provide an impediment to neutral gas flow from the plasma guns 350 that sit in the divertors 300. In the same vein, the constrictions 442 prevent back-streaming of gas from the formation sections 200 to the divertors 300 thereby reducing the number of neutral particles that has to be introduced into the entire FRC system 10 when commencing the startup of an FRC. (3) The strong axial mirrors produced by the coils 432, 434, 436 and 444 reduce axial particle losses and thereby reduce the parallel particle diffusivity on open field lines.

In the alternative configuration shown in FIGS. 3D and 3E, a set of low profile necking coils 421 are positions between the inner divertors 302 and the formations sections 200.

Axial Plasma Guns

Figure 10:
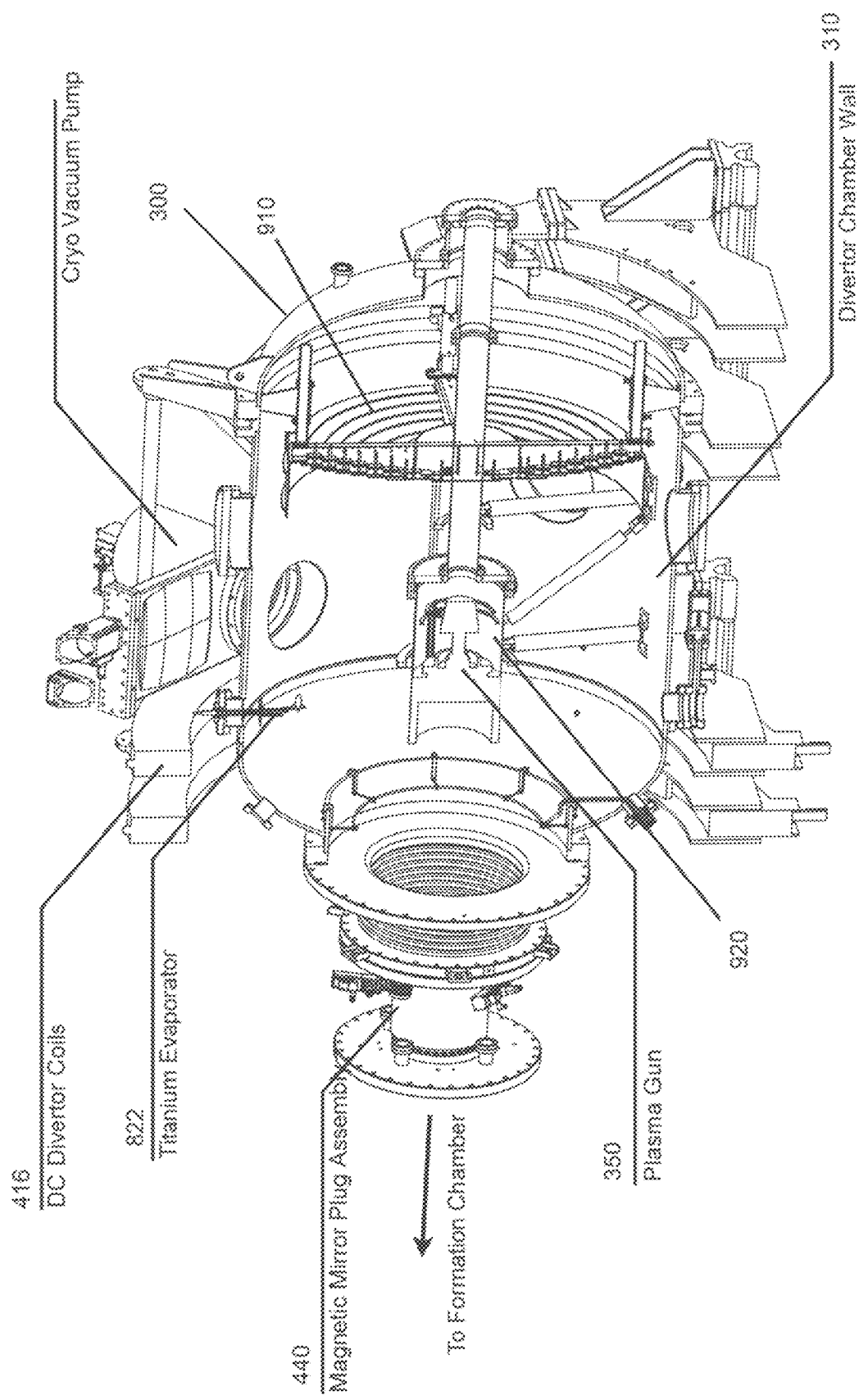
FIG. 10 illustrates a partial sectional isometric view of a plasma gun installed in the divertor chamber. Also shown are the associated magnetic mirror plug and a divertor electrode assembly.

Plasma streams from guns 350 mounted in the divertor chambers 310 of the divertors 300 are intended to improve stability and neutral beam performance. The guns 350 are mounted on axis inside the chamber 310 of the divertors 300 as illustrated in FIGS. 3 and 10 and produce plasma flowing along the open flux lines 452 in the divertor 300 and towards the center of the confinement chamber 100. The guns 350 operate at a high density gas discharge in a washer-stack channel and are designed to generate several kiloamperes of fully ionized plasma for 5 to 10 ms. The guns 350 include a pulsed magnetic coil that matches the output plasma stream with the desired size of the plasma in the confinement chamber 100. The technical parameters of the guns 350 are characterized by a channel having a 5 to 13 cm outer diameter and up to about 10 cm inner diameter and provide a discharge current of 10-15 kA at 400-600 V with a gun-internal magnetic field of between 0.5 to 2.3 T.

The gun plasma streams can penetrate the magnetic fields of the mirror plugs 440 and flow into the formation section 200 and confinement chamber 100. The efficiency of plasma transfer through the mirror plug 440 increases with decreasing distance between the gun 350 and the plug 440 and by making the plug 440 wider and shorter. Under reasonable conditions, the guns 350 can each deliver approximately $10^{22}$ protons/s through the 2 to 4 T mirror plugs 440 with high ion and electron temperatures of about 150 to 300 eV and about 40 to 50 eV, respectively. The guns 350 provide significant refueling of the FRC edge layer 456, and an improved overall FRC particle confinement.

To further increase the plasma density, a gas box could be utilized to puff additional gas into the plasma stream from the guns 350. This technique allows a several-fold increase in the injected plasma density. In the FRC system 10, a gas box installed on the divertor 300 side of the minor plugs 440 improves the refueling of the FRC edge layer 456, formation of the FRC 450, and plasma line-tying.

Given all the adjustment parameters discussed above and also taking into account that operation with just one or both guns is possible, it is readily apparent that a wide spectrum of operating modes is accessible.

Biasing Electrodes

Electrical biasing of open flux surfaces can provide radial potentials that give rise to azimuthal EXB motion that provides a control mechanism, analogous to turning a knob, to control rotation of the open field line plasma as well as the actual FRC core 450 via velocity shear. To accomplish this control, the FRC system 10 employs various electrodes strategically placed in various parts of the machine. FIG. 3 depicts biasing electrodes positioned at preferred locations within the FRC system 10.

Figure 11:
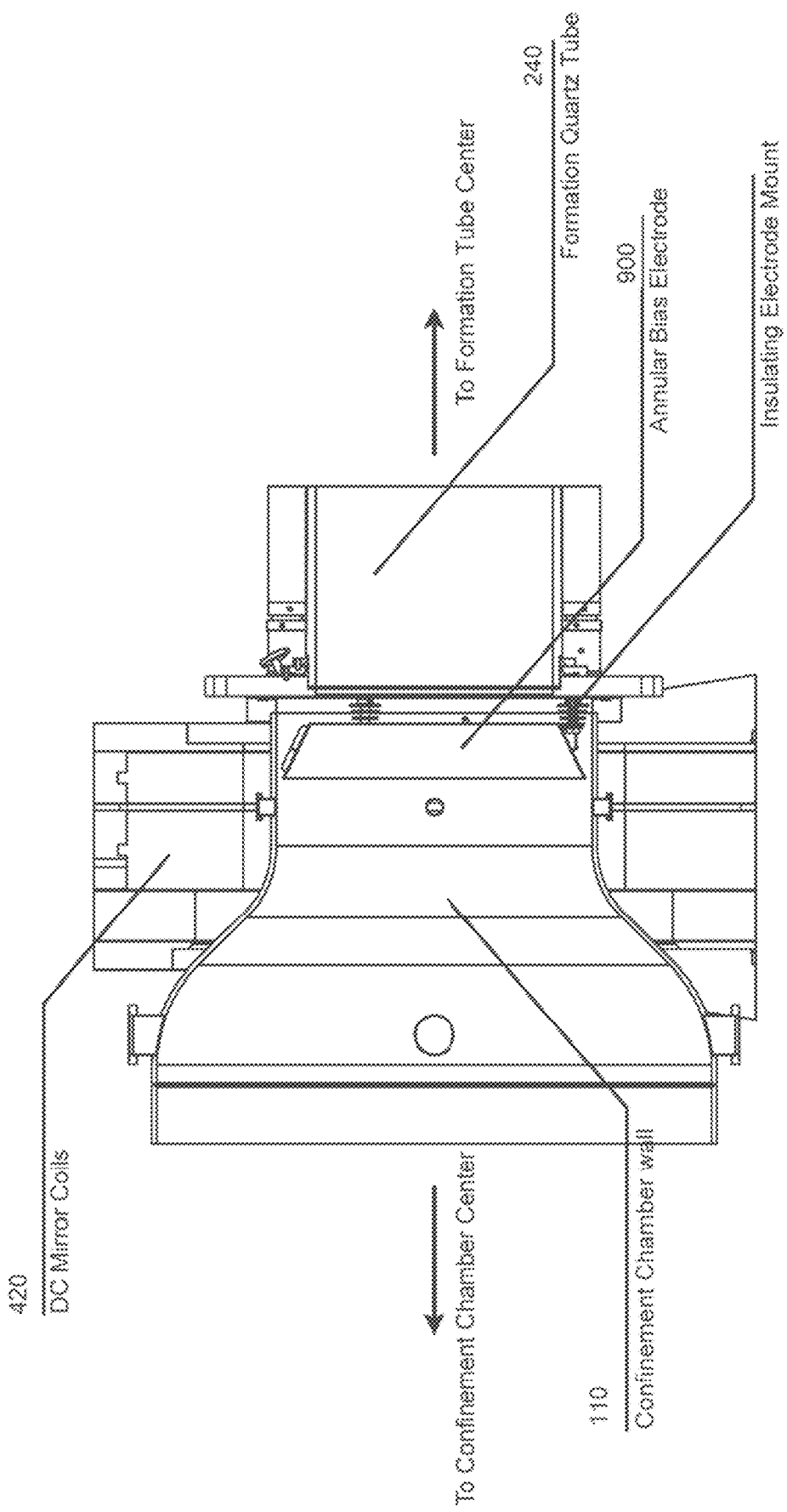
FIG. 11 illustrates a preferred layout of an annular bias electrode at the axial end of the confinement chamber.

In principle, there are 4 classes of electrodes: (1) point electrodes 905 in the confinement chamber 100 that make contact with particular open field lines 452 in the edge of the FRC 450 to provide local charging, (2) annular electrodes 900 between the confinement chamber 100 and the formation sections 200 to charge far-edge flux layers 456 in an azimuthally symmetric fashion, (3) stacks of concentric electrodes 910 in the divertors 300 to charge multiple concentric flux layers 455 (whereby the selection of layers is controllable by adjusting coils 416 to adjust the divertor magnetic field so as to terminate the desired flux layers 456 on the appropriate electrodes 910), and finally (4) the anodes 920 (see FIG. 10) of the plasma guns 350 themselves (which intercept inner open flux surfaces 455 near the separatrix of the FRC 450). FIGS. 10 and 11 show some typical designs for some of these.

In all cases these electrodes are driven by pulsed or dc power sources at voltages up to about 800 V. Depending on electrode size and what flux surfaces are intersected, currents can be drawn in the kilo-ampere range.

Un-Sustained Operation of FRC System—Conventional Regime

The standard plasma formation on the FRC system 10 follows the well-developed reversed-field-theta-pinch technique. A typical process for starting up an FRC commences by driving the quasi-dc coils 412, 414, 416, 420, 432, 434 and 436 to steady state operation. The RFTP pulsed power circuits of the pulsed power formation systems 210 then drive the pulsed fast reversed magnet field coils 232 to create a temporary reversed bias of about −0.05 T in the formation sections 200. At this point a predetermined amount of neutral gas at 9-20 psi is injected into the two formation volumes defined by the quartz-tube chambers 240 of the (north and south) formation sections 200 via a set of azimuthally-oriented puff-vales at flanges located on the outer ends of the formation sections 200. Next a small RF (~hundreds of kilo-hertz) field is generated from a set of antennas on the surface of the quartz tubes 240 to create pre-ionization in the form of local seed ionization regions within the neutral gas columns. This is followed by applying a theta-ringing modulation on the current driving the pulsed fast reversed magnet field coils 232, which leads to more global pre-ionization of the gas columns. Finally, the main pulsed power banks of the pulsed power formation systems 210 are fired to drive pulsed fast reversed magnet field coils 232 to create a forward-biased field of up to 0.4 T. This step can be time-sequenced such that the forward-biased field is generated uniformly throughout the length of the formation tubes 240 (static formation) or such that a consecutive peristaltic field modulation is achieved along the axis of the formation tubes 240 (dynamic formation).

In this entire formation process, the actual field reversal in the plasma occurs rapidly, within about 5 μs. The multi-gigawatt pulsed power delivered to the forming plasma readily produces hot FRCs which are then ejected from the formation sections 200 via application of either a time-sequenced modulation of the forward magnetic field (magnetic peristalsis) or temporarily increased currents in the last coils of coil sets 232 near the axial outer ends of the formation tubes 210 (forming an axial magnetic field gradient that points axially towards the confinement chamber 100). The two (north and south) formation FRCs so formed and accelerated then expand into the larger diameter confinement chamber 100, where the quasi-dc coils 412 produce a forward-biased field to control radial expansion and provide the equilibrium external magnetic flux.

Once the north and south formation FRCs arrive near the midplane of the confinement chamber 100, the FRCs collide. During the collision the axial kinetic energies of the north and south formation FRCs are largely thermalized as the FRCs merge ultimately into a single FRC 450. A large set of plasma diagnostics are available in the confinement chamber 100 to study the equilibria of the FRC 450. Typical operating conditions in the FRC system 10 produce compound FRCs with separatrix radii of about 0.4 m and about 3 m axial extend. Further characteristics are external magnetic fields of about 0.1 T, plasma densities around $5\times10^{19}$ $m^{-3}$ and total plasma temperature of up to 1 keV. Without any sustainment, i.e., no heating and/or current drive via neutral beam injection or other auxiliary means, the lifetime of these FRCs is limited to about 1 ms, the indigenous characteristic configuration decay time.

Experimental Data of Unsustained Operation—Conventional Regime

Figure 12:
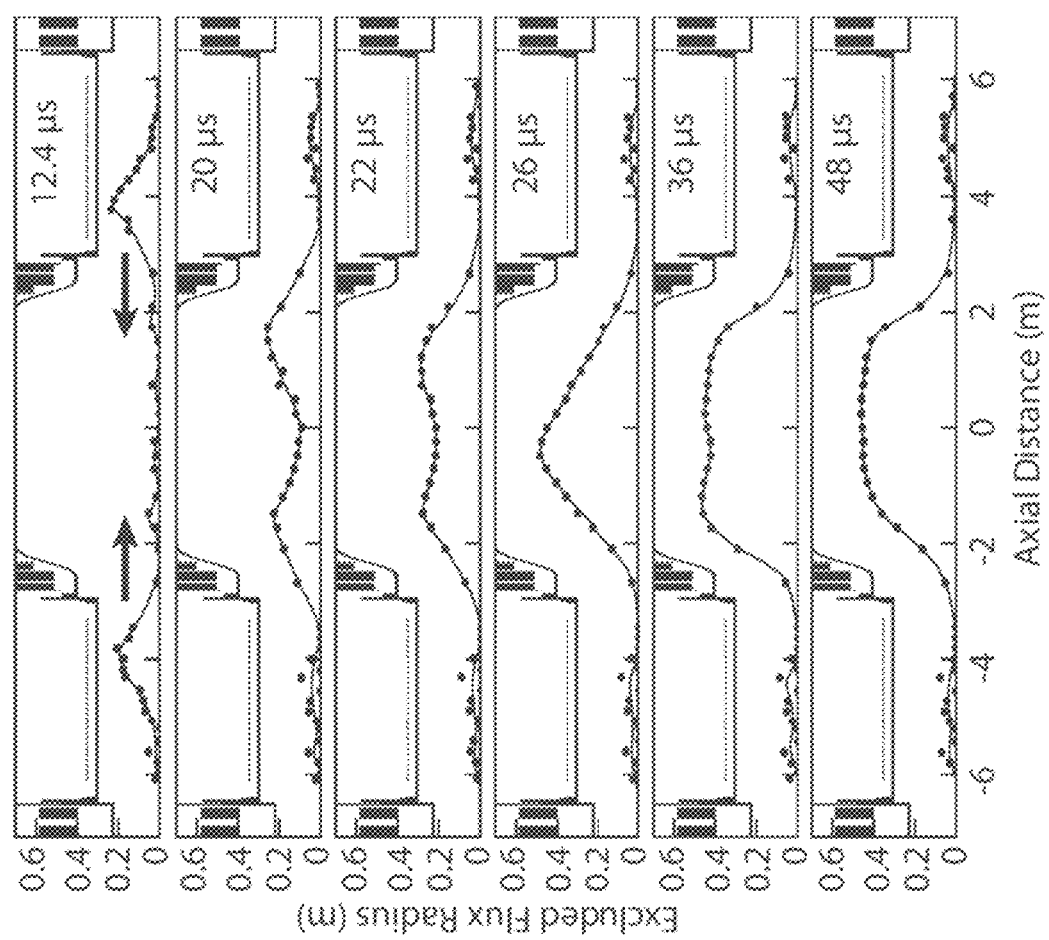
FIG. 12 illustrates the evolution of the excluded flux radius in the FRC system obtained from a series of external diamagnetic loops at the two field reversed theta pinch formation sections and magnetic probes embedded inside the central metal confinement chamber. Time is measured from the instant of synchronized field reversal in the formation sources, and distance z is given relative to the axial midplane of the machine.

FIG. 12 shows a typical time evolution of the excluded flux radius, $r_{\Delta\Phi}$, which approximates the separatrix radius, $r_s$, to illustrate the dynamics of the theta-pinch merging process of the FRC 450. The two (north and south) individual plasmoids are produced simultaneously and then accelerated out of the respective formation sections 200 at a supersonic speed, $v_z$~250 km/s, and collide near the midplane at z=0. During the collision the plasmoids compress axially, followed by a rapid radial and axial expansion, before eventually merging to form an FRC 450. Both radial and axial dynamics of the merging FRC 450 are evidenced by detailed density profile measurements and bolometer-based tomography.

Figures 13A, 13B, 13C, 13D:
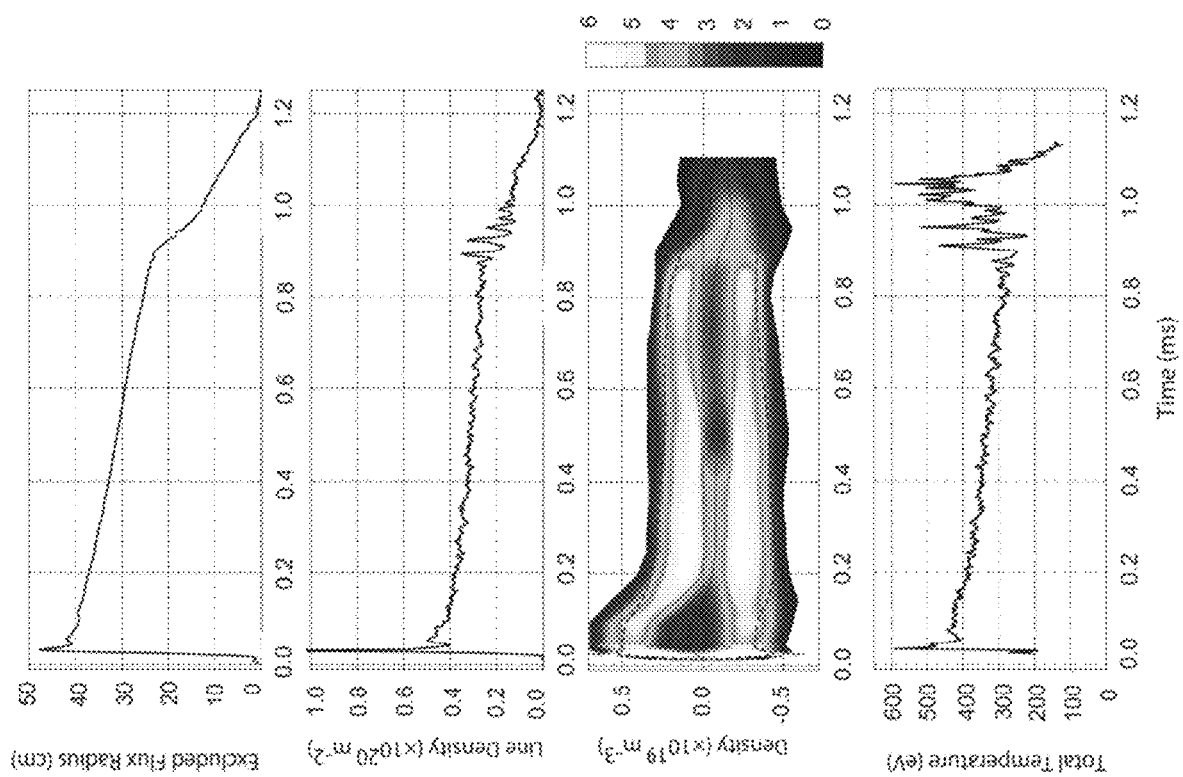
FIGS. 13A, 13B, 13C, and 13D illustrate data from a representative non-HPF, un-sustained discharge on the present FRC system. Shown as functions of time are (FIG. 13A) excluded flux radius at the midplane, (FIG. 13B) 6 chords of line-integrated density from the midplane CO2 interferometer, (FIG. 13C) Abel-inverted density radial profiles from the CO2 interferometer data, and (FIG. 13D) total plasma temperature from pressure balance.

Data from a representative un-sustained discharge of the FRC system 10 are shown as functions of time in FIGS. 13A, 13B, 13C, and 13D. The FRC is initiated at t=0. The excluded flux radius at the machine's axial mid-plane is shown in FIG. 13A. This data is obtained from an array of magnetic probes, located just inside the confinement chamber's stainless steel wall, that measure the axial magnetic field. The steel wall is a good flux conserver on the time scales of this discharge.

Line-integrated densities are shown in FIG. 13B, from a 6-chord $CO_2$/He—Ne interferometer located at z=0. Taking into account vertical (y) FRC displacement, as measured by bolometric tomography, Abel inversion yields the density contours of FIG. 13C. After some axial and radial sloshing during the first 0.1 ms, the FRC settles with a hollow density profile. This profile is fairly flat, with substantial density on axis, as required by typical 2-D FRC equilibria.

Total plasma temperature is shown in FIG. 13D, derived from pressure balance and fully consistent with Thomson scattering and spectroscopy measurements.

Figure 14:
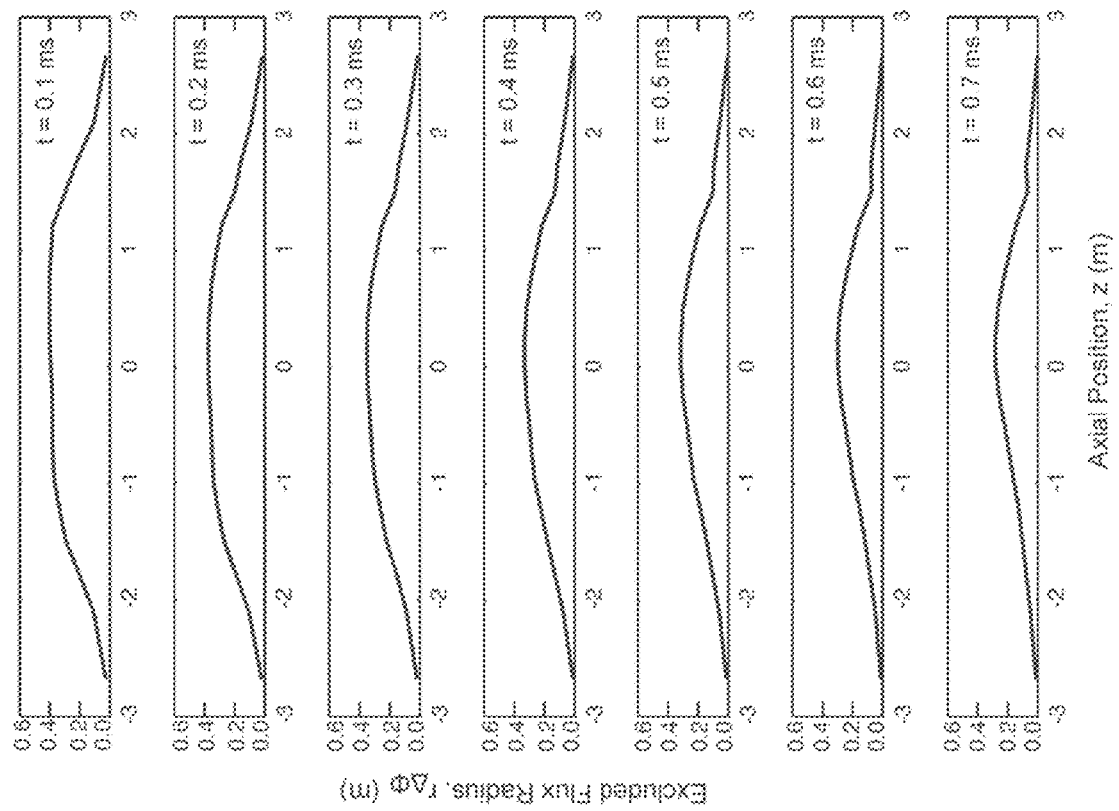
FIG. 14 illustrates the excluded flux axial profiles at selected times for the same discharge of the present FRC system shown in FIG. 13A, 13B, 13C, and 13D.

Analysis from the entire excluded flux array indicates that the shape of the FRC separatrix (approximated by the excluded flux axial profiles) evolves gradually from racetrack to elliptical. This evolution, shown in FIG. 14, is consistent with a gradual magnetic reconnection from two to a single FRC. Indeed, rough estimates suggest that in this particular instant about 10% of the two initial FRC magnetic fluxes reconnects during the collision.

The FRC length shrinks steadily from 3 down to about 1 m during the FRC lifetime. This shrinkage, visible in FIG. 14, suggests that mostly convective energy loss dominates the FRC confinement. As the plasma pressure inside the separatrix decreases faster than the external magnetic pressure, the magnetic field line tension in the end regions compresses the FRC axially, restoring axial and radial equilibrium. For the discharge discussed in FIGS. 13 and 14, the FRC magnetic flux, particle inventory, and thermal energy (about 10 mWb, $7\times10^{19}$ particles, and 7 kJ, respectively) decrease by roughly an order of magnitude in the first millisecond, when the FRC equilibrium appears to subside.

Sustained Operation—HPF Regime

The examples in FIGS. 12 to 14 are characteristic of decaying FRCs without any sustainment. However, several techniques are deployed on the FRC system 10 to further improve FRC confinement (inner core and edge layer) to the HPF regime and sustain the configuration.

Neutral Beams

First, fast (H) neutrals are injected perpendicular to $B_z$ in beams from the eight neutral beam injectors 600. The beams of fast neutrals are injected from the moment the north and south formation FRCs merge in the confinement chamber 100 into one FRC 450. The fast ions, created primarily by charge exchange, have betatron orbits (with primary radii on the scale of the FRC topology or at least much larger than the characteristic magnetic field gradient length scale) that add to the azimuthal current of the FRC 450. After some fraction of the discharge (after 0.5 to 0.8 ms into the shot), a sufficiently large fast ion population significantly improves the inner FRC's stability and confinement properties (see e.g. M. W. Binderbauer and N. Rostoker, Plasma Phys. 56, part 3, 451 (1996)). Furthermore, from a sustainment perspective, the beams from the neutral beam injectors 600 are also the primary means to drive current and heat the FRC plasma.

In the plasma regime of the FRC system 10, the fast ions slow down primarily on plasma electrons. During the early part of a discharge, typical orbit-averaged slowing-down times of fast ions are 0.3-0.5 ms, which results in significant FRC heating, primarily of electrons. The fast ions make large radial excursions outside of the separatrix because the internal FRC magnetic field is inherently low (about 0.03 T on average for a 0.1 T external axial field). The fast ions would be vulnerable to charge exchange loss, if the neutral gas density were too high outside of the separatrix. Therefore, wall gettering and other techniques (such as the plasma gun 350 and mirror plugs 440 that contribute, amongst other things, to gas control) deployed on the FRC system 10 tend to minimize edge neutrals and enable the required build-up of fast ion current.

Pellet Injection

When a significant fast ion population is built up within the FRC 450, with higher electron temperatures and longer FRC lifetimes, frozen H or D pellets are injected into the FRC 450 from the pellet injector 700 to sustain the FRC particle inventory of the FRC 450. The anticipated ablation timescales are sufficiently short to provide a significant FRC particle source. This rate can also be increased by enlarging the surface area of the injected piece by breaking the individual pellet into smaller fragments while in the barrels or injection tubes of the pellet injector 700 and before entering the confinement chamber 100, a step that can be achieved by increasing the friction between the pellet and the walls of the injection tube by tightening the bend radius of the last segment of the injection tube right before entry into the confinement chamber 100. By virtue of varying the firing sequence and rate of the 12 barrels (injection tubes) as well as the fragmentation, it is possible to tune the pellet injection system 700 to provide just the desired level of particle inventory sustainment. In turn, this helps maintain the internal kinetic pressure in the FRC 450 and sustained operation and lifetime of the FRC 450.

Once the ablated atoms encounter significant plasma in the FRC 450, they become fully ionized. The resultant cold plasma component is then collisionally heated by the indigenous FRC plasma. The energy necessary to maintain a desired FRC temperature is ultimately supplied by the beam injectors 600. In this sense the pellet injectors 700 together with the neutral beam injectors 600 form the system that maintains a steady state and sustains the FRC 450.

CT Injector

Figure 22A:
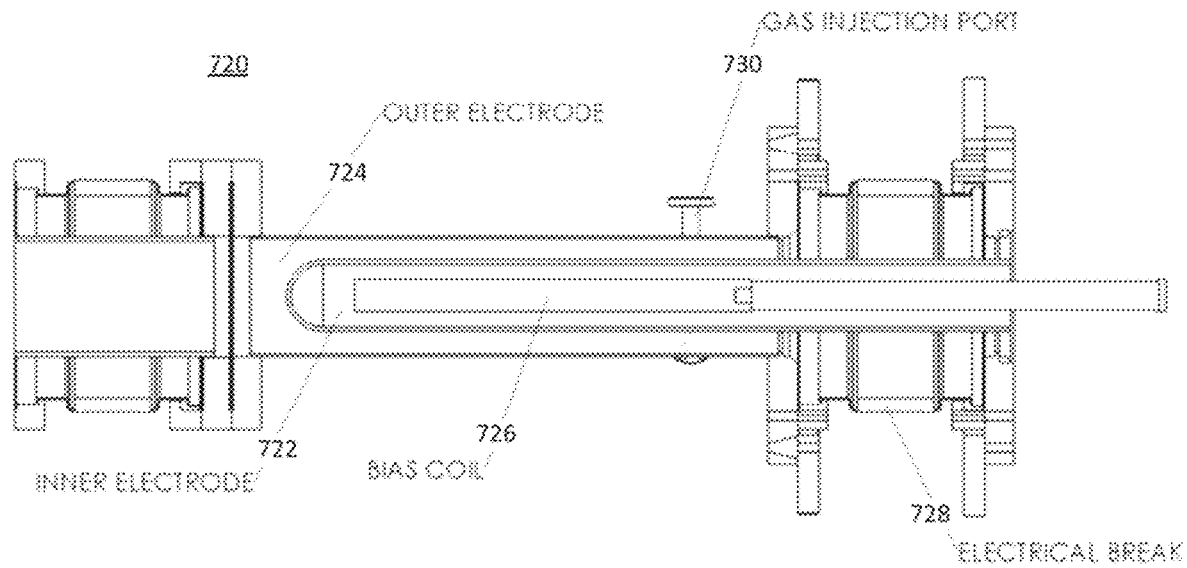
FIGS. 22A and 22B illustrate the basic layout of a compact toroid (CT) injector.
Figure 22B:
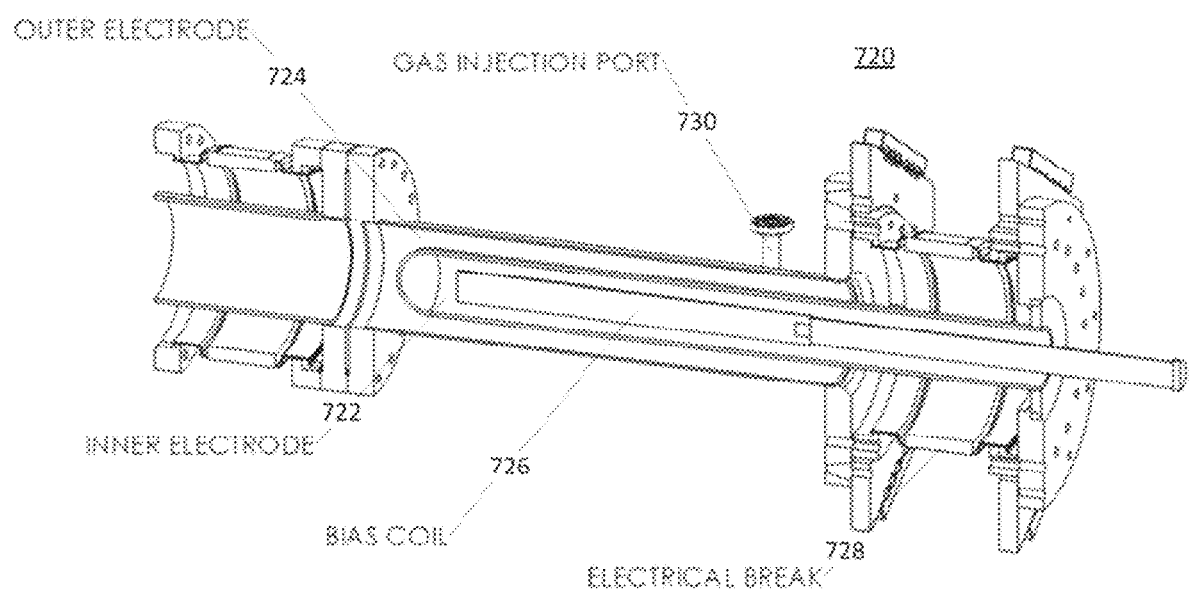
Figure 23A:
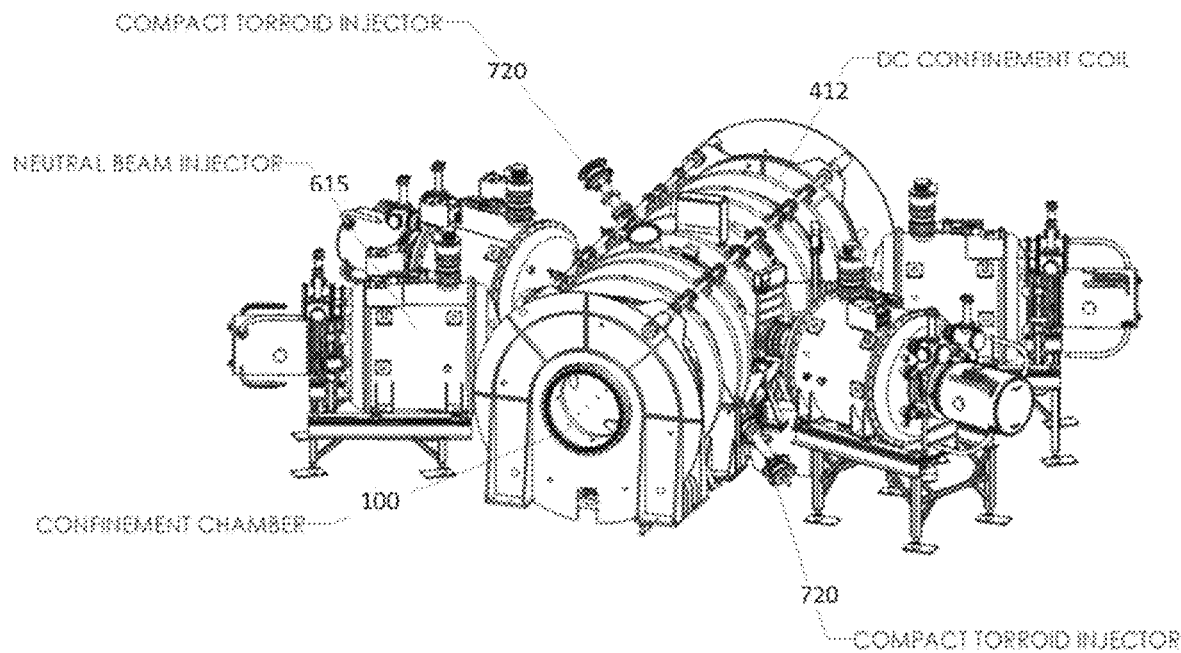
FIGS. 23A and 23B illustrate the central confinement vessel showing the CT injector mounted thereto.
Figure 23B:
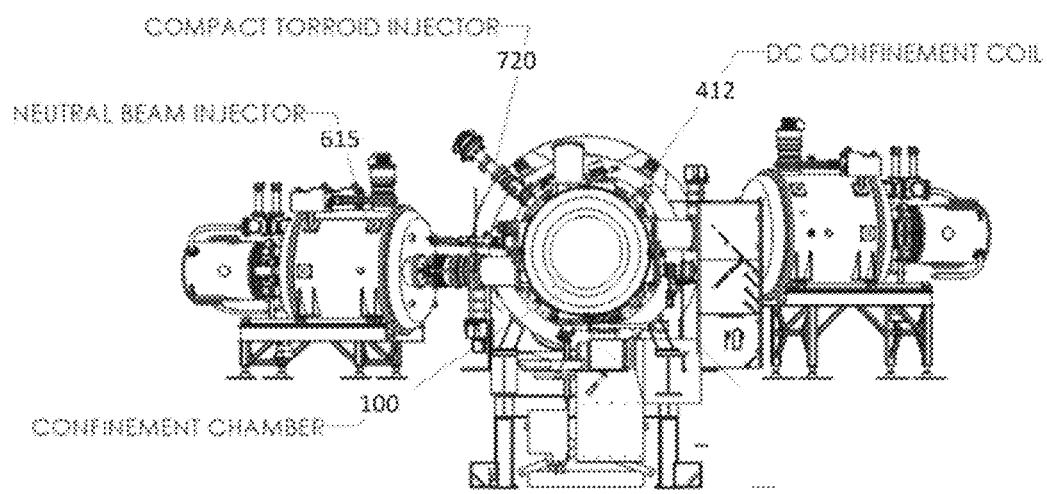

As an alternative to the pellet injector, a compact toroid (CT) injector is provided, mainly for fueling field-reversed configuration (FRCs) plasmas. The CT injector 720 comprises a magnetized coaxial plasma-gun (MCPG), which, as shown in FIGS. 22A and 22B, includes coaxial cylindrical inner and outer electrodes 722 and 724, a bias coil positioned internal to the inner electrode 726 and an electrical break 728 on an end opposite the discharge of the CT injector 720. Gas is injected through a gas injection port 730 into a space between the inner and outer electrodes 722 and 724 and a Spheromak-like plasma is generated therefrom by discharge and pushed out from the gun by Lorentz force. As shown in FIGS. 23A and 23B, a pair of CT injectors 720 are coupled to the confinement vessel 100 near and on opposition sides of the mid-plane of the vessel 100 to inject CTs into the central FRC plasma within the confinement vessel 100. The discharge end of the CT injectors 720 are directed towards the mid-plane of the confinement vessel 100 at an angel to the longitudinal axis of the confinement vessel 100 similar to the neutral beam injectors 615.

Figure 24A:
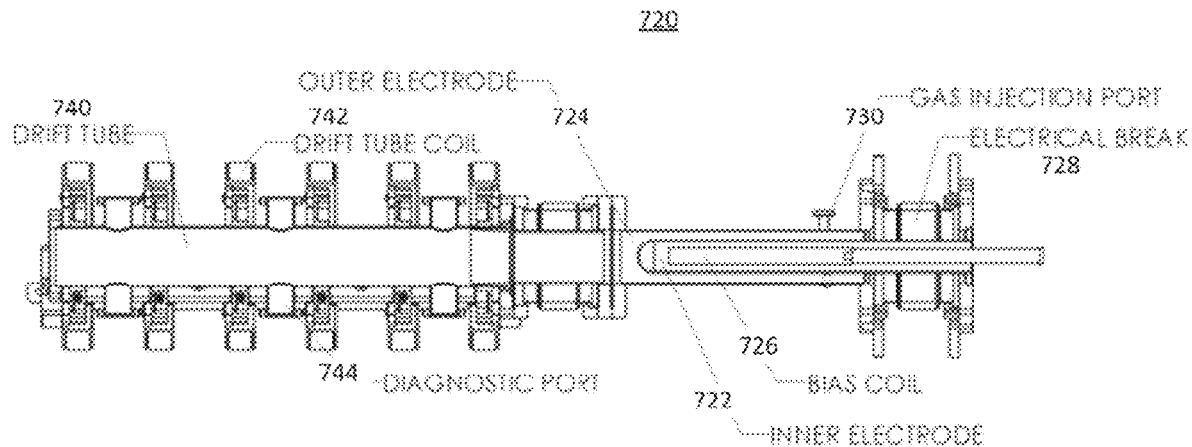
FIGS. 24A and 24B illustrate the basic layout of an alternative embodiment of the CT injector having a drift tube coupled thereto.
Figure 24B:
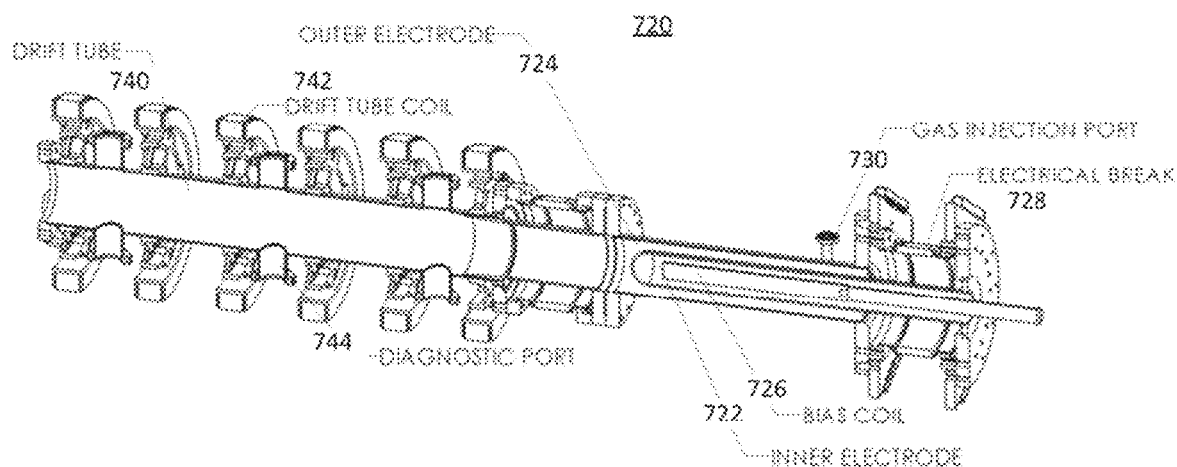

In an alternative embodiment, the CT injector 720, as shown in FIGS. 24A and 24B, include a drift tube 740 comprising an elongate cylindrical tube coupled to the discharge end of the CT injector 720. As depicted, the drift tube 740 includes drift tube coils 742 positioned about and axially spaced along the tube. A plurality of diagnostic ports 744 are depicted along the length of the tube.

The advantages of the CT injector 720 are: (1) control and adjustability of particle inventory per injected CT; (2) warm plasma is deposited (instead of cryogenic pellets); (3) system can be operated in rep-rate mode so as to allow for continuous fueling; (4) the system can also restore some magnetic flux as the injected CTs carry embedded magnetic field. In an embodiment for experimental use, the inner diameter of an outer electrode is 83.1 mm and the outer diameter of an inner electrode is 54.0 mm. The surface of the inner electrode 722 is preferably coated with tungsten in order to reduce impurities coming out from the electrode 722. As depicted, the bias coil 726 is mounted inside of the inner electrode 722.

In recent experiments a supersonic CT translation speed of up to ~100 km/s was achieved. Other typical plasma parameters are as follows: electron density $\sim 5\times 10^{21}$ m-3, electron temperature ~30-50 eV, and particle inventory of ~0.5-1.0×1019. The high kinetic pressure of the CT allows the injected plasma to penetrate deeply into the FRC and deposit the particles inside the separatrix. In recent experiments FRC particle fueling has resulted in ~10-20% of the FRC particle inventory being provide by the CT injectors successfully demonstrating fueling can readily be carried out without disrupting the FRC plasma.

Saddle Coils

To achieve steady state current drive and maintain the required ion current it is desirable to prevent or significantly reduce electron spin up due to the electron-ion frictional force (resulting from collisional ion electron momentum transfer). The FRC system 10 utilizes an innovative technique to provide electron breaking via an externally applied static magnetic dipole or quadrupole field. This is accomplished via the external saddle coils 460 depicted in FIG. 15. The transverse applied radial magnetic field from the saddle coils 460 induces an axial electric field in the rotating FRC plasma. The resultant axial electron current interacts with the radial magnetic field to produce an azimuthal breaking force on the electrons, $F_\theta = -\sigma V_{e\theta} < |B_r|^2 >$. For typical conditions in the FRC system 10, the required applied magnetic dipole (or quadrupole) field inside the plasma needs to be only of order 0.001 T to provide adequate electron breaking. The corresponding external field of about 0.015 T is small enough to not cause appreciable fast particle losses or otherwise negatively impact confinement. In fact, the applied magnetic dipole (or quadrupole) field contributes to suppress instabilities. In combination with tangential neutral beam injection and axial plasma injection, the saddle coils 460 provide an additional level of control with regards to current maintenance and stability.

Mirror Plugs

The design of the pulsed coils 444 within the mirror plugs 440 permits the local generation of high magnetic fields (2 to 4 T) with modest (about 100 kJ) capacitive energy. For formation of magnetic fields typical of the present operation of the FRC system 10, all field lines within the formation volume are passing through the constrictions 442 at the mirror plugs 440, as suggested by the magnetic field lines in FIG. 2 and plasma wall contact does not occur. Furthermore, the mirror plugs 440 in tandem with the quasi-dc divertor magnets 416 can be adjusted so to guide the field lines onto the divertor electrodes 910, or flare the field lines in an end cusp configuration (not shown). The latter improves stability and suppresses parallel electron thermal conduction.

The mirror plugs 440 by themselves also contribute to neutral gas control. The mirror plugs 440 permit a better utilization of the deuterium gas puffed in to the quartz tubes during FRC formation, as gas back-streaming into the divertors 300 is significantly reduced by the small gas conductance of the plugs (a meager 500 L/s). Most of the residual puffed gas inside the formation tubes 210 is quickly ionized. In addition, the high-density plasma flowing through the mirror plugs 440 provides efficient neutral ionization hence an effective gas barrier. As a result, most of the neutrals recycled in the divertors 300 from the FRC edge layer 456 do not return to the confinement chamber 100. In addition, the neutrals associated with the operation of the plasma guns 350 (as discussed below) will be mostly confined to the divertors 300.

Finally, the mirror plugs 440 tend to improve the FRC edge layer confinement. With mirror ratios (plug/confinement magnetic fields) in the range 20 to 40, and with a 15 m length between the north and south mirror plugs 440, the edge layer particle confinement time $\tau_\perp$ increases by up to an order of magnitude. Improving $\tau_\perp$ readily increases the FRC particle confinement.

Assuming radial diffusive (D) particle loss from the separatrix volume 453 balanced by axial loss ($\tau_{s\parallel}$) from the edge layer 456, one obtains $(2\pi r_s L_s)(Dn_s/\delta)=(2\pi r_s \delta)(n_s/\tau_\parallel)$, from which the separatrix density gradient length can be rewritten as $\delta=(D\tau_\parallel)^{1/2}$. Here $r_s$, $L_s$ and $n_s$ are separatrix radius, separatrix length and separatrix density, respectively. The FRC particle confinement time is $\tau_N=[\pi r_s^2 L_s <n>]/[(2\pi r_s L_s)(Dn_s/\delta)]=(<n>/ns)(<n>/n_s)(\tau_{195} \quad \tau_\parallel)^{1/2}$, where $\tau_{TM}=a^2/D$ with $a=r_s/4$. Physically, improving $\tau_\parallel$ leads to increased $\delta$ (reduced separatrix density gradient and drift parameter), and, therefore, reduced FRC particle loss. The overall improvement in FRC particle confinement is generally somewhat less than quadratic because ns increases with $\tau_{s\parallel}$.

A significant improvement in $\tau_\parallel$ also requires that the edge layer 456 remains grossly stable (i.e., no n=1 flute, firehose, or other MHD instability typical of open systems). Use of the plasma guns 350 provides for this preferred edge stability. In this sense, the mirror plugs 440 and plasma gun 350 form an effective edge control system.

Plasma Guns

The plasma guns 350 improve the stability of the FRC exhaust jets 454 by line-tying. The gun plasmas from the plasma guns 350 are generated without azimuthal angular momentum, which proves useful in controlling FRC rotational instabilities. As such the guns 350 are an effective means to control FRC stability without the need for the older quadrupole stabilization technique. As a result, the plasma guns 350 make it possible to take advantage of the beneficial effects of fast particles or access the advanced hybrid kinetic FRC regime as outlined in this disclosure. Therefore, the plasma guns 350 enable the FRC system 10 to be operated with saddle coil currents just adequate for electron breaking but below the threshold that would cause FRC instability and/or lead to dramatic fast particle diffusion.

As mentioned in the Mirror Plug discussion above, if $\tau_\parallel$ can be significantly improved, the supplied gun plasma would be comparable to the edge layer particle loss rate ($\sim 10^{22}$/s). The lifetime of the gun-produced plasma in the FRC system 10 is in the millisecond range. Indeed, consider the gun plasma with density $n_e \sim 10^{13}$ cm$^{-3}$ and ion temperature of about 200 eV, confined between the end mirror plugs 440. The trap length L and mirror ratio R are about 15 m and 20, respectively. The ion mean free path due to Coulomb collisions is $\lambda_{ii} \sim 6 \times 10^3$ cm and, since $\lambda_{ii} \ln R/R<L$, the ions are confined in the gas-dynamic regime. The plasma confinement time in this regime is $\tau_{gd} \sim RL/2V_s \sim 2$ ms, where $V_s$ is the ion sound speed. For comparison, the classical ion confinement time for these plasma parameters would be $\tau_c \sim 0.5\tau_{ii}(\ln R + (\ln R)^{0.5}) \sim 0.7$ ms. The anomalous transverse diffusion may, in principle, shorten the plasma confinement time. However, in the FRC system 10, if we assume the Bohm diffusion rate, the estimated transverse confinement time for the gun plasma is $\tau_{TM} > \tau_{gd} \sim 2$ ms. Hence, the guns would provide significant refueling of the FRC edge layer 456, and an improved overall FRC particle confinement.

Furthermore, the gun plasma streams can be turned on in about 150 to 200 microseconds, which permits use in FRC start-up, translation, and merging into the confinement chamber 100. If turned on around t~0 (FRC main bank initiation), the gun plasmas help to sustain the present dynamically formed and merged FRC 450. The combined particle inventories from the formation FRCs and from the guns is adequate for neutral beam capture, plasma heating, and long sustainment. If turned on at tin the range −1 to 0 ms, the gun plasmas can fill the quartz tubes 210 with plasma or ionize the gas puffed into the quartz tubes, thus permitting FRC formation with reduced or even perhaps zero puffed gas. The latter may require sufficiently cold formation plasma to permit fast diffusion of the reversed bias magnetic field. If turned on at t<−2 ms, the plasma streams could fill the about 1 to 3 m$^3$ field line volume of the formation and confinement regions of the formation sections 200 and confinement chamber 100 with a target plasma density of a few $10^{13}$ cm$^{-3}$, sufficient to allow neutral beam build-up prior to FRC arrival. The formation FRCs could then be formed and translated into the resulting confinement vessel plasma. In this way the plasma guns 350 enable a wide variety of operating conditions and parameter regimes.

Electrical Biasing

Control of the radial electric field profile in the edge layer 456 is beneficial in various ways to FRC stability and confinement. By virtue of the innovative biasing components deployed in the FRC system 10 it is possible to apply a variety of deliberate distributions of electric potentials to a group of open flux surfaces throughout the machine from areas well outside the central confinement region in the confinement chamber 100. In this way radial electric fields can be generated across the edge layer 456 just outside of the FRC 450. These radial electric fields then modify the azimuthal rotation of the edge layer 456 and effect its confinement via ExB velocity shear. Any differential rotation between the edge layer 456 and the FRC core 453 can then be transmitted to the inside of the FRC plasma by shear. As a result, controlling the edge layer 456 directly impacts the FRC core 453. Furthermore, since the free energy in the plasma rotation can also be responsible for instabilities, this technique provides a direct means to control the onset and growth of instabilities. In the FRC system 10, appropriate edge biasing provides an effective control of open field line transport and rotation as well as FRC core rotation. The location and shape of the various provided electrodes 900, 905, 910 and 920 allows for control of different groups of flux surfaces 455 and at different and independent potentials. In this way a wide array of different electric field configurations and strengths can be realized, each with different characteristic impact on plasma performance.

A key advantage of all these innovative biasing techniques is the fact that core and edge plasma behavior can be affected from well outside the FRC plasma, i.e. there is no need to bring any physical components in touch with the central hot plasma (which would have severe implications for energy, flux and particle losses). This has a major beneficial impact on performance and all potential applications of the HPF concept.

Experimental Data—HPF Operation

Injection of fast particles via beams from the neutral beam guns 600 plays an important role in enabling the HPF regime. FIGS. 16A, 16B, 16C, and 16D illustrate this fact. Depicted is a set of curves showing how the FRC lifetime correlates with the length of the beam pulses. All other operating conditions are held constant for all discharges comprising this study. The data is averaged over many shots and, therefore, represents typical behavior. It is clearly evident that longer beam duration produces longer lived FRCs. Looking at this evidence as well as other diagnostics during this study, it demonstrates that beams increase stability and reduce losses. The correlation between beam pulse length and FRC lifetime is not perfect as beam trapping becomes inefficient below a certain plasma size, i.e., as the FRC 450 shrinks in physical size not all of the injected beams are intercepted and trapped. Shrinkage of the FRC is primarily due to the fact that net energy loss (~4 MW about midway through the discharge) from the FRC plasma during the discharge is somewhat larger than the total power fed into the FRC via the neutral beams (~2.5 MW) for the particular experimental setup. Locating the beams at a location closer to the mid-plane of the vessel 100 would tend to reduce these losses and extend FRC lifetime.

FIGS. 17A, 17B, 17C, and 17D illustrate the effects of different components to achieve the HPF regime. It shows a family of typical curves depicting the lifetime of the FRC 450 as a function of time. In all cases a constant, modest amount of beam power (about 2.5 MW) is injected for the full duration of each discharge. Each curve is representative of a different combination of components. For example, operating the FRC system 10 without any mirror plugs 440, plasma guns 350 or gettering from the gettering systems 800 results in rapid onset of rotational instability and loss of the FRC topology. Adding only the mirror plugs 440 delays the onset of instabilities and increases confinement. Utilizing the combination of mirror plugs 440 and a plasma gun 350 further reduces instabilities and increases FRC lifetime. Finally adding gettering (Ti in this case) on top of the gun 350 and plugs 440 yields the best results—the resultant FRC is free of instabilities and exhibits the longest lifetime. It is clear from this experimental demonstration that the full combination of components produces the best effect and provides the beams with the best target conditions.

As shown in FIG. 1, the newly discovered HPF regime exhibits dramatically improved transport behavior. FIG. 1 illustrates the change in particle confinement time in the FRC system 10 between the conventionally regime and the HPF regime. As can be seen, it has improved by well over a factor of 5 in the HPF regime. In addition, FIG. 1 details the particle confinement time in the FRC system 10 relative to the particle confinement time in prior conventional FRC experiments. With regards to these other machines, the HPF regime of the FRC system 10 has improved confinement by a factor of between 5 and close to 20. Finally and most importantly, the nature of the confinement scaling of the FRC system 10 in the HPF regime is dramatically different from all prior measurements. Before the establishment of the HPF regime in the FRC system 10, various empirical scaling laws were derived from data to predict confinement times in prior FRC experiments. All those scaling rules depend mostly on the ratio $R^2/\rho_i$, where R is the radius of the magnetic field null (a loose measure of the physical scale of the machine) and $\rho_i$ is the ion larmor radius evaluated in the externally applied field (a loose measure of the applied magnetic field). It is clear from FIG. 1 that long confinement in conventional FRCs is only possible at large machine size and/or high magnetic field. Operating the FRC system 10 in the conventional FRC regime CR tends to follow those scaling rules, as indicated in FIG. 1. However, the HPF regime is vastly superior and shows that much better confinement is attainable without large machine size or high magnetic fields. More importantly, it is also clear from FIG. 1 that the HPF regime results in improved confinement time with reduced plasma size as compared to the CR regime.

Similar trends are also visible for flux and energy confinement times, as described below, which have increased by over a factor of 3-8 in the FRC system 10 as well. The breakthrough of the HPF regime, therefore, enables the use of modest beam power, lower magnetic fields and smaller size to sustain and maintain FRC equilibria in the FRC system 10 and future higher energy machines. Hand-in-hand with these improvements comes lower operating and construction costs as well as reduced engineering complexity.

Figures 18A, 18B, 18C, 18D:
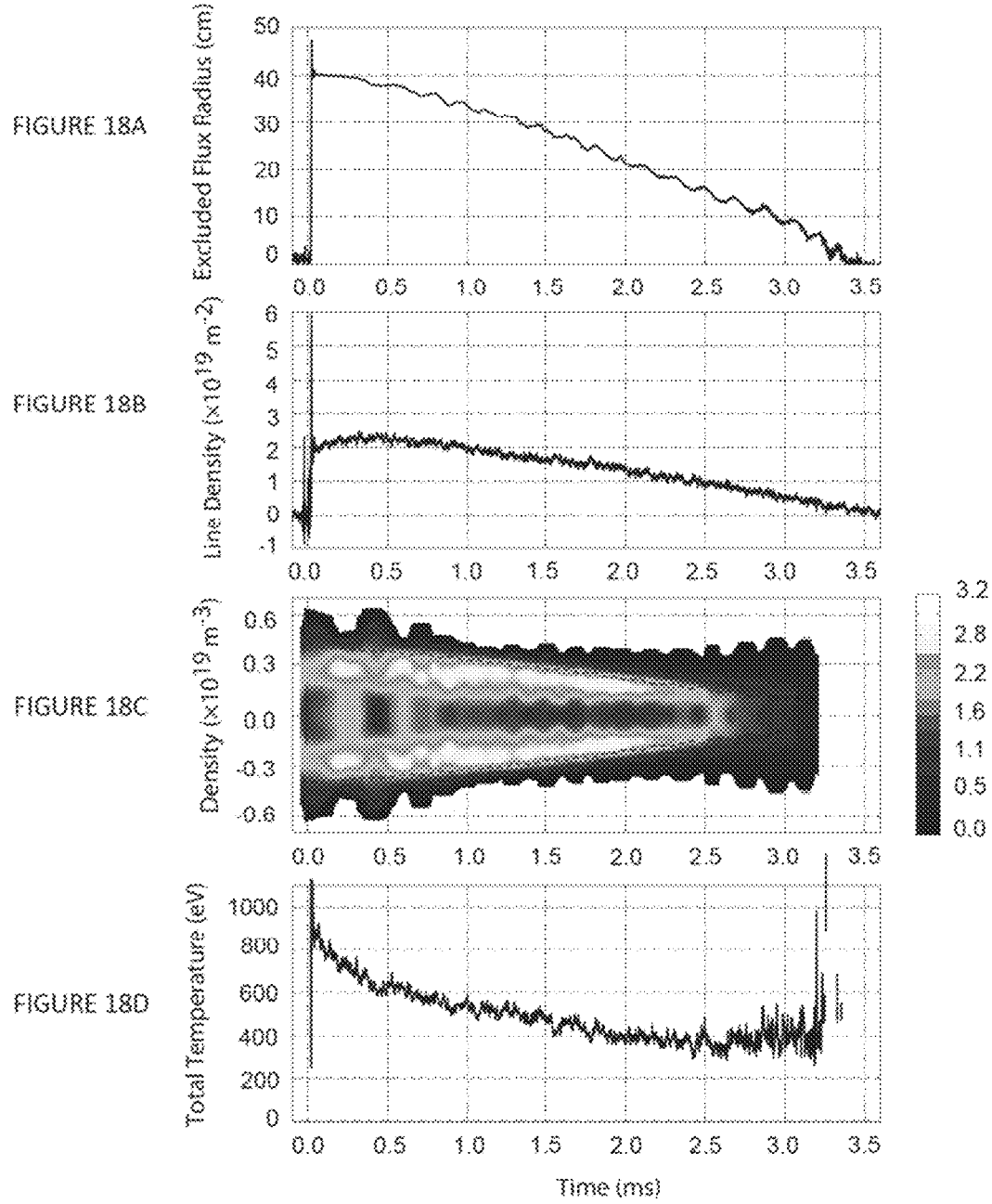
FIGS. 18A, 18B, 18C, and 18D illustrate data from a representative HPF, un-sustained discharge on the present FRC system. Shown as functions of time are (FIG. 18A) excluded flux radius at the midplane, (FIG. 18B) 6 chords of line-integrated density from the midplane CO2 interferometer, (FIG. 18C) Abel-inverted density radial profiles from the CO2 interferometer data, and (FIG. 18D) total plasma temperature from pressure balance.

For further comparison, FIGS. 18A, 18B, 18C, and 18D show data from a representative HPF regime discharge in the FRC system 10 as a function of time. FIG. 18A depicts the excluded flux radius at the mid-plane. For these longer timescales the conducting steel wall is no longer as good a flux conserver and the magnetic probes internal to the wall are augmented with probes outside the wall to properly account for magnetic flux diffusion through the steel. Compared to typical performance in the conventional regime CR, as shown in FIGS. 13A, 13B, 13C, and 13D, the HPF regime operating mode exhibits over 400% longer lifetime.

A representative cord of the line integrated density trace is shown in FIG. 18B with its Abel inverted complement, the density contours, in FIG. 18C. Compared to the conventional FRC regime CR, as shown in FIGS. 13A, 13B, 13C, and 13D, the plasma is more quiescent throughout the pulse, indicative of very stable operation. The peak density is also slightly lower in HPF shots—this is a consequence of the hotter total plasma temperature (up to a factor of 2) as shown in FIG. 18D.

For the respective discharge illustrated in FIGS. 18A, 18B, 18C, and 18D, the energy, particle and flux confinement times are 0.5 ms, 1 ms and 1 ms, respectively. At a reference time of 1 ms into the discharge, the stored plasma energy is 2 kJ while the losses are about 4 MW, making this target very suitable for neutral beam sustainment.

Figure 19:
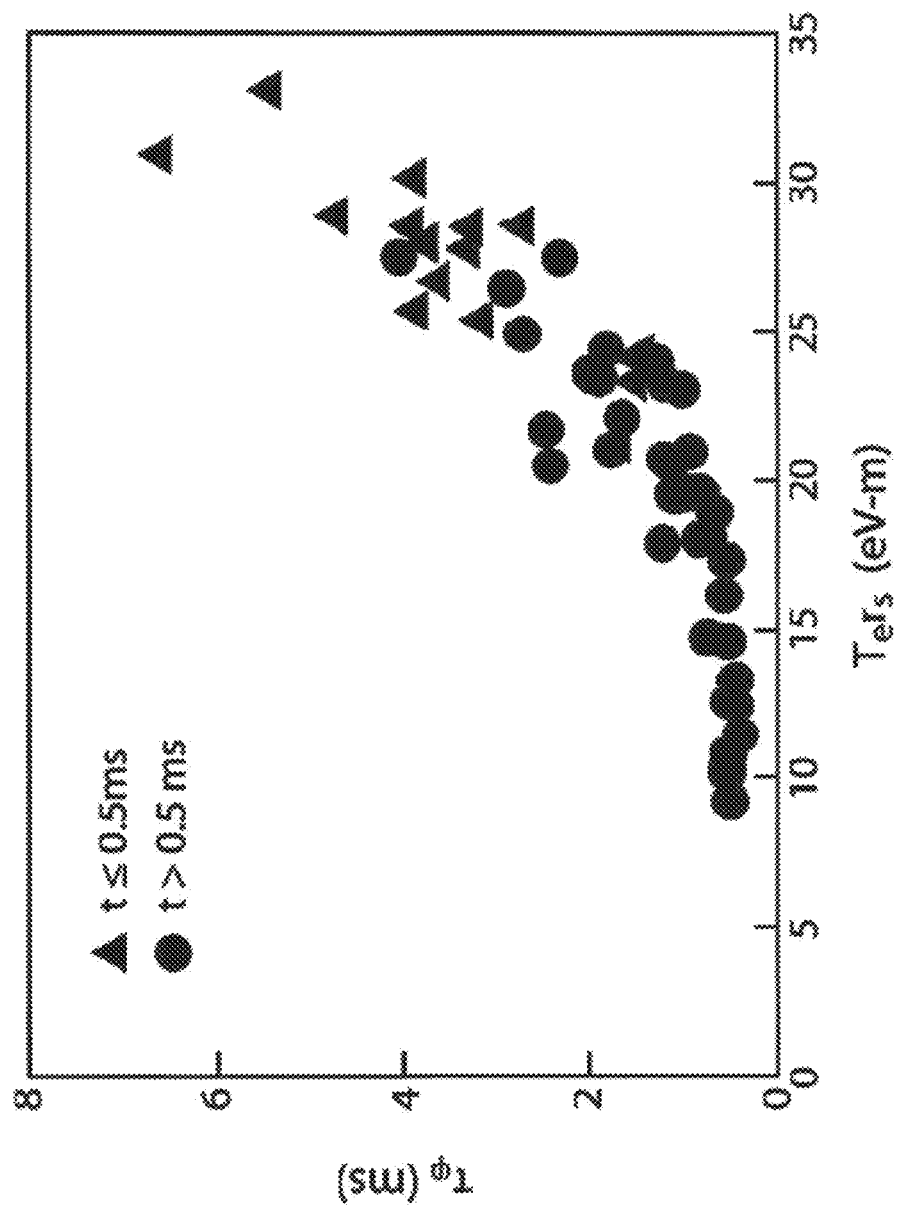
FIG. 19 illustrates flux confinement as a function of electron temperature ($T_e$). It represents a graphical representation of a newly established superior scaling regime for HPF discharges.

FIG. 19 summarizes all advantages of the HPF regime in the form of a newly established experimental HPF flux confinement scaling. As can be seen in FIG. 19, based on measurements taken before and after t=0.5 ms, i.e., t≤0.5 ms and t>0.5 ms, the flux confinement (and similarly, particle confinement and energy confinement) scales with roughly the square of the electron Temperature ($T_e$) for a given separatrix radius ($r_s$). This strong scaling with a positive power of $T_e$ (and not a negative power) is completely opposite to that exhibited by conventional tokomaks, where confinement is typically inversely proportional to some power of the electron temperature. The manifestation of this scaling is a direct consequence of the HPF state and the large orbit (i.e. orbits on the scale of the FRC topology and/or at least the characteristic magnetic field gradient length scale) ion population. Fundamentally, this new scaling substantially favors high operating temperatures and enables relatively modest sized reactors.

With the advantages the HPF regime presents, FRC sustainment or steady state driven by neutral beams is achievable, meaning global plasma parameters such as plasma thermal energy, total particle numbers, plasma radius and length as well as magnetic flux are sustainable at reasonable levels without substantial decay. For comparison, FIG. 20 shows data in plot A from a representative HPF regime discharge in the FRC system 10 as a function of time and in plot B for a projected representative HPF regime discharge in the FRC system 10 as a function of time where the FRC 450 is sustained without decay through the duration of the neutral beam pulse. For plot A, neutral beams with total power in the range of about 2.5-2.9 MW were injected into the FRC 450 for an active beam pulse length of about 6 ms. The plasma diamagnetic lifetime depicted in plot A was about 5.2 ms. More recent data shows a plasma diamagnetic lifetime of about 7.2 ms is achievable with an active beam pulse length of about 7 ms.

As noted above with regard to FIGS. 16A, 16B, 16C, and 16D, the correlation between beam pulse length and FRC lifetime is not perfect as beam trapping becomes inefficient below a certain plasma size, i.e., as the FRC 450 shrinks in physical size not all of the injected beams are intercepted and trapped. Shrinkage or decay of the FRC is primarily due to the fact that net energy loss (~4 MW about midway through the discharge) from the FRC plasma during the discharge is somewhat larger than the total power fed into the FRC via the neutral beams (~2.5 MW) for the particular experimental setup. As noted with regard to FIG. 3C, angled beam injection from the neutral beam guns 600 towards the mid-plane improves beam-plasma coupling, even as the FRC plasma shrinks or otherwise axially contracts during the injection period. In addition, appropriate pellet fueling will maintain the requisite plasma density.

Plot B is the result of simulations run using an active beam pulse length of about 6 ms and total beam power from the neutral beam guns 600 of slightly more than about 10 MW, where neutral beams shall inject H (or D) neutrals with particle energy of about 15 keV. The equivalent current injected by each of the beams is about 110 A. For plot B, the beam injection angle to the device axis was about 20°, target radius 0.19 m. Injection angle can be changed within the range 15°-25°. The beams are to be injected in the co-current direction azimuthally. The net side force as well as net axial force from the neutral beam momentum injection shall be minimized. As with plot A, fast (H) neutrals are injected from the neutral beam injectors 600 from the moment the north and south formation FRCs merge in the confinement chamber 100 into one FRC 450.

The simulations that where the foundation for plot B use multi-dimensional hall-MHD solvers for the background plasma and equilibrium, fully kinetic Monte-Carlo based solvers for the energetic beam components and all scattering processes, as well as a host of coupled transport equations for all plasma species to model interactive loss processes. The transport components are empirically calibrated and extensively benchmarked against an experimental database.

As shown by plot B, the steady state diamagnetic lifetime of the FRC 450 will be the length of the beam pulse. However, it is important to note that the key correlation plot B shows is that when the beams are turned off the plasma or FRC begins to decay at that time, but not before. The decay will be similar to that which is observed in discharges which are not beam-assisted-13 probably on order of 1 ms beyond the beam turn off time—and is simply a reflection of the characteristic decay time of the plasma driven by the intrinsic loss processes.

Turning to FIGS. 21A, 21B, 21C, 21D, and 21E, experiment results illustrated in the figures indicate achievement of FRC sustainment or steady state driven by angled neutral beams, i.e., global plasma parameters such as plasma radius, plasma density, plasma temperature as well as magnetic flux are sustainable at constant levels without decay in correlation with NB pulse duration. For example, such plasma parameters are essentially being kept constant for ~5+ ms. Such plasma performance, including the sustainment feature, has a strong correlation NB pulse duration, with diamagnetism persisting even several milliseconds after NB termination due to the accumulated fast ions. As illustrated, the plasma performance is only limited by the pulse-length constraints arising from finite stored energies in the associated power supplies of many critical systems, such as the NB injectors as well as other system components.

Neutral Beams Tunable Beam Energies

As noted above with regard to FIGS. 3A, 3B, 3C, 3D, 3E, and 8, the neutral atom beams 600 are deployed on the FRC system 10 to provide heating and current drive as well as to develop fast particle pressure. The individual beam lines comprising neutral atom beam injector systems 600 are located around the central confinement chamber 100 and, as shown in FIGS. 3C, 3D and 3E, are preferably angled to inject neutral particles towards the mid-plane of the confinement chamber 100.

To further improve FRC sustainment and demonstrate FRC ramp-up to high plasma temperatures and elevated system energies, the present FRC system 10 includes a neutral beam injector (NBI) system 600 of elevated power and expanded pulse length, e.g., for example purposes only, power of about 20+ MW with up to 30 ms pulse length. The NBI system 600 includes a plurality of positive-ion based injectors 615 (see FIGS. 3D and 3E) featuring flexible, modular design, with a subset of the NBI injectors 615, e.g., four (4) of eight (8) NBI injectors 615, having a capability to tune the beam energy during a shot from an initial lower beam energy to an elevated beam energy, e.g., from about 15 keV to about 40 keV at a constant beam current. This capability of the NBI injectors 615 is desirable in order to achieve more efficient heat-up and resultant pressurization of the plasma core 450. In particular, this capability enables the highly desirable performance improvement at the peak energy operating level compared to the low energy level: for example, (i) factor of up to 2× higher heating power; (ii) close to 5-fold reduction in charge exchange losses; and (iii) up to double the heating efficiency. In addition, the continuously variable beam energy producible by the NBI injectors 615 enables optimal matching of the orbital parameters of the injected and then trapped fast ions relative to the instantaneous magnetic pressure profiles during the ramp-up process. Finally, fast ramp rates, allowing 0.1-10 ms ramp-up duration, together with fast (order of 1 ms or less) tunability of beam energy and power of the NBI injectors 615 provides additional effective "control knobs", i.e., controllable features, for plasma shaping and active feedback control of the plasma via modulation of beam energy and power.

Sufficient heating power is needed to enable heating and pressurization of the FRC 450, both for sustainment as well as ramp-up to high plasma temperatures and elevated system energies. Assuming sufficiently low loss rates, the rate of ramp-up is mostly a function of how much power can be deposited in the FRC core 450 by the NBI injectors 615 at any given time. Higher principal neutral beam power through the injection port is, therefore, always desirable.

Moreover, the effective heating rate due to the NBI injectors 615 is a complex interplay between the characteristics of the injected beam and the then persistent instantaneous profiles of the temperatures of all species, electron and ion densities, neutral concentration, as well as magnetic field across the FRC core 450. Of these the magnetic field profiles are being deliberately changed on sub-millisecond timescales during ramp-up by a control system, while the kinetic pressure related profiles evolve via intrinsic changes derivative of self-organization processes and turbulence within the plasma as well as the energy deposited by the injection process. Tunability of the beams provides a means to most optimally adapt to these varying conditions.

For instance, the charge exchange cross-section, i.e. the probability of electron capture by a fast ion to form a neutral atom, is a strong function of beam energy. For the range of 15-40 keV, the principal charge exchange rate dramatically decreases as a function of beam energy. Therefore, at any given level of field, the retention of energy in the plasma is highest when injecting the particles at the highest energy compatible for such field level (amongst other things, this requires that the energy of the injected particles results in a trapped ion orbit radius that fits within the inner wall of the confinement system).

Another example of the profile effects on overall heating efficiency has to do with where power is deposited. Higher beam energy will typically lead to relatively higher energy deposition in the FRC periphery versus the core. Raising the magnetic field, but keeping the beam energy the same, will results in tighter trapped ion orbits and commensurately higher power coupling to the FRC core plasma. These facts then have a strong impact on energy retention as well—e.g. peripherally deposited energy is much more readily transported out of the system along the open field line structure, while core deposited energy is comparatively lost more slowly due to the lower cross-field transport times. Thus, tight coordination of magnetic field ramping and appropriate increases in beam energy is desirable.

The beam system 600 is designed for fast ramping of voltage in the range of 0.1-10 ms. This provides the potential to increase ion and electron temperatures by factors of 2 and 10, respectively, and do so on timescales shorter than typical macroscopic instability growth times. Therefore, plasma stability is fundamentally increased, as is operational reliability and reproducibility.

Variable voltage rise times of 0.05 to 1 ms provide sufficiently quick response times such that the beams can be utilized as part of an active feedback system. In this way, beam modulation can be used to control macro and microstability. For instance, shifting momentarily the radial power deposition profile by changing the beam energy (and thereby shifting the radial energy deposition pattern), one can affect pressure gradients that can counterbalance the onset of unstable plasma modes. The FRC system 10 shown in FIGS. 3D and 3E utilizes this capability together with fast magnetic feedback to control internal tilting, rotation rates, drift wave development and other operational scenarios.

Figure 25:
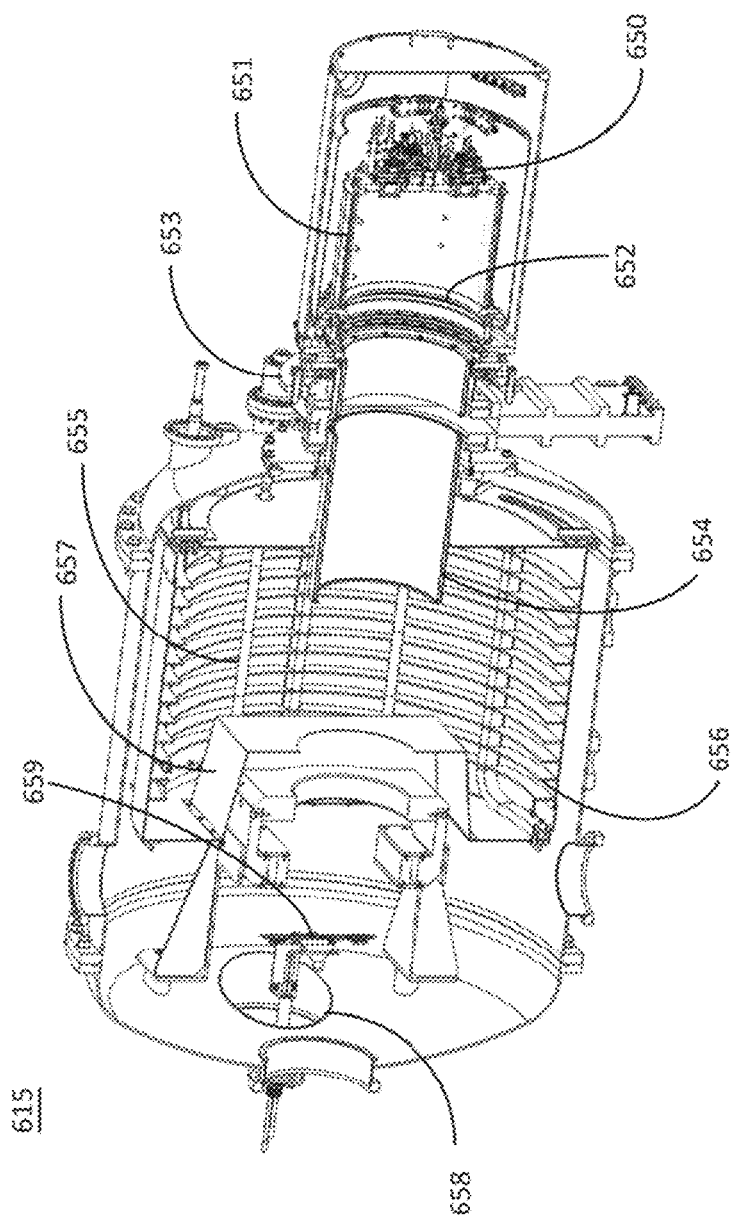
FIG. 25 illustrates a sectional isometric view of a neutral beam system and key components for tunable energy beam output.

FIG. 25 depicts an illustration of an NBI injector 615 of the present FRC system 10. The NBI injector 615 is shown, in an example embodiment, to include: an arc driver 650; a plasma box 651; an ion optical system 652, comprising a triode or tetrode grouping of extraction and acceleration grids; an aiming gimbal 653; a neutralizer 654, comprising arc evaporators 655, such as, e.g., Ti arc evaporators, a cryopump 656 having surface structures, such as, e.g., ribbed surface structures, configured for increased cryopumping, and a deflecting magnet 656 for removing non-neutralized ions; and a collimating aperture 658, including an insertable calorimeter 659 for intermittent beam characterization, diagnostics and recalibration.

Figure 26:
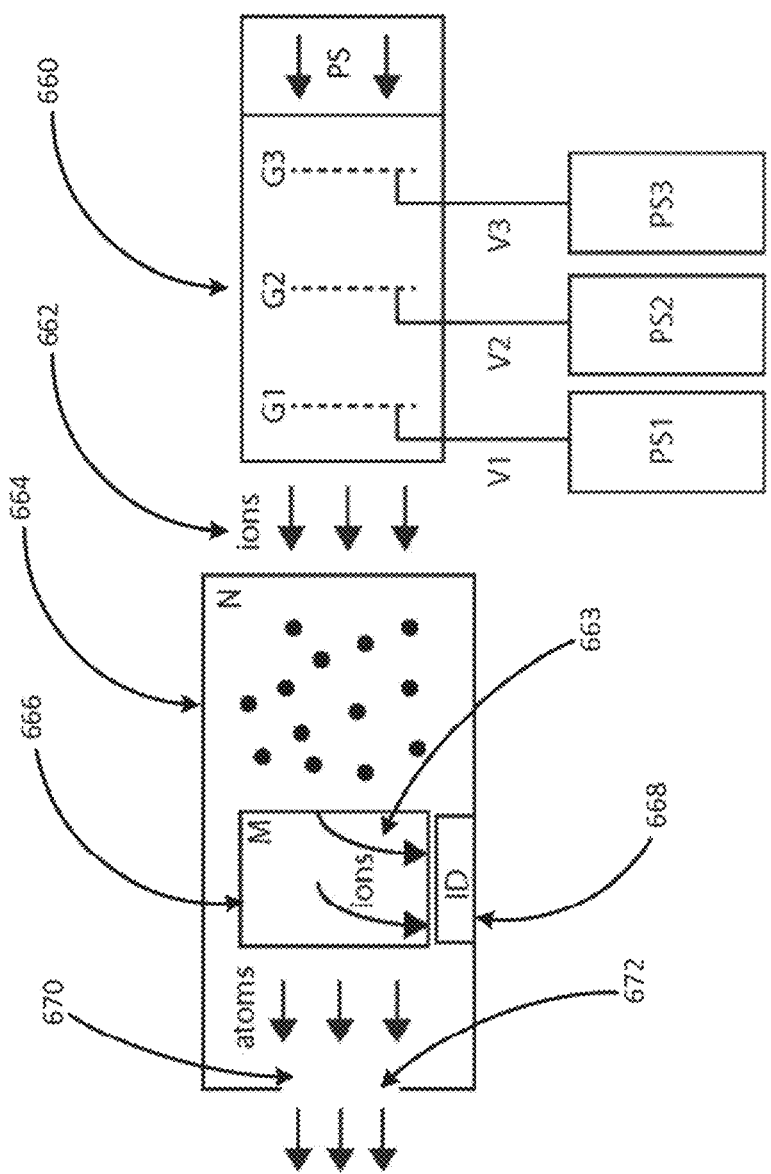
FIG. 26 is a schematic illustrating the neutral beam system with tunable energy beam output.

More specifically and referring to FIG. 26, implementation of the tunable beam system, as shown, is preferably based on a triode type ion optical system (=IOS) 660. The idea is an acceleration-deceleration scheme. As illustrated in the FIG. 26, a first grid G1 is set to a voltage V1, while the second grid G2 is set to a voltage V2 and the final grid G3 is set to voltage V3. The extracted ions are first accelerated to energy $E1=e*(V1-V2)$ while traversing through the gap between G1 and G2 (e here refers to the electric charge of the ion). They are then decelerated in the gap between G2 and G3 such that $E2=E1+e*(V2-V3)$. The voltages are typically adjusted such that V1>V2<V3. Based on appropriate individual power supplies PS1, PS2, PS3, the grid voltages can be incrementally adjusted during the pulse so as to change the output of the emitted ions 662. For example, to begin a beam pulse of hydrogen atoms, the working voltages may be adjusted to V1=15 kV, V2=−25 kV and V3=0 V. The initial beam ions will then be accelerated first to 40 keV and then emerge out of the IOS with an energy of 15 keV. Later in the pulse, the power supplies can be switched to provide V1=40 kV, V2=−1 kV, V3=0 V. The beam deceleration in the second gap will then be practically absent, yielding an output beam energy of approximately 40 keV. The power supplies are each individually controllable and provide the appropriate voltage modulation. The initial beam ions are drawn out of multitude of standard arch or RF based plasma source PS. Post emerging from IOS 660, the beam ions 662 traverse a neutralizer 664 where the fast ions convert to neutral ions via charge exchange of electrons off the cold neutral gas present in the neutralizer 664. Proper cryopumping prevents neutral gas bleeding out of the downstream orifice of the neutralizer 664. At the end of the neutralizer there is also a proper bending magnet 666 that provides removal of non-neutralized fast ions 663 and an associated ion dump 668 to absorb the fast ions and their energy. The emerging atom beam 670 is then passed through an appropriate aperture 6720 to reduce beam divergence and provide a well collimated stream of neutral atoms towards the core of the reactor.

In an alternate version, the IOS is based on a tetrode design. In this case the IOS consists of four grids that have the same acceleration-deceleration principal as explained for the triode case. Those skilled in the art will readily recognize the similarity between the system components and operating principles. The introduction of the fourth grid provides further fine-tuning possibilities and overall more operating flexibility.

The example embodiments provided herein have been described in U.S. Provisional Patent Application No. 62/414,574, which application is incorporated herein by reference.

Plasma Stability and Axial Position Control

Conventional solutions to FRC instabilities typically provide stability in the axial direction at the expense of being unstable in the radial direction, or stability in the radial direction at the expense of being axially unstable, but not stability in both directions at the same time. To the first order, an equilibrium where the plasma position is transversally or radially stable has the desired property of being axisymmetric, at the expense of being axially unstable. In view of the foregoing, the embodiments provided herein are directed to systems and methods that facilitate stability of an FRC plasma in both radial and axial directions and axial position control of an FRC plasma along the symmetry axis of an FRC plasma confinement chamber independent of the axial stability properties of the FRC plasma's equilibrium. The axial position instability, however, is actively controlled using a set of external axisymmetric coils that control the FRC plasma axial position. The systems and methods provide feedback control of the FRC plasma axial position independent of the stability properties of the plasma equilibrium by acting on the voltages applied to a set of external coils concentric with the plasma and using a non-linear control technique.

The embodiments presented herein exploit an axially unstable equilibria of the FRC to enforce radial stability, while stabilizing or controlling the axial instability. In this way, stability in both axial and radial directions can be obtained. The control methodology is designed to alter the external or equilibrium magnetic field to make the FRC plasma radially or transversally stable at the expense of being axially unstable, and then act on the radial field coil current in order to expeditiously restore the FRC plasma position towards the mid-plane while minimizing overshooting and/or oscillations around the mid-plane of the confinement chamber. The advantage of this solution is that it reduces the complexity of the actuators required for control. Compared with the conventional solutions with multiple degrees of freedom, the methodology of the embodiment presented herein reduces the complexity to a control problem along the FRC plasma revolution axis having one degree of freedom.

The combination of waveforms in coil currents, fueling and neutral beam power that result into an axially unstable plasma define the plasma control scenario that sets the plasma into an axial unstable situation. The scenario can be pre-programmed using prior knowledge of simulations or experiments, or feedback controlled to maintain an equilibrium that is axially unstable. The plasma position should be controlled during the discharges independently of the stability properties of the equilibrium, e.g. the control scheme should work for either axially stable or axially unstable plasmas, up to a limit. The most axially unstable plasma that can be controlled has a growth time comparable to the skin time of the vessel.

Figure 27:
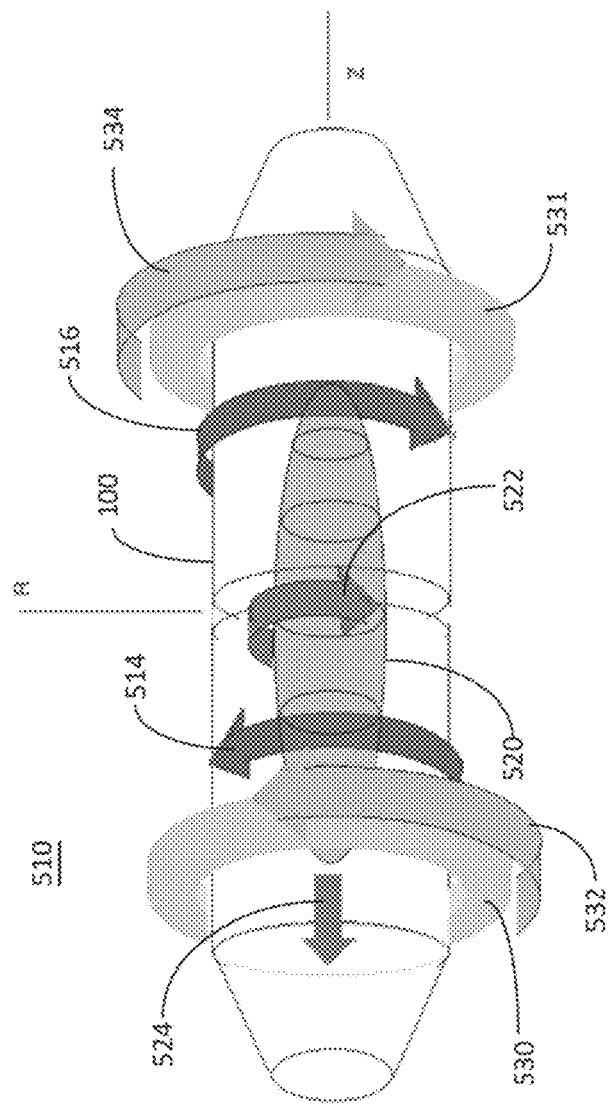
FIG. 27 is a schematic of illustrating an axial position control mechanism of an FRC plasma within a confining vessel (CV).

Turning now to the systems and methods that facilitate stability of an FRC plasma in both radial and axial directions and axial position control of an FRC plasma along the symmetry axis of an FRC plasma confinement chamber, FIG. 27 shows a simplified scheme to illustrate an example embodiment of an axial position control mechanism 510. A rotating FRC plasma 520 shown within a confinement chamber 100 has a plasma current 522 and an axial displacement direction 524. An equilibrium field (not shown) is produced within the chamber 100 by symmetric current components such as, e.g., the quasi-dc coils 412 (see FIGS. 2, 3A, 3D, and 3E). The equilibrium field does not produce a net force in the axial displace direction 524, but can be tuned to produce either a transversally/radially or axially stable plasma. For the purposes of the embodiment presented herein, the equilibrium field is tuned to produce a transversally/radially stable FRC plasma 520. As noted above, this results in axial instability and, thus, axial displacement of the FRC plasma 520 in an axial displacement direction 524. As the FRC plasma 520 moves axially it induces current 514 and 516 that are antisymmetric, i.e., in counter directions in the walls of the confinement chamber 100 on each side of the mid-plane of the confinement chamber 100. The FRC plasma 520 will induce this type of current components in both the vessel and also in the external coils. These antisymmetric current components 514 and 516 produce a radial field which interacts with the toroidal plasma current 522 to produce a force that opposes the movement of the FRC plasm 520, and the result of this force is that it slows down plasma axial displacements. These currents 514 and 516 gradually dissipate with time, due to the resistivity of the confinement chamber 100.

Radial field coils 530 and 531 disposed about the confinement chamber 100 on each side of the mid-plane provide additional radial field components that are due to the currents 532 and 534 induced in counter directions in the coils 530 and 531. The radial field coils 530 and 531 may comprise a set of axisymmetric coils that may be positioned internal or external to the containment vessel 100. The radial coils 530 and 531 are shown to be positioned external to the containment vessel 100 similar to the quasi-dc coils 412 (see, FIGS. 2, 3A, 3D and 3E). Each of the coils 530 and 531, or sets of coils, may carry a different current than the coils on the opposite side of the mid-plane, but the currents are antisymmetric with respect to the mid-plane of the containment vessel 100 and produce a magnetic field structure with $B_z \neq 0$, $B_r = 0$ along the midplane. The radial field coils 530 and 531 create a supplemental radial field component that interacts with the toroidal plasma current 522 to produce an axial force. The axial force in turn moves the plasma back towards the mid-plane of the confinement chamber 100.

The control mechanism 510 includes a control system configured to act on the radial field coil current in order to expeditiously restore the plasma position towards the mid-plane while minimizing overshooting and/or oscillations around the machine mid-plane. The control system includes a processor operably coupled to the radial field coils 530 and 531, the quasi-dc coils 412, their respective power supplies, and other components such as, e.g., magnetic sensors, providing plasma position, plasma velocity, and active coil current measurements. The processor may be configured to perform the computations and analyses described in the present application and may include or be communicatively coupled to one or more memories including non-transitory computer readable medium. It may include a processor-based or microprocessor-based system including systems using microcontrollers, reduced instruction set computers (RISC), application specific integrated circuits (ASICs), logic circuits, and any other circuit or processor capable of executing the functions described herein. The above are examples only, and are thus not intended to limit in any way the definition and/or meaning of the term "processor" or "computer."

Functions of the processor may be implemented using either software routines, hardware components, or combinations thereof. The hardware components may be implemented using a variety of technologies, including, for example, integrated circuits or discrete electronic components. The processor unit typically includes a readable/writeable memory storage device and typically also includes the hardware and/or software to write to and/or read the memory storage device.

The processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor may also include a storage device, which may be a hard disk drive or a removable storage drive such as a floppy disk drive, optical disk drive, and the like. The storage device may also be other similar means for loading computer programs or other instructions into the computer or processor.

The processor executes a set of instructions that are stored in one or more storage elements, in order to process input data. The storage elements may also store data or other information as desired or needed. The storage element may be in the form of an information source or a physical memory element within a processing machine.

The problem of controlling the position of an axially stable or unstable FRC configuration using the radial field coil actuators is solved using a branch of non-linear control theory known as sliding mode control. A linear function of system states (the sliding surface) acts as the error signal with the desired asymptotically stable (sliding) behavior. The sliding surface is designed using Liapunov theory to exhibit asymptotic stability in a broad range of FRC dynamic parameters. The proposed control scheme can then be used for both axially stable and unstable plasmas without the need to re-tune the parameters used in the sliding surface. This property is advantageous because, as mentioned before, the equilibrium may have to transit between axially stable and axially unstable equilibria on different phases of the FRC discharge.

Figure 28:
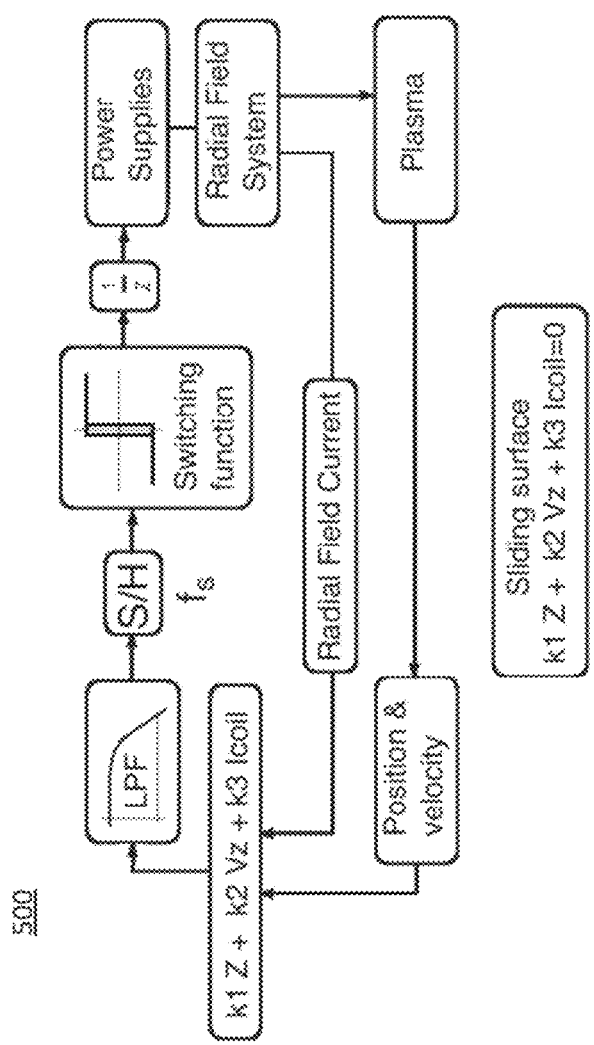
FIG. 28 is a flow diagram of a generic sliding mode control scheme.

The configuration of the control scheme 500 is shown in FIG. 28. The low pass filter restricts the switching frequencies within the desired control bandwidth. A digital control loop requiring sampling and signal transmission with one sample delay is assumed. The error signal (the sliding surface) is a linear combination of coil current, plasma position and plasma velocity. Plasma position and velocity of the plasma are obtained from external magnetic measurements. Currents in the active coil systems can be measured by standard methods.

Coil currents and plasma position are required to implement the position control. Plasma velocity is required to improve performance but is optional. A non-linear function of this error signal (relay control law) generates discrete voltage levels for every pair of power supplies connected to mid-plane symmetric coils. Midplane symmetric coils are feed with relay voltages of same intensity but opposite sign. This creates a radial field component to restore the plasma position towards the mid-plane.

To demonstrate the feasibility of the control scheme, a rigid plasma model is used to simulate the plasma dynamics. The model utilizes a magnet geometry. Plasma current distribution corresponds to axially unstable equilibria with a growth time of 2 ms when only plasma and vessel are considered. The power supplies are assumed to work with discrete voltage levels, typically in 800 V steps.

Figure 29:
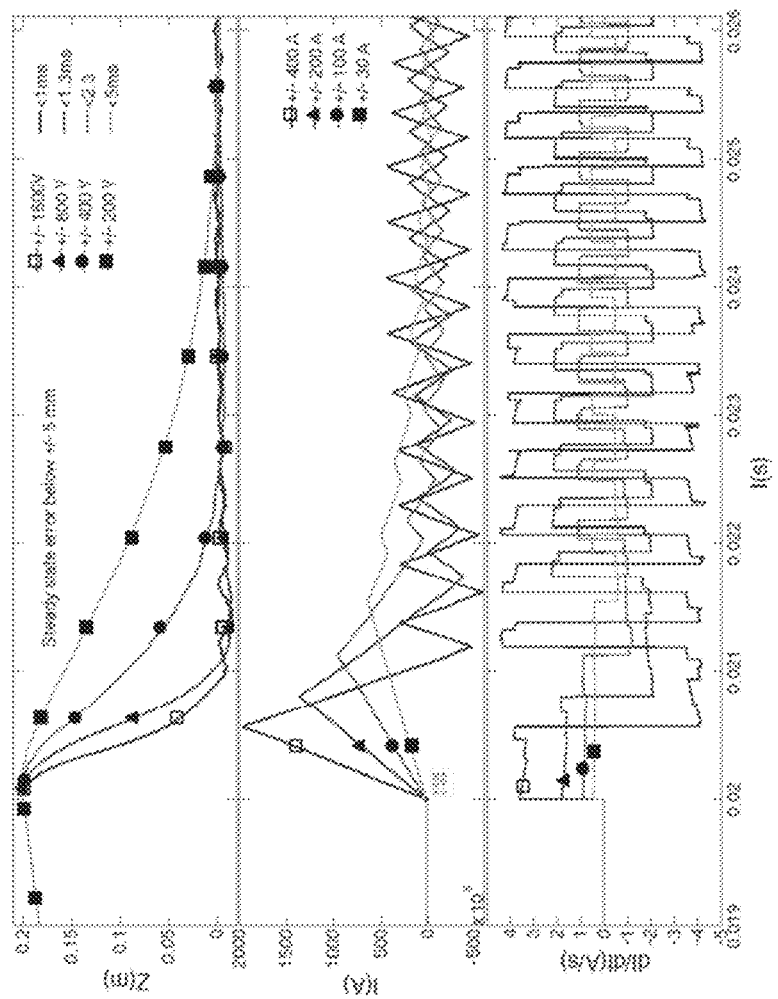
FIG. 29 is a composite graph of examples of a sliding mode axial position control simulation.

FIG. 29 shows several plasma control simulations that highlight the relationship between applied voltages to the coils, and the plasma position settling times, along with the required coil peak current and ramp rates to bring back to the mid-plane a plasma that was displaced axially by 20 cm. These sliding mode axial position control simulation examples are run at 0.3 T using four pairs of external trim coils. Four cases are shown corresponding with power supplies with discrete voltage levels in steps of 200 V (solid square), 400V (solid circle), 800 V (solid triangle) and 1600 V (hollow square). For all four cases the control bandwidth is 16 kHz and sampling frequency is 32 kHz. The plasma position (top figure), current in the outermost coil pair (middle) and coil current ramp-rate (bottom) are shown. Plasma displacement is allowed to grow unstable until it reaches 20 cm. At this point the feedback control is applied.

Simulation results indicate that:
1. To bring the plasma back to the mid-plane within 5 ms (solid sqaure traces), coil ramp-up rate of 0.5 MA/s suffices, requiring a 200 V power supply.
2. To bring the plasma back to the mid-plane within 2.3 ms (solid circle traces), coil ramp-up rate of 1 MA/s suffices, requiring a 400 V power supply.
3. To bring the plasma back to the mid-plane within 1.3 ms (solid triangle traces), coil ramp-up rate of 2 MA/s suffices, requiring an 800 V power supply.
4. To bring the plasma back to the mid-plane within 1.0 ms (hollow square traces), coil ramp-up rate of 4 MA/s suffices, requiring a 1600 V power supply.

Figure 30:
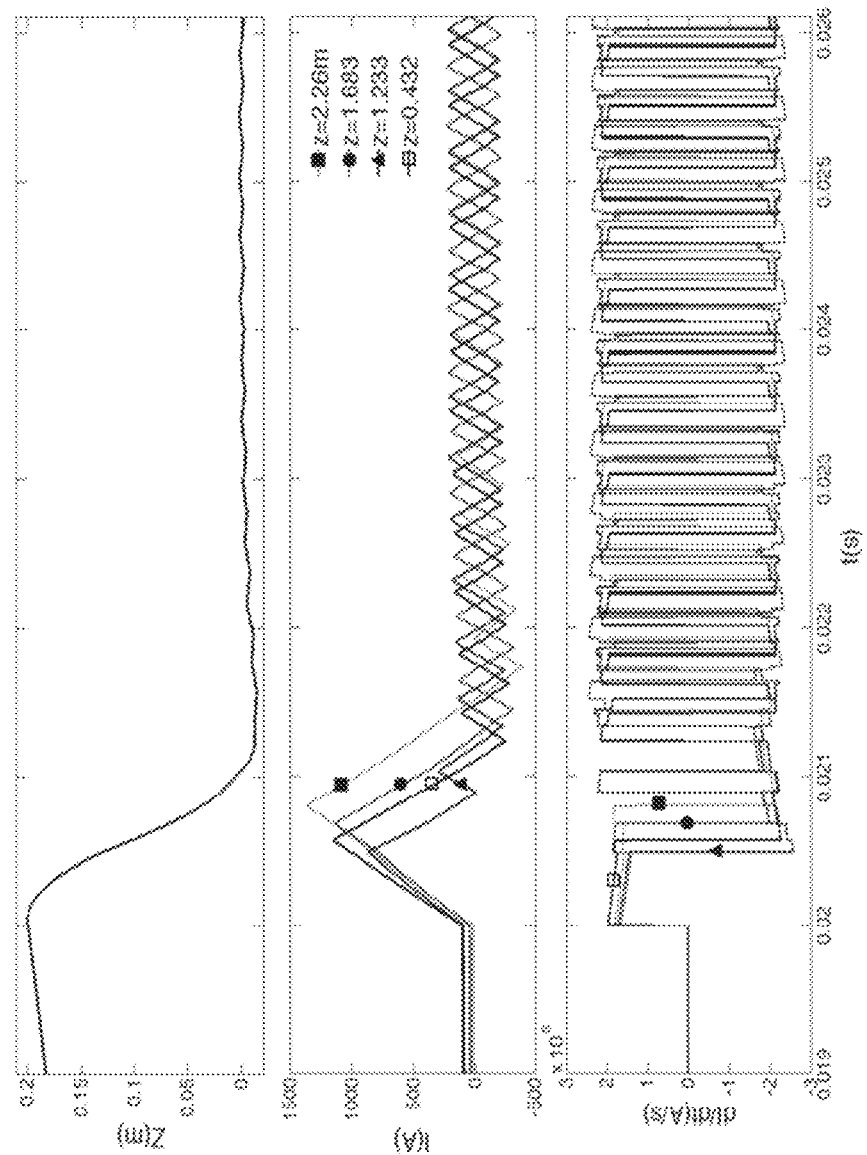
FIG. 30 is a composite graph of examples of a sliding mode axial position control simulation.

The peak currents for all the trim coils for the third case studied above (the 2 MA/s ramp rate case) are also shown in FIG. 30 as function of trim coil position. The sliding mode axial position control simulation examples are run at 0.3 T using four pairs of external trim coils using a power supply with three levels (+800V,0,−800V), a control bandwidth of 16 kHz and a sampling rate of 32 kHz. To bring the plasma back to the mid-plane within 1.3 ms, coil ramp-up rate of 2 MA/s is required. The peak current required in all coil pair is less than 1.5 kA. The actual switching frequency required (about 2 kHz) is well below the control system bandwidth The control system can also be implemented a target surface which is function of coil current and plasma velocity alone, without plasma position. In this case the axial position control loop provides only stabilization of the axial dynamics, but not control. This means that the plasma is in a metastable situation and can drift slowly along its axis. The position control is then provided using an additional feedback loop that controls the plasma gaps between plasma separatrix and vessel, hence it performs plasma shape and position control simultaneously.

Another plasma confinement device where similar control systems are used is the tokamak. To maintain plasma confinement, the plasma current in a tokamak must be kept between a lower and an upper limit that are roughly proportional to plasma density and toroidal field, respectively. To operate at high plasma density plasma current must be increased. At the same time the poloidal field must be kept as low as possible so the q safety factor is above q=2. This is achieved by elongating the plasma along the machine axis direction, allowing to fit large plasma current (and hence allow high plasma density) without increasing the boundary magnetic field above its safety limits. These elongated plasmas are unstable along the machine axis direction (known in tokamak jargon as the vertical direction), and also require plasma stabilization mechanisms. Vertical plasma position control in tokamaks is also restored using a set of radial field coils, so it strongly resembles the RFC position control problem. However, the reasons to require stabilization in a tokamak and an FRC are different. In a tokamak plasma vertical instability is a penalty to be paid to operate at large plasma current, which requires plasma elongation to operate with high toroidal field. In the case of the FRC, plasma instability is a penalty to be paid to obtain transverse stability. Tokamaks have toroidal field that stabilizes the configuration, so they don't need transverse stabilization.

The present disclosure is directed that facilitate the generation and maintenance of a high flux target FRC plasma and axial refueling the FRC plasma. In an example embodiment, a process includes the formation of large-flux FRCs (up to 30 mWb) by merging two spheromaks with opposite helicities. Merging experiments have been carried out on various devices to study magnetic reconnection by making two spheromak-type plasma toroids to merge together through contacting and reconnecting along a toroidally symmetric line. A spheromak is a spherical or toroidal shaped plasma in which force free currents (j×B=0) set up an equilibrium configuration depending on whether there is a current (flux) hole at the major axis. The two toroidal spheromaks, carrying equal toroidal current with the same or the opposite toroidal field, are forced to merge by controlled external coil currents; these are called co-helicity or counter-helicity merging, respectively. As described in Yamada, M., et al., Phys. Rev. Lett. 65, 721 (1990), the counter-helicity merging generates antiparallel magnetic field line reconnection at the reconnection sites, where the magnetic reconnection was expected to occur very efficiently (Bhattacharjee, A., Phys. Fluids 26, 3332 (1983)). Experimental results also indicated that the counter-helicity merging indeed made much faster reconnection globally than the co-helicity merging case, and then forming a high magnetic-flux FRC structure (consisting of only poloidal field) after canceling oppositely-directed toroidal fields of spheromaks due to merging.

In an example embodiment, a process includes:
1. Generation of a large magnetic flux target FRC plasma ($\phi_p$ ~25-30 mWb) via counter-helicity spheromak merging using the MCPGs;
2. Amplifying, stabilizing and powering the FRC plasma up toward fusion reactor plasma conditions by forming a target plasma with enough magnetic flux and injecting high-energy neutral beams, thus converting that beam energy further to thermal energy;
3. Forming and injecting additional multi-pulsed spheromaks into the FRC plasma for particle refueling and refluxing in order to sustain and enhance the FRC plasma confinement properties as well as to achieve high-flux and dense FRC regime.

Figure 31A:
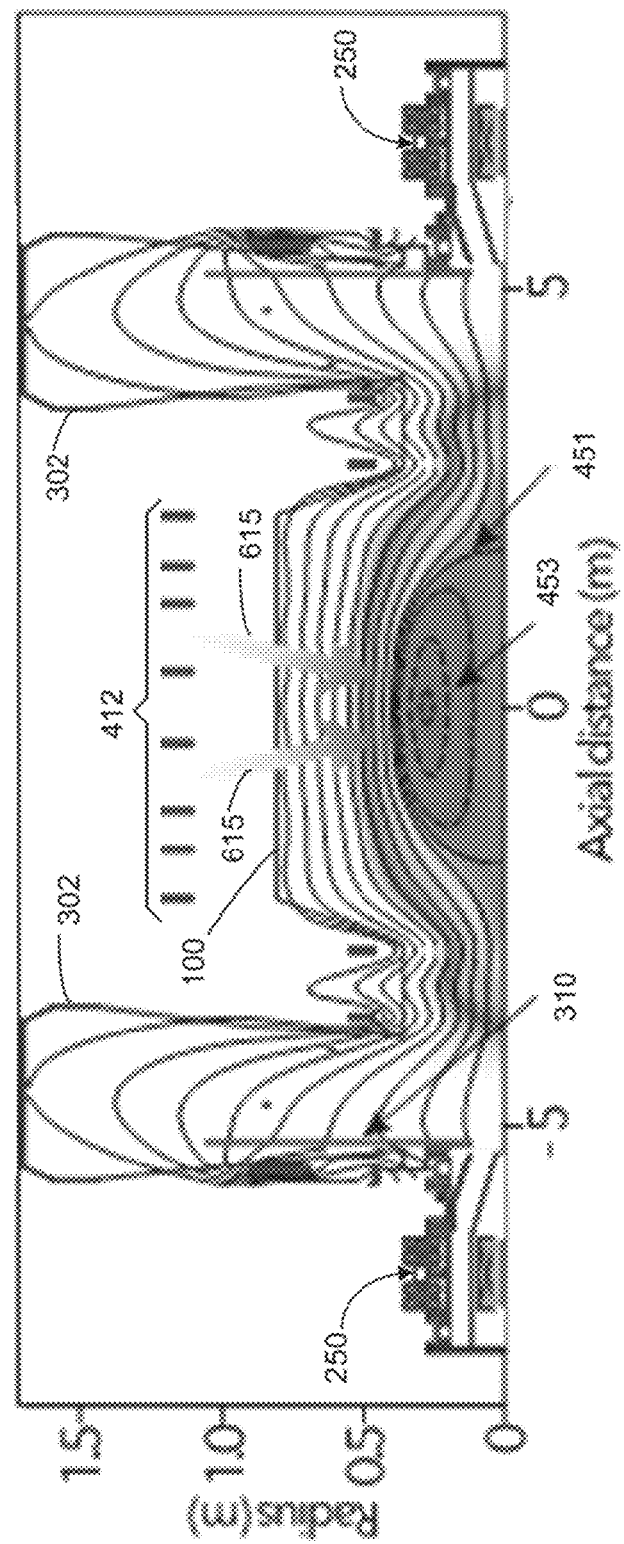
FIGS. 31A and 31B are schematics depicting an example embodiment of an FRC confinement system with opposing spheromak injectors.
Figure 31B:
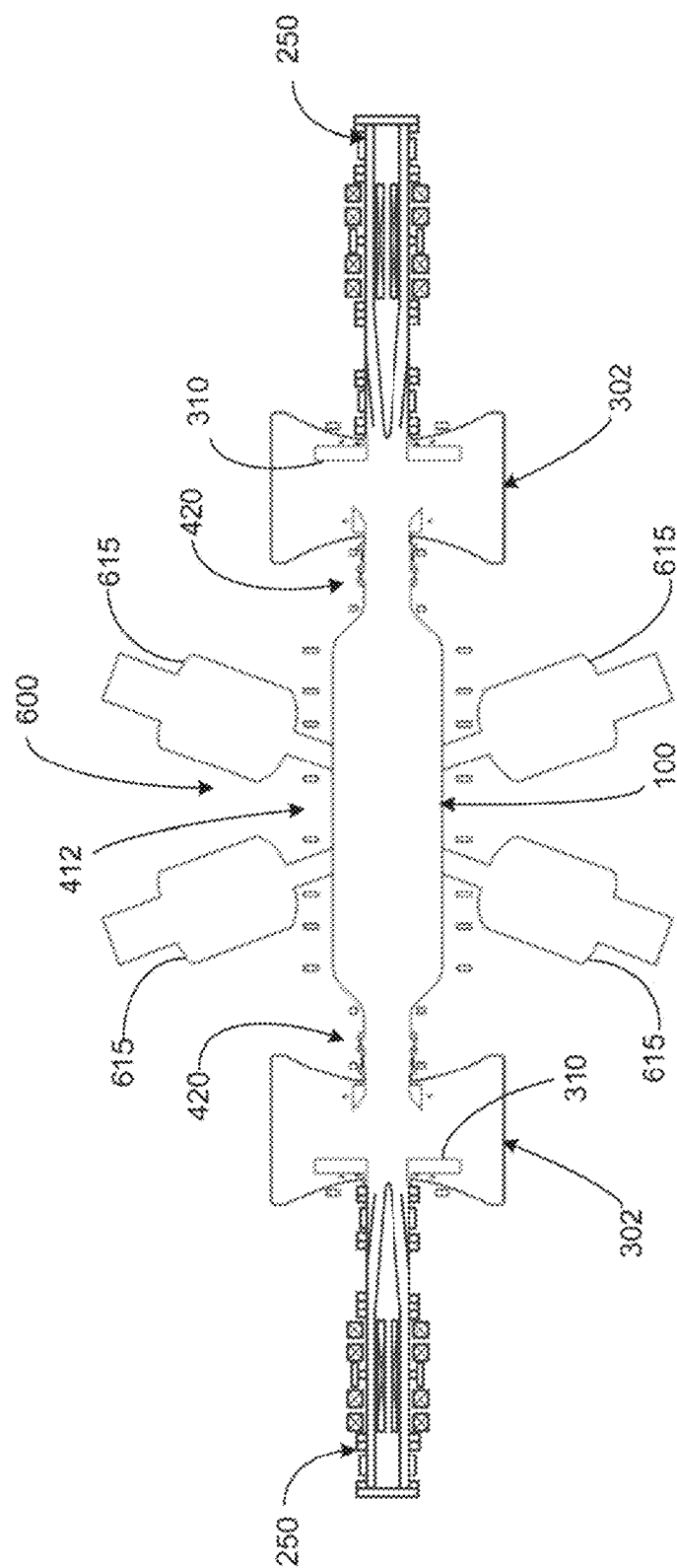
Figure 32A:
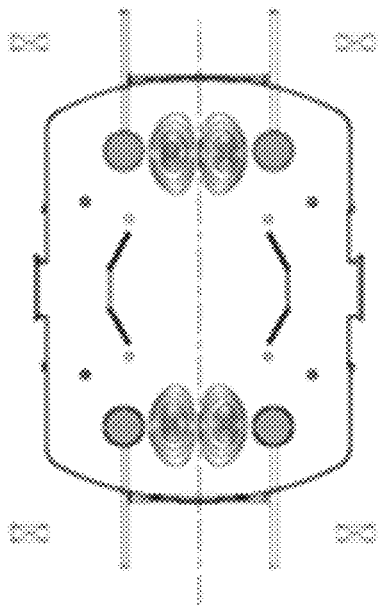
FIGS. 32A, 32B, 32C, and 32D illustrate the steps in an FRC formation process via counter-helicity spheromak merging.
Figure 32B:
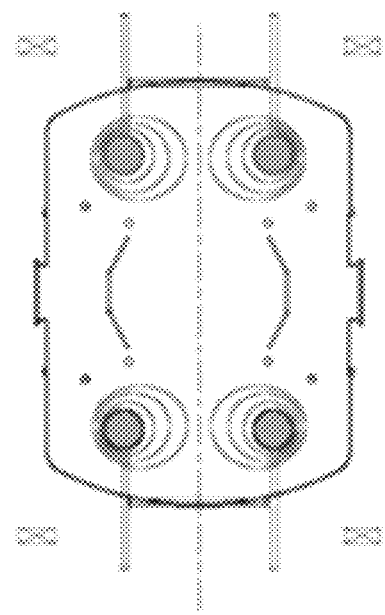
Figure 32C:
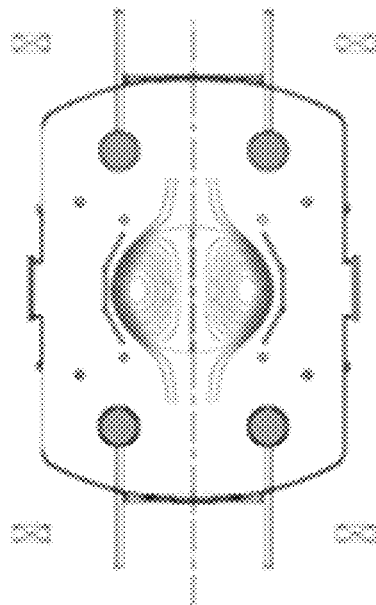
Figure 32D:
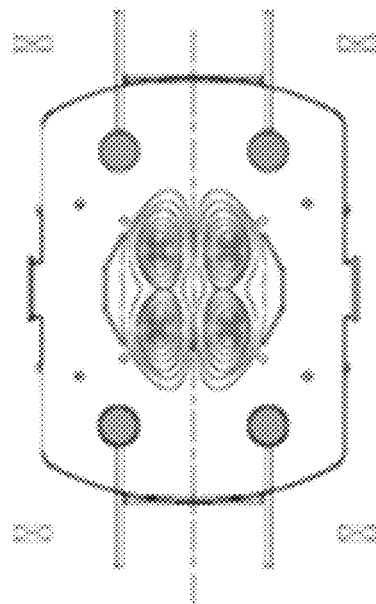

Turning to FIGS. 31A and 31B, an example embodiment of an FRC confinement system is depicted as having a confinement chamber 100 and a pair of divertors 302 coupled to the confinement chamber 100 on each end. In order to generate an optimum initial high-flux target FRC plasma 453, a pair of mid-scale spheromak injectors 250 (or magnetized coaxial plasma guns (MCPGs)) are opposingly coupled to the ends of the centrally positioned confinement chamber 100. The spheromak injectors 250 inject high magnetic flux (>20 mWb) spheromak plasmas toward the midplane of the confinement chamber 100 where the spheromaks merge and form an FRC plasma in the confinement chamber 100. The counter-helicity merging of two spheromaks tends to generate large magnetic flux target FRC plasma ($\phi_p$ ~25-30 mWb) with an elevated trapped magnetic flux. A plurality of neutral beam injectors 615 are also coupled to the confinement chamber 100 at an angle toward the midplane of the confinement chamber 100 to drive and maintain the FRC plasma 453. In example embodiments, the neutral beam injectors 615 are adjustable from an initial power level to and an increased power level. In further example embodiments, the spheromak injectors 250 are capable of multi-pulsed spheromak injection into the FRC plasma along the geometrical axis of the confinement chamber for effective refueling and refluxing.

Previous spheromak merging studies (see, FIGS. 32A-32D) demonstrated the viability and potential for compact toroid fusion plasma. In the 2004-2008 campaign of MRX experiments at Princeton Plasma Physics Laboratory, counter-helicity merging was applied to the study of formation, stability, and sustainment of oblate FRCs. It was demonstrated that a central Ohmic heating solenoid used in tokamaks can be utilized to amplify toroidal currents in the FRC in order to sustain it for times longer than the resistive decay time. (Gerhardt, S. P., et al., Phys. Plasmas 15, 032503 (2008)). In addition, shaping field coils were used to control the FRC boundary shape and elongation. This permitted a study of the effect of these shaping fields on stability. It was experimentally demonstrated that the n=1 tilt mode (n: toroidal mode number) can be stabilized in an oblate FRC (Gerhardt, S. P., et al., Phys. Rev. Lett. 99, 245003 (2007)). Also, the growth rate of n≥2 modes slowed with favorable shaping. These results made significant advances in the understanding of the open boundary FRC physics. In addition to these stability and sustainment results, significant ion heating was observed in counter-helicity merging experiments. A co-helicity merging of two spheromaks generated less heating but sufficiently high beta spheromak plasmas β~0.2-0.3). The ability to produce merged plasmas with non-negligible ion temperature ($T_i$>25 eV, $T_e$≅10 eV, $n_e$>$10^{14}$ cm $^{-3}$) permits the study of the stability characteristics of high beta plasmas of variable toroidal field component.

Figure 33:
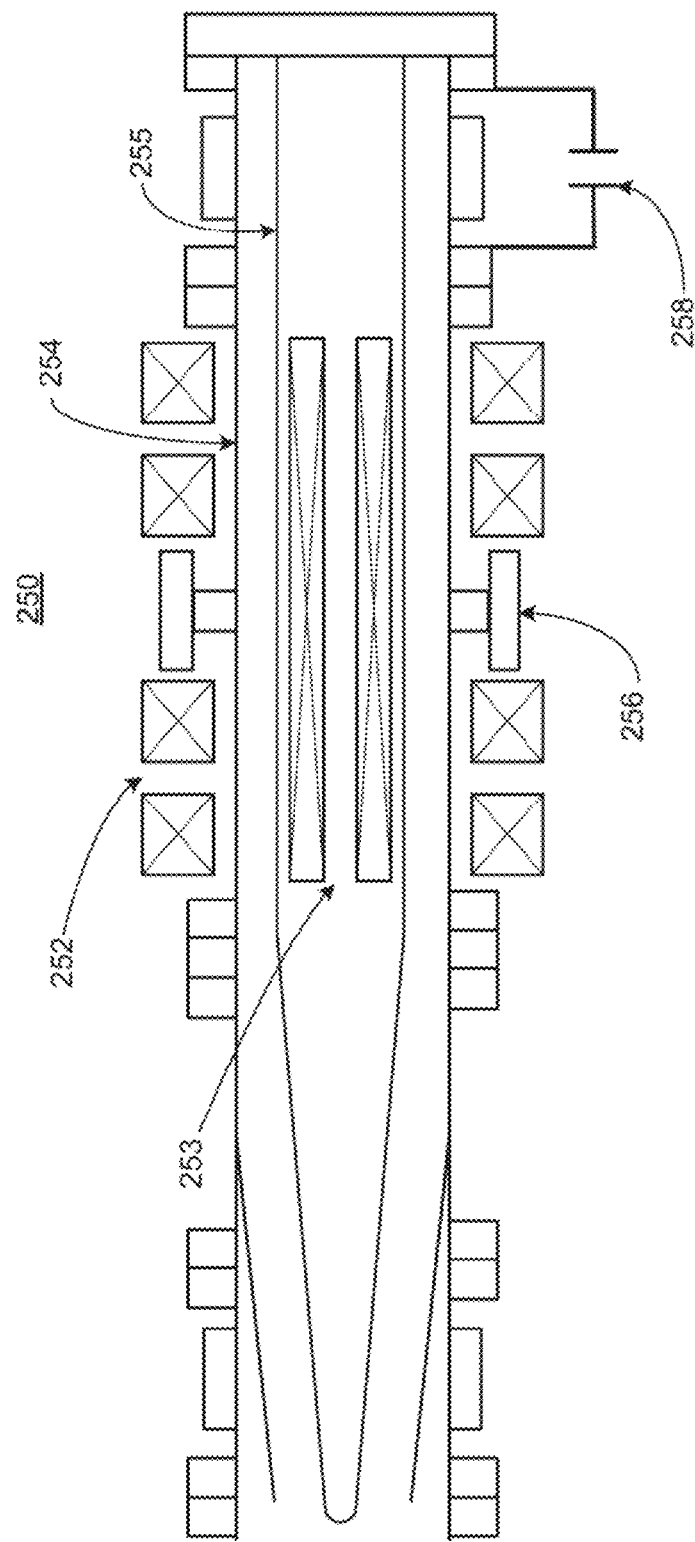
FIG. 33 is a schematic depicting an example embodiment of a spheromak injector.

In an example embodiment, the spheromak injector 250, as depicted in FIG. 33, is relatively compact spheromak injector having an outer electrode 254, a W coated inner electrode 255, an out bias coil 252 positioned about the outer electrode 254, an iron core bias coil 253 positioned within the inner electrode 255, a gas puff 256 and an H.V. power supply 258. The spheromak injector 250 produces a sufficient magnetic flux by utilizing and upgrading the recently-developed iron-core bias-coil system 253 (see, Edo, T., et al., Jrnl of Plasma and Fusion Res. 13, 3405062 (2018)). In recent preliminary tests, an air-core bias coil with DC power supply produces the magnetic flux of the formed spheromak scaled with ~1.67 μWb/Amp, while the MCPG with iron-core (cast iron; magnetic permeability μ~250) bias-coil system can produce roughly 100 times higher magnetic flux per Amp (i.e., ~0.16 mWb/Amp). By holding the current density constant, the spheromak injector can be adequately scaled up in size to produce a much higher magnetic flux (>30 mWb), without causing undesirable effects typically associated with electrode discharges. In a further example embodiment, the iron-core is formed using a pure iron (99.9% Fe; μ>200000), which tends to achieve higher magnetic flux with a reasonable bias current.

FIGS. 3D and 3E depict a CT merging FRC plasma conferment system 10 comprising a confinement chamber 100, a first pair of inner divertors 302 coupled to opposing ends of the confinement chamber 100, opposing CT formation and injection systems 200 coupled on a first end to the inner divertors 302, and a second pair of outer divertors 300 coupled to a second end of the CT formation and injection systems 300. In order to achieve spheromak merging, as shown in FIG. 31A, the CT formation/injection sections 200 and outer divertors 300 shown in FIGS. 3D and 3E are removed and replaced by the spheromak injectors 250 coupled to the inner divertors as illustrated in FIGS. 31A and 31B. The spheromak injectors 250 are placed just inside the divertor's concentric electrodes 310 that are used for FRC 453 stability control via edge-biasing. The edge-biasing system creates a radial electric field on open-field lines, thus producing an azimuthal flow by $E_r \times B_z$ around the FRC separatrix (scrape-off layer region) that stabilizes the global MHD modes, synergistically with NBI. The spheromak injectors 250 are operated and controlled individually in order to produce various spheromak plasmas as well as the initial FRC, which allows the initial plasma density and trapped magnetic flux to be varied to find an optimum target FRC for effective neutral beam injection. During the process of spheromak formation, translation and merging, relatively low equilibrium and mirror fields ($B_e$ ~1 kG, mirror ratio of ~2) in the confinement section are applied by equilibrium and mirror coils 412 and 420 so that FRC plasma 453 can be adequately formed, after which those fields shall be gradually increased ($B_e$ up to 3 kG, mirror ratio of ~3-3.5) to confine and sustain FRC plasma 453. Nuetral beams are also injected into the confinement chamber 100 from injectors 615 throughout the discharge, and the beam energy can also be increased from an initial to an elevated power level, e.g., ~15 keV to 40 keV, together with $B_e$ ramp-up, accordingly. Furthermore, the magnets and neutral beam injector system can be actively controlled so that the FRC plasma shall be stabilized and maintained in real-time.

In order to sufficiently refuel particles as well as reflux already formed FRC inside the confinement chamber 100, the spheromak injectors 250 are powered with individually controlled power supplies 258. When opposingly oriented CT injectors are installed near the midplane of the confinement chamber with a multi-pulse capability, the CT injectors inject spheromak-like plasmoid radially into the FRC; in other words, the injected CT has to penetrate into a transverse magnetic field (Bz~1 kG) without breaking apart or producing strong magnetic/density perturbation. Furthermore, the radial CT injection near the midplane affects fast-ion confinement to some extent, and the system tends to not be scalable to a high-field fusion device. Therefore, injecting CTs from the spheromak injectors 250 on the geometrical axis (i.e., "axial" CT injection) is significantly more beneficial than radial CT injection from several scientific points of view.

Alternatively, in example embodiments, the system configuration depicted in FIGS. 2, 3A, 3D and 3E, which includes the two diametrically opposed reversed-field-theta-pinch formation sections 200, can be modified to include the diametrically opposed spheromak injectors 250 coupled to the outer divertors 300 for refueling of the FRC plasma contained within the containment chamber.

According to an embodiment of the present disclosure, a method for generating and maintaining a magnetic field with a field reversed configuration (FRC) comprising merging first and second spheromak plasmas and forming an FRC about the merged plasma in a confinement chamber, and maintaining the FRC at or about a constant value without decay by injecting beams of fast neutral atoms from neutral beam injectors into the FRC plasma at an angle towards the mid-plane of the confinement chamber.

According to a further embodiment of the present disclosure, the method further comprising injecting spheromak plasmas from opposing first and second spheromak injectors towards the mid-plane of the chamber and merging the spheromak plasmas to form the FRC.

According to a further embodiment of the present disclosure, the method further comprising counter-helicity spheromak merging of the spheromak plasmas injected into the confinement chamber from the first and second spheromak injectors.

According to a further embodiment of the present disclosure, the first and second spheromak injectors comprising a magnetized coaxial plasma gun (MCPG).

According to a further embodiment of the present disclosure, the first and second spheromak injectors comprising an iron-core bias-coil system.

According to a further embodiment of the present disclosure, the iron-core of the iron-core bias-coil system comprising cast iron with magnetic permeability of about 250.

According to a further embodiment of the present disclosure, the iron-core of the iron-core bias-coil system is about 99.9% Fe with magnetic permeability equal to or greater than about 200,000.

According to a further embodiment of the present disclosure, the method further comprising separately controlling the first and second spheromak injectors.

According to a further embodiment of the present disclosure, the spheromak plasma ejected from the first spheromak injector is different from the spheromak plasma ejected from the second spheromak.

According to a further embodiment of the present disclosure, the method further comprising refueling the FRC plasma with one or more spheromak plasmas from one or more of the first and second spheromak injectors along a geometrical axis of the confinement chamber.

According to a further embodiment of the present disclosure, the method further comprising multi-pulse injecting one or more spheromak plasmas into the FRC plasma from one or more of the first and second spheromak injectors.

According to a further embodiment of the present disclosure, the method further comprising forming and injecting multi-pulsed spheromaks into the FRC plasma.

According to a further embodiment of the present disclosure, the method further comprising tuning the beam energies of the plurality of neutral beams between a first beam energy and a second beam energy, where the second beam energy differs from the first beam energy, or tuning the beam energies of the plurality of neutral beams between a first beam energy and a second beam energy, where the second beam energy differs from the first beam energy, and wherein the second beam energy is higher than the first beam energy, or tuning the beam energies of the plurality of neutral beams between a first beam energy and a second beam energy, where the second beam energy differs from the first beam energy, and where the plurality of neutral beams switch between the first and second beam energies during the duration of an injection shot.

According to a further embodiment of the present disclosure, the method further comprising generating a magnetic field within the chamber with quasi-dc coils extending about the chamber with quasi-dc coils extending about the chamber.

According to a further embodiment of the present disclosure, the method further comprising guiding magnetic flux surfaces of the FRC into divertors coupled to the ends of the confinement chamber.

According to a further embodiment of the present disclosure, the method further comprising generating a magnetic field within the divertors with quasi-dc coils extending about the formation sections and diverters.

According to a further embodiment of the present disclosure, the method further comprising generating a mirror magnetic field within opposing ends of the chamber with quasi-dc mirror coils extending about the opposing ends of the chamber.

According to a further embodiment of the present disclosure, the method further comprising generating one of a magnetic dipole field and a magnetic quadrupole field within the chamber with saddle coils coupled to the chamber.

According to a further embodiment of the present disclosure, the method further comprising conditioning the internal surfaces of the chamber and divertors with a gettering system.

According to a further embodiment of the present disclosure, the gettering system includes one of a Titanium deposition system and a Lithium deposition system.

According to a further embodiment of the present disclosure, the method further comprising controlling the radial electric field profile in an edge layer of the FRC plasma.

According to a further embodiment of the present disclosure, applying a distribution of electric potential to a group of open flux surfaces of the FRC with biasing electrodes.

According to a further embodiment of the present disclosure, the method further comprising one of injecting spheromak plasmas from the first and second spheromak injectors having magnetic flux greater than 20 mWb or injecting spheromak plasmas from the first and second spheromak injectors having magnetic flux greater than about 25-30 mWb.

According to a further embodiment of the present disclosure, a system for generating and maintaining a magnetic field with a field reversed configuration (FRC) comprising: a confinement chamber; first and second divertors coupled to the confinement chamber; first and second diametrically opposed spheromak injectors coupled to the first and second divertors for generating a spheromak plasma and translating the spheromak plasma toward a midplane of the confinement chamber; a plurality of neutral atom beam injectors coupled to the confinement chamber and oriented to inject neutral atom beams toward a mid-plane of the confinement chamber at an angle less than normal to a longitudinal axis of the confinement chamber; a magnetic system comprising a plurality of quasi-dc coils positioned around the confinement chamber and the first and second divertors; first and second set of quasi-dc mirror coils positioned between the confinement chamber and the first and second formation sections; first and second mirror plugs position between the confinement chamber and the first and second divertors; a gettering system coupled to the confinement chamber and the first and second divertors; one or more biasing electrodes for electrically biasing open flux surface of a generated FRC, the one or more biasing electrodes being positioned within one or more of the confinement chamber and the first and second divertors; and two or more saddle coils coupled to the confinement chamber.

According to a further embodiment of the present disclosure, a system for generating and maintaining a magnetic field with a field reversed configuration (FRC) comprising: a confinement chamber; first and second divertors coupled to the confinement chamber; first and second diametrically opposed spheromak injectors coupled to the first and second divertors; one or more of a plurality of biasing electrodes and first and second mirror plugs, where the one or more biasing electrodes being positioned within one or more of the confinement chamber and the first and second divertors, and where the first and second mirror plugs being position between the confinement chamber and the first and second divertors; a gettering system coupled to the confinement chamber and the first and second divertors; a plurality of neutral atom beam injectors coupled to the confinement chamber and oriented angled toward the mid-plane of the confinement chamber; and a magnetic system comprising a plurality of quasi-dc coils positioned around the confinement chamber and the first and second divertors, and first and second set of quasi-dc mirror coils positioned between the confinement chamber, where the system is configured to generate an FRC and maintain the FRC without decay while the neutral beams are injected into the plasma According to a further embodiment of the present disclosure, the first and second spheromak injectors are configured to inject spheromak plasmas towards the mid-plane of the chamber to merge and form an FRC plasma.

According to a further embodiment of the present disclosure, the first and second spheromak injectors are configured to form and inject into the confinement chamber first and second spheromak plasmas having counter-helicity.

According to a further embodiment of the present disclosure, the first and second spheromak injectors comprise a magnetized coaxial plasma gun (MCPG).

According to a further embodiment of the present disclosure, the first and second spheromak injectors include an iron-core bias-coil system.

According to a further embodiment of the present disclosure, the iron-core of the iron-core bias-coil system is cast iron with magnetic permeability of about 250.

According to a further embodiment of the present disclosure, the iron-core of the iron-core bias-coil system is about 99.9% Fe with magnetic permeability equal to or greater than about 200,000.

According to a further embodiment of the present disclosure, the first and second spheromak injectors are separately controllable.

According to a further embodiment of the present disclosure, the first and second spheromak injectors are configured to multi-pulse inject more than one spheromak plasma into the confinement chamber.

According to a further embodiment of the present disclosure, the plurality of neutral beams are adjustable between a first beam energy and a second beam energy, wherein the second beam energy differs from the first beam energy, and wherein the beam energies of the plurality of neutral beams are switchable between the first and second beam energies during the duration of an injection shot.

According to a further embodiment of the present disclosure, the biasing electrodes includes one or more of one or more point electrodes positioned within the containment chamber to contact open field lines, a set of annular electrodes between the confinement chamber and the first and second divertors, and a plurality of concentric stacked electrodes positioned in the first and second divertors to charge multiple concentric flux layers.

According to a further embodiment of the present disclosure, the system further comprising further comprising first and second diametrically opposed reversed-field-theta-pinch formation sections interposing the first and second divertors and the confinement chamber.

According to a further embodiment of the present disclosure, the system further comprising third and fourth divertors interposing the first and second diametrically opposed reversed-field-theta-pinch formation sections and the confinement chamber.

The example embodiments provided herein, however, are merely intended as illustrative examples and not to be limiting in any way.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances, entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A method for generating and maintaining a magnetic field with a field reversed configuration (FRC) comprising the steps of: injecting first and second spheromak plasmas from opposing first and second spheromak injectors axially towards the mid-plane of the chamber, merging the first and second spheromak plasmas and forming an FRC about the merged plasma in a confinement chamber, and maintaining the FRC at or about a constant value without decay by injecting beams of fast neutral atoms from neutral beam injectors into the FRC plasma at an angle towards the mid-plane of the confinement chamber;
Wherein one of injecting spheromak plasmas from the first and second spheromak injectors having magnetic flux greater than 20 mWb or injecting spheromak plasmas from the first and second spheromak injectors having magnetic flux greater than about 25-30 mWb.

2. The method of claim 1 wherein the step of merging spheromak plasmas and forming the FRC plasma includes counter-helicity spheromak merging of the spheromak plasmas injected into the confinement chamber from the first and second spheromak injectors.

3. The method of claim 1 wherein the first and second spheromak injectors comprise one of a magnetized coaxial plasma gun (MCPG) or an iron-core bias-coil system.

4. The method of claim 1 further comprising separately controlling the first and second spheromak injectors.

5. The method of claim 4 wherein the spheromak plasma ejected from the first spheromak injector is different from the spheromak plasma ejected from the second spheromak injector.

6. The method of claim 1 further comprising refueling the FRC plasma with one or more spheromak plasmas from one or more of the first and second spheromak injectors along a geometrical axis of the confinement chamber.

7. The method of claim 6 wherein the step of refueling includes multi-pulse injecting one or more spheromak plasmas into the FRC plasma from one or more of the first and second spheromak injectors.

8. The method of claim 1 further comprising forming and injecting multi-pulsed spheromaks into the FRC plasma.

9. The method of claim 1 wherein the step of injecting beams of fast neutral atoms includes one of the step of tuning the beam energies of the plurality of neutral beams between a first beam energy and a second beam energy, wherein the second beam energy differs from the first beam energy, or the step of tuning the beam energies of the plurality of neutral beams between a first beam energy and a second beam energy, wherein the second beam energy differs from the first beam energy, and wherein the second beam energy is higher than the first beam energy, or the step of tuning the beam energies of the plurality of neutral beams between a first beam energy and a second beam energy, wherein the second beam energy differs from the first beam energy, and wherein the plurality of neutral beams switch between the first and second beam energies during the duration of an injection shot.

10. The method of claim 9 further comprising generating a magnetic field within the chamber with quasi-dc coils extending about the.

11. The method of claim 10 further comprising the step of guiding magnetic flux surfaces of the FRC into divertors coupled to the ends of the confinement chamber.

12. The methods of claim 11 further comprising the step of generating a magnetic field within the divertors with quasi-dc coils extending about the formation sections and divertors.

13. The method of claim 12 further comprising the step of generating a mirror magnetic field within opposing ends of the chamber with quasi-dc mirror coils extending about the opposing ends of the chamber.

14. The method of claim 10 further comprising the step of generating one of a magnetic dipole field and a magnetic quadrupole field within the chamber with saddle coils coupled to the chamber.

15. The method of claim 14 further comprising the step of contidioning the internal surfaces of the chamber and divertors with a gettering system, wherein the gettering system includes one of a Titanium deposition system and a Lithium deposition system.

16. The method of claim 1 further comprising the step of controlling the radial electric field profile in an edge layer of the FRC plasma.

17. The method of claim 16 wherein the step of controlling the radial electric field profile in an edge layer of the FRC includes applying a distribution of electric potential to a group of open flux surfaces of the FRC with biasing electrodes.

* * * * *